US012121411B2

(12) United States Patent
Wen et al.

(10) Patent No.: US 12,121,411 B2
(45) Date of Patent: Oct. 22, 2024

(54) SMILE TREATMENT PLANNING SYSTEMS AND METHODS

(71) Applicant: uLab Systems, Inc., San Mateo, CA (US)

(72) Inventors: Huafeng Wen, Redwood Shores, CA (US); Thomas Ross Pitts, Reno, NV (US); Duncan Yardley Brown, Calgary (CA); Eric Wu, Palo Alto, CA (US); Venkata S Sarva, Fremont, CA (US); Gang Liu, Burnaby (CA); Ruize Ma, San Mateo, CA (US); Junru Zhao, Redwood City, CA (US)

(73) Assignee: uLab Systems, Inc., Memphis, TN (US)

( * ) Notice: Subject to any disclaimer, the term of this patent is extended or adjusted under 35 U.S.C. 154(b) by 0 days.

(21) Appl. No.: 17/404,894

(22) Filed: Aug. 17, 2021

(65) Prior Publication Data

US 2022/0054232 A1 Feb. 24, 2022

Related U.S. Application Data

(60) Provisional application No. 63/067,769, filed on Aug. 19, 2020.

(51) Int. Cl.
*A61C 7/00* (2006.01)
*G06T 17/00* (2006.01)
*G06T 19/20* (2011.01)

(52) U.S. Cl.
CPC .............. *A61C 7/002* (2013.01); *G06T 17/00* (2013.01); *G06T 19/20* (2013.01); *G06T 2207/30036* (2013.01); *G06T 2210/41* (2013.01)

(58) Field of Classification Search
CPC ......... A61C 7/002; G06T 17/00; G06T 19/20; G06T 2207/30036
(Continued)

(56) References Cited

U.S. PATENT DOCUMENTS 3,521,355 A 7/1970 Pearlman
4,068,379 A 1/1978 Miller et al.
(Continued)

FOREIGN PATENT DOCUMENTS

CA 2557573 7/2012
CN 1575782 2/2005
(Continued)

OTHER PUBLICATIONS

Kovach, I. V. et al., "Clinic, diagnosis, treatment, prevention, prosthetics various dentofacial anomalies and deformities," DMA, 2018.

*Primary Examiner* — Thomas J Lett
(74) *Attorney, Agent, or Firm* — Levine Bagade Han LLP

(57) ABSTRACT

Smile treatment planning systems and methods are described herein. One method for adjusting an image of a smile may generally comprise receiving a three-dimensional (3D) digital model of a dental arch of a patient, receiving a digital facial image of the patient which includes an image of one or more teeth of the patient when smiling, registering the 3D digital model to the one or more teeth of the patient from the digital facial image, correcting the 3D digital model for scale and distortion to create a corrected 3D digital model, and overlaying the corrected 3D digital model onto the digital facial image.

33 Claims, 52 Drawing Sheets

(58) Field of Classification Search
USPC ........................................................ 345/419
See application file for complete search history.

(56) References Cited

U.S. PATENT DOCUMENTS

| | | |
|---|---|---|
| 4,597,739 A | 7/1986 | Rosenberg |
| 4,889,485 A | 12/1989 | Iida |
| 4,983,334 A | 1/1991 | Adell |
| 5,055,039 A | 10/1991 | Abbatte et al. |
| 5,186,623 A | 2/1993 | Breads et al. |
| 5,259,762 A | 11/1993 | Farrell |
| 5,506,607 A | 4/1996 | Sanders et al. |
| 5,691,905 A | 11/1997 | Dehoff et al. |
| 5,863,198 A | 1/1999 | Doyle |
| 5,975,893 A | 11/1999 | Chishti et al. |
| 6,120,287 A | 9/2000 | Chen |
| 6,183,248 B1 | 2/2001 | Chishti et al. |
| 6,210,162 B1 | 4/2001 | Chishti et al. |
| 6,217,325 B1 | 4/2001 | Chishti et al. |
| 6,227,850 B1 | 5/2001 | Chishti et al. |
| 6,227,851 B1 | 5/2001 | Chishti et al. |
| 6,250,918 B1 | 6/2001 | Sachdeva et al. |
| 6,293,790 B1 | 9/2001 | Hilliard |
| 6,299,440 B1 | 10/2001 | Phan et al. |
| 6,309,215 B1 | 10/2001 | Phan et al. |
| 6,315,553 B1 | 11/2001 | Sachdeva et al. |
| 6,386,878 B1 | 5/2002 | Pavlovskaia et al. |
| 6,390,812 B1 | 5/2002 | Chishti et al. |
| 6,394,801 B2 | 5/2002 | Chishti et al. |
| 6,398,548 B1 | 6/2002 | Chishti et al. |
| 6,454,565 B2 | 9/2002 | Phan et al. |
| 6,463,344 B1 | 10/2002 | Pavloskaia |
| 6,471,511 B1 | 10/2002 | Chishti et al. |
| 6,485,298 B2 | 11/2002 | Chishti et al. |
| 6,488,499 B1 | 12/2002 | Miller |
| 6,524,101 B1 | 2/2003 | Phan et al. |
| 6,554,611 B2 | 4/2003 | Chishti et al. |
| 6,572,372 B1 | 6/2003 | Phan et al. |
| 6,582,227 B2 | 6/2003 | Phan et al. |
| 6,602,070 B2 | 8/2003 | Miller et al. |
| 6,607,382 B1 | 8/2003 | Kuo et al. |
| 6,626,666 B2 | 9/2003 | Chishti et al. |
| 6,629,840 B2 | 10/2003 | Chishti et al. |
| 6,682,346 B2 | 1/2004 | Chishti et al. |
| 6,688,885 B1 | 2/2004 | Sachdeva |
| 6,699,037 B2 | 3/2004 | Chishti et al. |
| 6,702,575 B2 | 3/2004 | Hilliard |
| 6,705,861 B2 | 3/2004 | Chishti et al. |
| 6,705,863 B2 | 3/2004 | Phan et al. |
| 6,722,880 B2 | 4/2004 | Chishti et al. |
| 6,729,876 B2 | 5/2004 | Chishti et al. |
| 6,761,560 B2 | 7/2004 | Miller |
| 6,783,360 B2 | 8/2004 | Chishti |
| 6,786,721 B2 | 9/2004 | Chishti et al. |
| 6,802,713 B1 | 10/2004 | Chishti et al. |
| 6,830,450 B2 | 12/2004 | Knopp et al. |
| 6,846,179 B2 | 1/2005 | Chapouland et al. |
| 6,857,429 B2 | 2/2005 | Eubank |
| 6,886,566 B2 | 5/2005 | Eubank |
| 6,964,564 B2 | 11/2005 | Phan et al. |
| 7,011,517 B2 | 3/2006 | Nicozisis |
| 7,029,275 B2 | 4/2006 | Rubbert et al. |
| 7,037,108 B2 | 5/2006 | Chishti et al. |
| 7,040,896 B2 | 5/2006 | Pavlovskaia et al. |
| 7,056,115 B2 | 6/2006 | Phan et al. |
| 7,059,850 B1 | 6/2006 | Phan et al. |
| 7,063,533 B2 | 6/2006 | Phan et al. |
| 7,074,038 B1 | 7/2006 | Miller |
| 7,077,647 B2 | 7/2006 | Choi et al. |
| 7,092,784 B1 | 8/2006 | Simkins |
| 7,104,790 B2 | 9/2006 | Cronauer |
| 7,121,825 B2 | 10/2006 | Chishti et al. |
| 7,125,248 B2 | 10/2006 | Phan et al. |
| 7,134,874 B2 | 11/2006 | Chishti et al. |
| 7,156,661 B2 | 1/2007 | Choi et al. |
| 7,160,110 B2 | 1/2007 | Imgrund et al. |
| 7,172,417 B2 | 2/2007 | Sporbert et al. |
| 7,192,275 B2 | 3/2007 | Miller |
| 7,220,122 B2 | 5/2007 | Chishti |
| 7,320,592 B2 | 1/2008 | Chishti et al. |
| 7,326,051 B2 | 2/2008 | Miller |
| 7,331,783 B2 | 2/2008 | Chishti et al. |
| 7,347,688 B2 | 3/2008 | Kopelman et al. |
| 7,416,407 B2 | 8/2008 | Cronauer |
| 7,434,582 B2 | 10/2008 | Eubank |
| 7,435,083 B2 | 10/2008 | Chishti et al. |
| 7,442,041 B2 | 10/2008 | Imgrund et al. |
| 7,458,812 B2 | 12/2008 | Sporbert et al. |
| 7,476,100 B2 | 1/2009 | Kuo |
| 7,481,121 B1 | 1/2009 | Cao |
| 7,553,157 B2 | 6/2009 | Abolfathi et al. |
| 7,559,328 B2 | 7/2009 | Eubank |
| 7,578,673 B2 | 8/2009 | Wen et al. |
| 7,590,462 B2 | 9/2009 | Rubbert et al. |
| 7,637,262 B2 | 12/2009 | Bailey |
| 7,641,828 B2 | 1/2010 | Desimone et al. |
| 7,658,610 B2 | 2/2010 | Knopp |
| 7,689,398 B2 | 3/2010 | Cheng et al. |
| 7,717,708 B2 | 5/2010 | Sachdeva et al. |
| 7,771,195 B2 | 8/2010 | Knopp et al. |
| 7,802,987 B1 | 9/2010 | Phan et al. |
| 7,824,180 B2 | 11/2010 | Abolfathi et al. |
| 7,826,646 B2 | 11/2010 | Pavlovskaia et al. |
| 7,840,247 B2 | 11/2010 | Liew et al. |
| 7,841,858 B2 | 11/2010 | Knopp et al. |
| 7,845,938 B2 | 12/2010 | Kim et al. |
| 7,854,609 B2 | 12/2010 | Chen et al. |
| 7,878,801 B2 | 2/2011 | Abolfathi et al. |
| 7,878,804 B2 | 2/2011 | Korytov et al. |
| 7,878,805 B2 | 2/2011 | Moss et al. |
| 7,883,334 B2 | 2/2011 | Li et al. |
| 7,901,207 B2 | 3/2011 | Knopp et al. |
| 7,905,724 B2 | 3/2011 | Kuo et al. |
| 7,914,283 B2 | 3/2011 | Kuo |
| 7,942,672 B2 | 5/2011 | Kuo |
| 7,943,079 B2 | 5/2011 | Desimone et al. |
| 7,957,824 B2 | 6/2011 | Boronvinskih et al. |
| 7,987,099 B2 | 7/2011 | Kuo et al. |
| 8,001,972 B2 | 8/2011 | Eubank |
| 8,002,543 B2 | 8/2011 | Kang et al. |
| 8,021,147 B2 | 9/2011 | Sporbert et al. |
| 8,033,282 B2 | 10/2011 | Eubank |
| 8,038,444 B2 | 10/2011 | Kitching et al. |
| 8,070,487 B2 | 12/2011 | Chishti et al. |
| 8,075,306 B2 | 12/2011 | Kitching et al. |
| 8,099,268 B2 | 1/2012 | Kitching et al. |
| 8,099,305 B2 | 1/2012 | Kuo et al. |
| 8,105,080 B2 | 1/2012 | Chishti et al. |
| 8,123,519 B2 | 2/2012 | Schultz |
| 8,152,518 B2 | 4/2012 | Kuo |
| 8,152,523 B2 | 4/2012 | Sporbert et al. |
| 8,177,551 B2 | 5/2012 | Sachdeva et al. |
| 8,235,713 B2 | 8/2012 | Phan et al. |
| 8,272,866 B2 | 9/2012 | Chun et al. |
| 8,275,180 B2 | 9/2012 | Kuo et al. |
| 8,292,617 B2 | 10/2012 | Brandt et al. |
| 8,303,302 B2 | 11/2012 | Teasdale |
| 8,348,665 B2 | 1/2013 | Kuo |
| 8,356,993 B1 | 1/2013 | Marston |
| 8,401,686 B2 | 3/2013 | Moss et al. |
| 8,401,826 B2 | 3/2013 | Cheng et al. |
| 8,439,672 B2 | 5/2013 | Matov et al. |
| 8,439,673 B2 | 5/2013 | Korytov et al. |
| 8,444,412 B2 | 5/2013 | Baughman et al. |
| 8,465,280 B2 | 6/2013 | Sachdeva et al. |
| 8,469,705 B2 | 6/2013 | Sachdeva et al. |
| 8,469,706 B2 | 6/2013 | Kuo |
| 8,496,474 B2 | 7/2013 | Chishti et al. |
| 8,512,037 B2 | 8/2013 | Andreiko |
| 8,517,726 B2 | 8/2013 | Kakavand et al. |
| 8,535,580 B2 | 9/2013 | Puttler et al. |
| 8,562,337 B2 | 10/2013 | Kuo et al. |
| 8,562,338 B2 | 10/2013 | Kitching et al. |
| 8,562,340 B2 | 10/2013 | Chishti et al. |

(56) References Cited

U.S. PATENT DOCUMENTS

| | | | |
|---|---|---|---|
| 8,636,509 B2 | 1/2014 | Miller | |
| 8,636,510 B2 | 1/2014 | Kitching et al. | |
| 8,690,568 B2 | 4/2014 | Chapoulaud et al. | |
| 8,708,697 B2 | 4/2014 | Li et al. | |
| 8,734,149 B2 | 5/2014 | Phan et al. | |
| 8,734,150 B2 | 5/2014 | Chishti et al. | |
| 8,738,165 B2 | 5/2014 | Cinader, Jr. et al. | |
| 8,765,031 B2 | 7/2014 | Li et al. | |
| 8,777,611 B2 | 7/2014 | Cios | |
| 8,780,106 B2 | 7/2014 | Chishti et al. | |
| 8,807,999 B2 | 8/2014 | Kuo et al. | |
| 8,858,226 B2 | 10/2014 | Phan et al. | |
| 8,864,493 B2 | 10/2014 | Leslie-Martin et al. | |
| 8,899,976 B2 | 12/2014 | Chen et al. | |
| 8,899,978 B2 | 12/2014 | Kitching et al. | |
| 8,930,219 B2 | 1/2015 | Trosien et al. | |
| 8,936,464 B2 | 1/2015 | Kopelman | |
| 8,998,608 B2 | 1/2015 | Trosien et al. | |
| 8,944,812 B2 | 2/2015 | Kuo et al. | |
| 8,961,173 B2 | 2/2015 | Miller | |
| 8,986,003 B2 | 3/2015 | Valoir | |
| 8,992,215 B2 | 3/2015 | Chapoulaud et al. | |
| 9,004,915 B2 | 4/2015 | Moss et al. | |
| 9,022,781 B2 | 5/2015 | Kuo et al. | |
| 9,026,238 B2 | 5/2015 | Kraemer et al. | |
| 9,060,829 B2 | 6/2015 | Sterental et al. | |
| 9,107,722 B2 | 8/2015 | Matov et al. | |
| 9,119,691 B2 | 9/2015 | Namiranian et al. | |
| 9,119,696 B2 | 9/2015 | Giordano et al. | |
| 9,161,823 B2 | 10/2015 | Morton et al. | |
| 9,161,824 B2 | 10/2015 | Chishti et al. | |
| 9,204,942 B2 | 12/2015 | Phan et al. | |
| 9,211,166 B2 | 12/2015 | Kuo et al. | |
| 9,241,774 B2 | 1/2016 | Li et al. | |
| 9,301,814 B2 | 4/2016 | Kaza et al. | |
| 9,320,575 B2 | 4/2016 | Chishti et al. | |
| 9,326,830 B2 | 5/2016 | Kitching et al. | |
| 9,326,831 B2 | 5/2016 | Cheang | |
| 9,333,052 B2 | 5/2016 | Miller | |
| 9,345,557 B2 | 5/2016 | Anderson et al. | |
| 9,351,809 B2 | 5/2016 | Phan et al. | |
| 9,364,297 B2 | 6/2016 | Kitching et al. | |
| 9,375,300 B2 | 6/2016 | Matov et al. | |
| 9,414,897 B2 | 8/2016 | Wu et al. | |
| 9,433,476 B2 | 9/2016 | Khardekar et al. | |
| 9,492,245 B2 | 11/2016 | Sherwood et al. | |
| 9,820,829 B2 | 11/2017 | Kuo | |
| 9,844,420 B2 | 12/2017 | Cheang | |
| 9,917,868 B2 | 3/2018 | Ahmed | |
| 9,922,170 B2 | 3/2018 | Trosien et al. | |
| 10,011,050 B2 | 7/2018 | Kitching et al. | |
| 10,022,204 B2 | 7/2018 | Cheang | |
| 10,335,250 B2 | 7/2019 | Wen | |
| 10,357,336 B2 | 7/2019 | Wen | |
| 10,357,342 B2 | 7/2019 | Wen | |
| 10,548,690 B2 | 2/2020 | Wen | |
| 10,588,723 B2 | 3/2020 | Falkel | |
| 10,624,717 B2 | 4/2020 | Wen | |
| 10,631,953 B2 | 4/2020 | Wen | |
| 10,881,486 B2 | 1/2021 | Wen | |
| 10,925,698 B2 | 2/2021 | Falkel | |
| 10,952,821 B2 | 3/2021 | Falkel | |
| 11,051,913 B2 | 7/2021 | Wen | |
| 11,096,763 B2 * | 8/2021 | Akopov | A61C 9/0053 |
| 11,207,161 B2 | 12/2021 | Brant | |
| 11,348,257 B2 | 5/2022 | Lang | |
| 11,364,098 B2 | 6/2022 | Falkel | |
| 11,553,989 B2 | 1/2023 | Wen et al. | |
| 11,583,365 B2 | 2/2023 | Wen | |
| 11,638,628 B2 | 5/2023 | Wen | |
| 11,663,383 B2 | 5/2023 | Cao | |
| 11,707,180 B2 | 7/2023 | Falkel | |
| 11,771,524 B2 | 10/2023 | Wen | |
| 11,833,006 B2 | 12/2023 | Wen | |
| 12,064,315 B2 | 8/2024 | Schueller et al. | |
| 2001/0002310 A1 | 5/2001 | Chishti et al. | |
| 2002/0009686 A1 | 1/2002 | Loc et al. | |
| 2002/0010568 A1 | 1/2002 | Rubbert et al. | |
| 2002/0025503 A1 | 2/2002 | Chapoulaud et al. | |
| 2002/0042038 A1 | 4/2002 | Miller et al. | |
| 2002/0051951 A1 | 5/2002 | Chishti et al. | |
| 2002/0072027 A1 | 6/2002 | Chisti | |
| 2002/0094503 A1 | 7/2002 | Chishti et al. | |
| 2002/0110776 A1 | 8/2002 | Abels et al. | |
| 2002/0150859 A1 | 11/2002 | Imgrund et al. | |
| 2002/0177108 A1 | 11/2002 | Pavlovskaia et al. | |
| 2003/0003416 A1 | 1/2003 | Chishti et al. | |
| 2003/0008259 A1 | 1/2003 | Kuo et al. | |
| 2003/0039940 A1 | 2/2003 | Miller | |
| 2003/0059736 A1 | 3/2003 | Lai et al. | |
| 2003/0190576 A1 | 10/2003 | Phan et al. | |
| 2003/0207224 A1 | 11/2003 | Lotte | |
| 2004/0023188 A1 | 2/2004 | Pavlovskaia et al. | |
| 2004/0029068 A1 | 2/2004 | Sachdeva et al. | |
| 2004/0038168 A1 | 2/2004 | Choi et al. | |
| 2004/0134599 A1 | 7/2004 | Wang et al. | |
| 2004/0142299 A1 | 7/2004 | Miller | |
| 2004/0152036 A1 | 8/2004 | Abolfathi | |
| 2004/0166456 A1 | 8/2004 | Chishti et al. | |
| 2004/0166462 A1 | 8/2004 | Phan et al. | |
| 2004/0166463 A1 | 8/2004 | Wen et al. | |
| 2004/0197728 A1 | 10/2004 | Abolfathi et al. | |
| 2004/0202983 A1 | 10/2004 | Tricca et al. | |
| 2004/0219471 A1 | 11/2004 | Cleary et al. | |
| 2004/0229183 A1 | 11/2004 | Knopp et al. | |
| 2004/0242987 A1 | 12/2004 | Liew et al. | |
| 2004/0253562 A1 | 12/2004 | Knopp | |
| 2005/0010450 A1 | 1/2005 | Hultgren et al. | |
| 2005/0019721 A1 | 1/2005 | Chishti | |
| 2005/0048432 A1 | 3/2005 | Choi et al. | |
| 2005/0095552 A1 | 5/2005 | Sporbert et al. | |
| 2005/0095562 A1 | 5/2005 | Sporbert et al. | |
| 2005/0118555 A1 | 6/2005 | Sporbert et al. | |
| 2005/0153255 A1 | 7/2005 | Sporbert et al. | |
| 2005/0192835 A1 | 9/2005 | Kuo et al. | |
| 2005/0194022 A1 | 9/2005 | Schwartz | |
| 2005/0238967 A1 | 10/2005 | Rogers et al. | |
| 2005/0241646 A1 | 11/2005 | Sotos et al. | |
| 2005/0244781 A1 | 11/2005 | Abels et al. | |
| 2005/0244782 A1 | 11/2005 | Chishti et al. | |
| 2005/0271996 A1 | 12/2005 | Sporbert et al. | |
| 2006/0003283 A1 | 1/2006 | Miller et al. | |
| 2006/0035197 A1 | 2/2006 | Hishimoto | |
| 2006/0068353 A1 | 3/2006 | Abolfathi et al. | |
| 2006/0078840 A1 | 4/2006 | Robson | |
| 2006/0078841 A1 | 4/2006 | Desimone et al. | |
| 2006/0084030 A1 | 4/2006 | Phan et al. | |
| 2006/0093982 A1 | 5/2006 | Wen | |
| 2006/0099546 A1 | 5/2006 | Bergersen | |
| 2006/0115785 A1 | 6/2006 | Li et al. | |
| 2006/0147872 A1 | 7/2006 | Andreiko | |
| 2006/0177789 A1 | 8/2006 | O'Bryan | |
| 2006/0188834 A1 | 8/2006 | Hilliard | |
| 2006/0199142 A1 | 9/2006 | Liu et al. | |
| 2006/0223022 A1 | 10/2006 | Solomon | |
| 2006/0223023 A1 | 10/2006 | Lai et al. | |
| 2006/0275731 A1 | 12/2006 | Wen et al. | |
| 2006/0275736 A1 | 12/2006 | Wen et al. | |
| 2007/0003907 A1 | 1/2007 | Chishti et al. | |
| 2007/0238065 A1 | 10/2007 | Sherwood et al. | |
| 2007/0264606 A1 | 11/2007 | Muha et al. | |
| 2007/0283967 A1 | 12/2007 | Bailey | |
| 2008/0032248 A1 | 2/2008 | Kuo | |
| 2008/0044786 A1 | 2/2008 | Kalili | |
| 2008/0050692 A1 | 2/2008 | Hilliard | |
| 2008/0051650 A1 | 2/2008 | Massie et al. | |
| 2008/0057461 A1 | 3/2008 | Cheng et al. | |
| 2008/0057462 A1 | 3/2008 | Kitching et al. | |
| 2008/0076086 A1 | 3/2008 | Kitching et al. | |
| 2008/0085487 A1 | 4/2008 | Kuo et al. | |
| 2008/0113314 A1 | 5/2008 | Pierson et al. | |
| 2008/0115791 A1 | 5/2008 | Heine | |
| 2008/0118882 A1 | 5/2008 | Su | |
| 2008/0141534 A1 | 6/2008 | Hilliard | |

(56) References Cited

U.S. PATENT DOCUMENTS

| | | |
|---|---|---|
| 2008/0182220 A1 | 7/2008 | Chishti et al. |
| 2008/0206702 A1 | 8/2008 | Hedge et al. |
| 2008/0215176 A1 | 9/2008 | Borovinskih et al. |
| 2008/0233528 A1 | 9/2008 | Kim et al. |
| 2008/0233530 A1 | 9/2008 | Cinader |
| 2008/0248438 A1 | 10/2008 | Desimone et al. |
| 2008/0248443 A1 | 10/2008 | Chisti et al. |
| 2008/0261165 A1 | 10/2008 | Steingart et al. |
| 2008/0268400 A1 | 10/2008 | Moss et al. |
| 2008/0280247 A1 | 11/2008 | Sachdeva et al. |
| 2008/0305451 A1 | 12/2008 | Kitching et al. |
| 2008/0305453 A1 | 12/2008 | Kitching et al. |
| 2009/0081604 A1 | 3/2009 | Fisher |
| 2009/0098502 A1* | 4/2009 | Andreiko ............... A61C 7/002 433/24 |
| 2009/0117510 A1 | 5/2009 | Minium |
| 2009/0191502 A1 | 7/2009 | Cao et al. |
| 2009/0269714 A1 | 10/2009 | Knopp |
| 2009/0280450 A1 | 11/2009 | Kuo |
| 2009/0291407 A1 | 11/2009 | Kuo |
| 2009/0291408 A1 | 11/2009 | Stone-Collonge et al. |
| 2010/0036682 A1 | 2/2010 | Trosien et al. |
| 2010/0055635 A1 | 3/2010 | Kakavand |
| 2010/0086890 A1 | 4/2010 | Kuo |
| 2010/0138025 A1 | 6/2010 | Morton et al. |
| 2010/0167225 A1 | 7/2010 | Kuo |
| 2010/0173266 A1 | 7/2010 | Lu et al. |
| 2010/0179789 A1 | 7/2010 | Sachdeva et al. |
| 2010/0239992 A1 | 9/2010 | Brandt et al. |
| 2010/0280798 A1 | 11/2010 | Pattijn et al. |
| 2011/0005527 A1 | 1/2011 | Andrew et al. |
| 2011/0015591 A1 | 1/2011 | Hanson et al. |
| 2011/0020761 A1 | 1/2011 | Kalili |
| 2011/0039223 A1 | 2/2011 | Li et al. |
| 2011/0091832 A1 | 4/2011 | Kim et al. |
| 2011/0114100 A1 | 5/2011 | Alvarez et al. |
| 2011/0123944 A1 | 5/2011 | Knopp et al. |
| 2011/0129786 A1 | 6/2011 | Chun et al. |
| 2011/0159451 A1 | 6/2011 | Kuo et al. |
| 2011/0165533 A1 | 7/2011 | Li et al. |
| 2011/0269092 A1 | 11/2011 | Kuo et al. |
| 2011/0269097 A1 | 11/2011 | Sporbert et al. |
| 2011/0270588 A1 | 11/2011 | Kuo et al. |
| 2011/0281229 A1 | 11/2011 | Abolfathi |
| 2012/0028221 A1 | 2/2012 | Williams |
| 2012/0035901 A1 | 2/2012 | Kitching et al. |
| 2012/0123577 A1 | 5/2012 | Chapoulaud et al. |
| 2012/0150494 A1 | 6/2012 | Anderson et al. |
| 2012/0186589 A1 | 7/2012 | Singh |
| 2012/0199136 A1 | 8/2012 | Urbano |
| 2012/0214121 A1 | 8/2012 | Greenberg |
| 2012/0225399 A1 | 9/2012 | Teasdale |
| 2012/0225400 A1 | 9/2012 | Chishti et al. |
| 2012/0225401 A1 | 9/2012 | Kitching et al. |
| 2012/0227750 A1 | 9/2012 | Tucker |
| 2012/0244488 A1 | 9/2012 | Chishti et al. |
| 2012/0270173 A1 | 10/2012 | Pumphrey et al. |
| 2012/0288818 A1 | 11/2012 | Vendittelli |
| 2013/0004634 A1 | 1/2013 | McCaskey et al. |
| 2013/0022255 A1 | 1/2013 | Chen et al. |
| 2013/0052625 A1 | 2/2013 | Wagner |
| 2013/0078593 A1 | 3/2013 | Andreiko |
| 2013/0081271 A1 | 4/2013 | Farzin-Nia et al. |
| 2013/0085018 A1 | 4/2013 | Jensen et al. |
| 2013/0095446 A1 | 4/2013 | Andreiko et al. |
| 2013/0122445 A1 | 5/2013 | Marston |
| 2013/0122448 A1 | 5/2013 | Kitching |
| 2013/0157213 A1 | 6/2013 | Arruda |
| 2013/0201450 A1 | 8/2013 | Bailey et al. |
| 2013/0204583 A1 | 8/2013 | Matov et al. |
| 2013/0230819 A1 | 9/2013 | Arruda |
| 2013/0231899 A1 | 9/2013 | Khardekar et al. |
| 2013/0236848 A1 | 9/2013 | Arruda |
| 2013/0266906 A1 | 10/2013 | Soo |
| 2013/0302742 A1 | 11/2013 | Li et al. |
| 2013/0308846 A1 | 11/2013 | Chen et al. |
| 2013/0317800 A1 | 11/2013 | Wu et al. |
| 2013/0323665 A1 | 12/2013 | Dinh et al. |
| 2013/0325431 A1 | 12/2013 | See et al. |
| 2014/0023980 A1 | 1/2014 | Kitching et al. |
| 2014/0072926 A1 | 3/2014 | Valoir |
| 2014/0073212 A1 | 3/2014 | Lee |
| 2014/0076332 A1 | 3/2014 | Luco |
| 2014/0122027 A1* | 5/2014 | Andreiko ............... A61B 1/24 703/1 |
| 2014/0124968 A1 | 5/2014 | Kim |
| 2014/0167300 A1 | 6/2014 | Lee |
| 2014/0172375 A1 | 6/2014 | Grove |
| 2014/0178830 A1 | 6/2014 | Widu |
| 2014/0193765 A1 | 7/2014 | Kitching et al. |
| 2014/0193767 A1 | 7/2014 | Li et al. |
| 2014/0229878 A1 | 8/2014 | Wen et al. |
| 2014/0242532 A1 | 8/2014 | Arruda |
| 2014/0255864 A1 | 9/2014 | Machata et al. |
| 2014/0272757 A1 | 9/2014 | Chishti |
| 2014/0287376 A1 | 9/2014 | Hultgren et al. |
| 2014/0288894 A1 | 9/2014 | Chishti et al. |
| 2014/0315153 A1 | 10/2014 | Kitching |
| 2014/0315154 A1 | 10/2014 | Jung et al. |
| 2014/0067335 A1 | 11/2014 | Andreiko |
| 2014/0329194 A1 | 11/2014 | Sachdeva et al. |
| 2014/0349242 A1 | 11/2014 | Phan et al. |
| 2014/0358497 A1 | 12/2014 | Kuo et al. |
| 2014/0363779 A1 | 12/2014 | Kopelman |
| 2014/0370452 A1 | 12/2014 | Tseng |
| 2015/0004553 A1 | 1/2015 | Li et al. |
| 2015/0004554 A1 | 1/2015 | Cao et al. |
| 2015/0018956 A1 | 1/2015 | Steinmann et al. |
| 2015/0025907 A1 | 1/2015 | Trosien et al. |
| 2015/0044623 A1 | 2/2015 | Rundlett |
| 2015/0044627 A1 | 2/2015 | German |
| 2015/0057983 A1 | 2/2015 | See et al. |
| 2015/0064641 A1 | 3/2015 | Gardner |
| 2015/0093713 A1 | 4/2015 | Chen et al. |
| 2015/0093714 A1 | 4/2015 | Kopelman |
| 2015/0125802 A1 | 5/2015 | Tal |
| 2015/0128421 A1 | 5/2015 | Mason et al. |
| 2015/0157421 A1 | 6/2015 | Martz et al. |
| 2015/0182303 A1 | 7/2015 | Abraham et al. |
| 2015/0182321 A1 | 7/2015 | Karazivan et al. |
| 2015/0216626 A1 | 8/2015 | Ranjbar |
| 2015/0216627 A1 | 8/2015 | Kopelman |
| 2015/0238280 A1 | 8/2015 | Wu et al. |
| 2015/0238282 A1 | 8/2015 | Kuo et al. |
| 2015/0238283 A1 | 8/2015 | Tanugula et al. |
| 2015/0238284 A1 | 8/2015 | Wu et al. |
| 2015/0245887 A1 | 9/2015 | Izugami et al. |
| 2015/0254410 A1 | 9/2015 | Sterental et al. |
| 2015/0265376 A1 | 9/2015 | Kopelman |
| 2015/0289949 A1 | 10/2015 | Moss et al. |
| 2015/0289950 A1 | 10/2015 | Khan |
| 2015/0305830 A1 | 10/2015 | Howard et al. |
| 2015/0305831 A1 | 10/2015 | Cosse |
| 2015/0305919 A1 | 10/2015 | Stubbs et al. |
| 2015/0313687 A1 | 11/2015 | Blees et al. |
| 2015/0320518 A1 | 11/2015 | Namiranian et al. |
| 2015/0320532 A1 | 11/2015 | Matty et al. |
| 2015/0335399 A1 | 11/2015 | Caraballo |
| 2015/0335404 A1 | 11/2015 | Webber et al. |
| 2015/0336299 A1 | 11/2015 | Tanugula et al. |
| 2015/0342464 A1 | 12/2015 | Wundrak et al. |
| 2015/0351870 A1 | 12/2015 | Mah |
| 2015/0351871 A1 | 12/2015 | Chishti et al. |
| 2015/0359609 A1 | 12/2015 | Khan |
| 2015/0366637 A1 | 12/2015 | Kopelman et al. |
| 2015/0366638 A1 | 12/2015 | Kopelman et al. |
| 2016/0000527 A1 | 1/2016 | Arruda |
| 2016/0008095 A1 | 1/2016 | Matov et al. |
| 2016/0008097 A1 | 1/2016 | Chen et al. |
| 2016/0051341 A1 | 2/2016 | Webber |
| 2016/0051342 A1 | 2/2016 | Phan et al. |
| 2016/0051348 A1 | 2/2016 | Boerjes et al. |
| 2016/0067013 A1 | 3/2016 | Morton et al. |
| 2016/0067014 A1 | 3/2016 | Kottemann et al. |

(56) References Cited

U.S. PATENT DOCUMENTS

| | | |
|---|---|---|
| 2016/0074137 A1 | 3/2016 | Kuo et al. |
| 2016/0074138 A1 | 3/2016 | Kitching et al. |
| 2016/0095668 A1 | 4/2016 | Kuo et al. |
| 2016/0095670 A1 | 4/2016 | Witte et al. |
| 2016/0106521 A1 | 4/2016 | Tanugula et al. |
| 2016/0120617 A1 | 5/2016 | Lee |
| 2016/0120621 A1 | 5/2016 | Li et al. |
| 2016/0128803 A1 | 5/2016 | Webber et al. |
| 2016/0135924 A1 | 5/2016 | Choi et al. |
| 2016/0135925 A1 | 5/2016 | Mason et al. |
| 2016/0135926 A1 | 5/2016 | Djamchidi |
| 2016/0135927 A1 | 5/2016 | Boltunov et al. |
| 2016/0157961 A1 | 6/2016 | Lee |
| 2016/0166363 A1 | 6/2016 | Varsano |
| 2016/0175068 A1 | 6/2016 | Cai et al. |
| 2016/0175069 A1 | 6/2016 | Korytov et al. |
| 2016/0184129 A1 | 6/2016 | Liptak et al. |
| 2016/0193014 A1 | 7/2016 | Morton et al. |
| 2016/0199216 A1 | 7/2016 | Cam et al. |
| 2016/0203604 A1 | 7/2016 | Gupta et al. |
| 2016/0206402 A1 | 7/2016 | Kitching et al. |
| 2016/0220200 A1 | 8/2016 | Sanholm et al. |
| 2016/0228213 A1 | 8/2016 | Tod et al. |
| 2016/0256240 A1 | 9/2016 | Shivapuja et al. |
| 2016/0310235 A1 | 10/2016 | Derakhshan et al. |
| 2016/0338799 A1 | 11/2016 | Wu et al. |
| 2016/0367339 A1 | 12/2016 | Khardekar et al. |
| 2017/0007359 A1 | 1/2017 | Kopelman et al. |
| 2017/0065373 A1 | 3/2017 | Martz et al. |
| 2017/0079748 A1 | 3/2017 | Andreiko |
| 2017/0100207 A1 | 4/2017 | Wen |
| 2017/0100208 A1 | 4/2017 | Wen |
| 2017/0100209 A1 | 4/2017 | Wen |
| 2017/0100210 A1 | 4/2017 | Wen |
| 2017/0100211 A1 | 4/2017 | Wen |
| 2017/0100214 A1 | 4/2017 | Wen |
| 2017/0224444 A1 | 8/2017 | Viecilli et al. |
| 2017/0231721 A1 | 8/2017 | Akeel et al. |
| 2017/0325911 A1 | 11/2017 | Marshall |
| 2018/0014912 A1 | 1/2018 | Radmand |
| 2018/0028065 A1 | 2/2018 | Elbaz et al. |
| 2018/0042708 A1 | 2/2018 | Caron et al. |
| 2018/0055611 A1 | 3/2018 | Sun et al. |
| 2018/0078335 A1 | 3/2018 | Falkel |
| 2018/0078343 A1 | 3/2018 | Falkel |
| 2018/0078344 A1 | 3/2018 | Falkel |
| 2018/0078347 A1 | 3/2018 | Falkel |
| 2018/0092714 A1 | 4/2018 | Kitching et al. |
| 2018/0092715 A1 | 4/2018 | Kitching et al. |
| 2018/0125610 A1* | 5/2018 | Carrier, Jr. ............ G06V 10/764 |
| 2018/0158544 A1 | 6/2018 | Trosien et al. |
| 2018/0161126 A1 | 6/2018 | Marshall et al. |
| 2018/0168781 A1 | 6/2018 | Kopelman et al. |
| 2018/0174367 A1* | 6/2018 | Marom ................... A61B 34/10 |
| 2018/0333226 A1 | 11/2018 | Tsai et al. |
| 2018/0344431 A1 | 12/2018 | Kuo et al. |
| 2019/0008612 A1 | 1/2019 | Kitching et al. |
| 2019/0046297 A1 | 2/2019 | Kopelman et al. |
| 2019/0090987 A1 | 3/2019 | Hung |
| 2019/0155789 A1 | 5/2019 | Dorman |
| 2019/0231478 A1 | 8/2019 | Kopelman |
| 2019/0321135 A1 | 10/2019 | Wen |
| 2019/0343602 A1 | 11/2019 | Wen |
| 2019/0350680 A1* | 11/2019 | Chekh .................. A61C 7/002 |
| 2019/0358002 A1 | 11/2019 | Falkel |
| 2019/0388189 A1 | 12/2019 | Shivapuja et al. |
| 2020/0000552 A1 | 1/2020 | Mednikov et al. |
| 2020/0047868 A1 | 2/2020 | Young et al. |
| 2020/0081413 A1 | 3/2020 | Georg et al. |
| 2020/0105028 A1* | 4/2020 | Gao ..................... A61C 9/0053 |
| 2020/0146775 A1 | 5/2020 | Wen |
| 2020/0170762 A1 | 6/2020 | Falkel |
| 2020/0205936 A1 | 7/2020 | Wen |
| 2020/0214598 A1 | 7/2020 | Li et al. |
| 2020/0214801 A1 | 7/2020 | Wang et al. |
| 2020/0253693 A1 | 8/2020 | Wen |
| 2020/0316856 A1 | 10/2020 | Mojdeh et al. |
| 2020/0345459 A1 | 11/2020 | Schueller et al. |
| 2020/0357186 A1 | 11/2020 | Pokotilov et al. |
| 2020/0360120 A1 | 11/2020 | Inoue et al. |
| 2020/0390523 A1 | 12/2020 | Sato et al. |
| 2021/0106404 A1 | 4/2021 | Wen |
| 2021/0153981 A1 | 5/2021 | Falkel |
| 2021/0186668 A1 | 6/2021 | Falkel |
| 2021/0244518 A1 | 8/2021 | Ryu et al. |
| 2021/0282899 A1 | 9/2021 | Wen |
| 2021/0369417 A1 | 12/2021 | Wen et al. |
| 2021/0393376 A1 | 12/2021 | Wu et al. |
| 2021/0393385 A1 | 12/2021 | Parkar et al. |
| 2022/0265395 A1 | 8/2022 | Falkel |
| 2022/0266577 A1 | 8/2022 | Sharma et al. |
| 2022/0323182 A1 | 10/2022 | Lee |
| 2022/0409338 A1 | 12/2022 | Cao |
| 2023/0005593 A1 | 1/2023 | Raslambekov |
| 2023/0053766 A1 | 2/2023 | Cao et al. |
| 2023/0058890 A1 | 2/2023 | Kenworthy |
| 2023/0233288 A1 | 7/2023 | Wen |
| 2023/0240808 A1 | 8/2023 | Schueller et al. |
| 2023/0320565 A1 | 10/2023 | Falkel |
| 2023/0380936 A1 | 11/2023 | Wen |
| 2023/0380938 A1 | 11/2023 | Sharma et al. |
| 2023/0380939 A1 | 11/2023 | Lai et al. |
| 2023/0414324 A1 | 12/2023 | Wen |

FOREIGN PATENT DOCUMENTS

| | | |
|---|---|---|
| CN | 1997324 | 7/2007 |
| CN | 101427256 | 5/2009 |
| CN | 101636122 | 1/2010 |
| CN | 1973291 | 9/2010 |
| CN | 102438545 | 5/2012 |
| CN | 101528152 | 12/2012 |
| CN | 103932807 | 7/2014 |
| CN | 105748163 | 7/2016 |
| CN | 106580509 | 4/2017 |
| EP | 1474062 | 4/2011 |
| EP | 2056734 | 9/2015 |
| EP | 2957252 | 12/2015 |
| HK | 40004866 B | 8/2022 |
| JP | 2005-515826 | 6/2005 |
| JP | 2006-500999 | 1/2006 |
| JP | 2008-532563 | 8/2008 |
| JP | 2009-202031 | 9/2009 |
| JP | 4323322 | 9/2009 |
| JP | 2010-502246 | 1/2010 |
| JP | 2010-528748 | 8/2010 |
| JP | 4566746 | 10/2010 |
| JP | 2012-139540 | 7/2012 |
| JP | 5015197 | 8/2012 |
| JP | 5015765 | 8/2012 |
| JP | 5149898 | 2/2013 |
| JP | 2013-081785 | 5/2013 |
| JP | 5291218 | 9/2013 |
| JP | 2007-525289 | 9/2017 |
| JP | 2019-013463 | 1/2019 |
| JP | 2019-529042 | 10/2019 |
| JP | 2019-537033 | 12/2019 |
| KR | 2004-46323 | 10/2009 |
| KR | 10-1450866 | 10/2014 |
| KR | 2018-0090481 | 8/2018 |
| WO | WO 2001/082192 | 11/2001 |
| WO | WO 2002/047571 | 6/2002 |
| WO | WO 2003/063721 | 8/2003 |
| WO | WO 2004/028391 | 4/2004 |
| WO | WO 2005/086058 | 9/2005 |
| WO | WO 2004/098379 | 11/2005 |
| WO | WO 2006/050452 | 5/2006 |
| WO | WO 2006/096558 | 9/2006 |
| WO | WO 2008/026064 | 3/2008 |
| WO | WO 2008/102132 | 8/2008 |
| WO | WO 2008/118546 | 10/2008 |
| WO | WO 2008/149222 | 12/2008 |
| WO | WO 2009/057937 | 5/2009 |
| WO | WO 2009/068892 | 6/2009 |

(56) References Cited

FOREIGN PATENT DOCUMENTS

| | | |
|---|---|---|
| WO | WO 2016/004415 | 1/2016 |
| WO | WO 2016/100577 | 6/2016 |
| WO | WO 2017/062207 | 4/2017 |
| WO | WO 2017/062208 | 4/2017 |
| WO | WO 2017/062209 | 4/2017 |
| WO | WO 2017/062210 | 4/2017 |
| WO | WO 2018/057622 | 3/2018 |
| WO | WO 2018/112273 | 6/2018 |
| WO | WO 2018/118200 | 6/2018 |
| WO | WO 2020/222905 | 11/2020 |
| WO | WO 2020/223384 | 11/2020 |
| WO | WO 2020/239429 | 12/2020 |
| WO | WO 2020/257724 | 12/2020 |
| WO | WO 2021/105878 | 6/2021 |
| WO | WO 2021/247145 | 12/2021 |
| WO | WO 2021/247950 | 12/2021 |
| WO | WO 2022/040671 | 2/2022 |
| WO | WO 2022/178514 | 8/2022 |
| WO | WO 2023/023417 | 2/2023 |
| WO | WO 2023/023418 | 2/2023 |
| WO | WO 2023/230460 | 11/2023 |

* cited by examiner

522

SMILE TREATMENT PLANNING SYSTEMS AND METHODS

CROSS-REFERENCE TO RELATED APPLICATIONS

This application claims the benefit of priority to U.S. Prov. 63/067,769 filed Aug. 19, 2020, which is incorporated herein by reference in its entirety.

FIELD OF THE INVENTION

The present invention relates to methods and apparatus for orthodontics. More particularly, the present invention relates to methods and apparatus for orthodontic treatment planning of malocclusions and optimizing the corresponding smile of the patient with respect to the planned treatment.

BACKGROUND OF THE INVENTION

Orthodontics is a specialty of dentistry that is concerned with the study and treatment of malocclusions which can result from tooth irregularities, disproportionate facial skeleton relationships, or both. Orthodontics treats malocclusion through the displacement of teeth via bony remodeling and control and modification of facial growth.

This process has been accomplished by using a number of different approaches such as the application of static mechanical forces to induce bone remodeling, thereby enabling teeth to move. Devices such as braces having an archwire interface with brackets are affixed to each tooth. As the teeth respond to the pressure applied via the archwire by shifting their positions, the wires are again tightened to apply additional pressure. This widely accepted approach to treating malocclusions takes about twenty-four months on average to complete, and is used to treat a number of different classifications of clinical malocclusion. Other treatments can also include the use of aligners which are positioned upon the teeth to effect the movement of one or more teeth.

However, corrections which are performed may result in a final arrangement of teeth which are straightened but which may or may not produce a corresponding smile which is aesthetically pleasing to the patient. This may be due to a number of factors such as a shifting of the facial features due to the teeth correction. Simply presenting a projected image of the corrected teeth positioning to the patient may not present the most accurate or aesthetically desirable smile which may correspond to the corrected dentition. Furthermore, other factors relating to the patient's smile may be desirable for alteration to result in an aesthetically pleasing smile. Accordingly, there exists a need for efficiently and effectively performing treatments for moving of one or more teeth and optimizing a corresponding smile for presentation to the patient.

SUMMARY OF THE INVENTION

As part of the treatment planning, a three-dimensional (3D) digital scan of the patient's dental arch prior to treatment are typically obtained using any number of scanning methodologies and processes. This 3D scan of the dental arch may be used to generate an image of the patient's smile which results correspondingly from the correction treatment of the teeth positioning. The 3D model may be corrected via software either automatically or manually to adjust for any scale and/or distortion and this corrected 3D model may then be overlaid onto the one or more facial photos. The 3D model may then be manipulated or adjusted in various ways to match a number of various features of the patient's anatomy. The visual image of the smile may be presented to the patient to demonstrate how their corresponding smile would appear after their teeth are corrected for malocclusions.

The image of the face of the patient may be adjusted for positioning using reference lines to allow for the user to reach a natural looking position. These reference lines and areas may be automatically detected upon the facial photo images and/or may be adjusted by the user in order to determine where the teeth of the patient are located upon the facial images.

With the 3D arch model initially overlaid upon the facial photo, the software may be used to highlight the 3D arch model and photo of the patient's teeth for registering the model to the image of the teeth. Various control features may be used upon the graphical user interface to control movement of the 3D arch model relative to the facial image to control fine movements of the model, e.g., linear and angular movement. A calibration process for auto-matching the 3D arch model to the photo image may be implemented in one method by utilizing a number of markers which are generated by the system and placed upon various landmarks of the patient's teeth both upon the 3D arch model and the photo image. Once the registration has been completed, the system may then replace the photo image with the 3D arch model in the facial image of the patient.

Once the registration has been completed so that the arch model is registered to the image of the teeth and the image has been replaced with the arch model, the color of the arch model may not match the actual color the patient's teeth. The user may then select the color from the photo image and apply that color onto the 3D arch model. Additionally and/or alternatively, the color may be further adjusted to be darker or brighter depending upon the desired resulting image. Aside from adjusting the color of the teeth, the color of the gums on the 3D arch model may similarly be adjusted.

With the positioning and registration of the arch model matched to the facial image and with the color of the teeth and gums of the arch model also matched and corrected, the matched 3D arch model may be presented in the facial image and profile image.

Additional parameters of the 3D arch model may be adjusted to alter various features of the model to improve aesthetic features of the patient's smile. One method for adjusting aesthetic features may incorporate the use of a curve or arc which is generated from parameters of the patient's smile to create a "smile arc". The parameters of the smile arc may be adjusted and the teeth of the patient (as well as other anatomical features) may be manipulated according to the smile arc being used as a guide for adjusting or improving the patient's smile.

The smile arc may be formed to have, e.g., five control points or locations, which may be adjusted and moved to allow for the curvature of the smile arc to be changed. The initial curvature of the smile arc may be obtained from the curvature of, e.g., the patient's lower lip, in order to be used as a guide for having the teeth follow the curvature of the lower lip to enhance the smile. The smile arc can be viewed with or without the frontal image depending upon the preference of the user. The control points may be moved simultaneously together or individually in order to create a symmetrical smile arc or asymmetrical smile arc based on the shape of the lower lip and the user's preferences.

The smile arc may also be adjusted to move upward or downward relative to the patient's lower lip. As the smile arc is translated, the teeth shown in the arch model may be correlated to follow the location of the smile arc, e.g., by having the tips of the teeth (or individual tooth) as well as the FACC lines being used as the indicator for the follow function to allow for the teeth movement. Also, the entire smile arc may be moved upwards and/or downwards while maintaining its curvature unchanged. This may allow for the user to adjust the treatment plan because while the digital tooth movements may appear to be achievable, some or all of the of the teeth may not be movable clinically over the digitally specified long distances; furthermore, the gums may need to be reshaped which the patient may or may not wish to have done. Hence, maintaining a curvature of the smile arc during its adjustment may allow for the smile arc to keep its shape for the smile without having to utilize such aggressive movements.

In some cases where the treatment may utilize the use of brackets rather than aligners to effect the tooth movements, the smile arc may still be used as a guide for following the patient's smile. The 3D arch model may still incorporate the smile arc while preparing the 3D arch model for use with an indirect bonding tray (IDB) for the application of one or more brackets to the teeth.

A plane may be introduced into a 3D arch model which shows a final position of the corrected teeth after a bracket treatment to illustrate where the one or more brackets should be placed upon the teeth. This plane may represent a position of the brackets upon the teeth because as the correction treatment nears completion and the teeth are adjusted to their desired positions, the plane may function as a guide for bracket positioning to remain in an aligned position relative to one another as the bracket wire will become straightened near the end of a correction treatment.

Digitally, a treatment may be planned to bring the fully aligned brackets on to the final stage where the teeth movements are completed. The teeth may then be digitally reverted back to their original pre-treatment positions to enable the user to see where the bracket should be placed at the outset of the treatment to achieve the final position of the teeth and the desired treatment plan.

Once any adjustments of the plane have been completed, rotation of the 3D arch model back to its front view may show the plane aligned in a horizontal orientation. With the plane suitably positioned, models of the brackets may be applied digitally along the plane and upon the teeth such that the wire receiving slot of each bracket is aligned with the plane so as to accommodate the arch wire which also becomes aligned with the plane at the completion of the bracket treatment.

With the brackets superimposed upon the 3D arch model, a distance from the pocket to the gumline and the distance from the pocket to the incisal edge may be measured in order to allow for the user to check and follow the guide for bracket placement. The brackets can also be moved freely when selected.

When the 3D arch model is reverted back to the initial pre-treatment stage, the brackets can be seen in their pre-treatment position for mounting upon the teeth. This may allow for the arch wire to be coupled through the wire receiving slot of each bracket for treatment.

Along with the positioning of the brackets, the smile arc may also adjusted as well as there may be occasions where the bracket cannot be placed clinically at the desired position because of a tooth which is too small or a region of the gums which interfere. The 3D arch model could indicate that bracket is to be placed on the gums if the tooth or gum is not modified. For instance, a tooth may require lengthening with, e.g., a composite resin, or the gum may need to be shaved short to accommodate a bracket. In such a case, the smile arc may be adjusted by moving the arc upwards or downwards while still maintaining the same curvature to achieve the same smile.

In the event that the gums may need clinical adjustment, the gum line may be adjusted on the 3D arch model to mimic what the practitioner can potentially do with respect to, e.g., trimming the gums or applying a patch onto the gums to lengthen it. These results may be reflected in the arch model for presentation to the patient to show the patient what the expected clinical results may look like. In the event that a tooth or several teeth may need clinical adjustment, such as lengthening or reduction, another module may be introduced for adding geometry onto an identified tooth.

In the event that several teeth are to be lengthened, a mold such as an aligner-shaped device may be applied to the teeth. The shape of the mold with respect to the lengthened portions may be fabricated based upon the identified teeth and the shape of the extended teeth.

In addition to lengthening the teeth, another aligner-like device may be used for removing a portion of a tooth or several teeth. The aligner-like device may be fabricated with a portion of the aligner removed corresponding to the region of the tooth to be removed. The exposed portion of the tooth projecting from the aligner opening may be used as a reference guide to the user for removing this excess portion of the tooth.

Aside from the tooth extension or removal, yet another feature of the smile optimization process may include the adjustment of one or more facial features from the facial image. After the course of a correction treatment, the movement of one or more teeth may alter a number of facial features due to the repositioning of the underlying muscles and/or skin. The resulting smile of the patient may accordingly differ as well.

With the movement of the teeth known and the resulting teeth location, the areas likely to be affected are identified and the system may automatically adjust a position of the muscles and/or skin to alter the patient's facial features upon the image. The positions may also be manually adjusted by the user as well. The identified regions may be bounded where the facial regions may be freely moved within the bounds of the identified regions.

In addition to the facial regions, the lips of the patient may be adjusted as well. A number of markers may be applied around each of boundaries to allow for adjustment of the markers by the user. Depending upon the treatment, the upper lips and/or lower lips may be altered.

In yet another feature of the system for optimizing a patient's smile, a "smile score" may be generated for the purpose of providing the user and/or patient some relative scale to provide some indication of how optimized the resulting smile of the patient may appear. Factors such as the patient's smile arc, FACC line, width and height of the teeth, curvature of individual teeth, ABO score, etc., may be input into a smile score engine to automatically calculate the smile score. The user may alter any one of these input parameters to iteratively generate the corresponding smile score and depending upon the results, the user may then implement one or more changes to further increase the corresponding smile score. The changes may then be optionally implemented by the user clinically to achieve an aesthetically pleasing smile.

Yet another feature optionally available through the system may include the generation of an animation of the patient's face. Such an animation can be video based, where the patient may be requested to maintain a natural head position while repeating one or more phrases while recorded. The recorded video may be altered to swap the patient's face with the facial image of the patient with the resulting smile from treatment. The patient may then be able to view the original video and altered video with the replaced arch model for comparison purposes.

While different features are discussed, the system may incorporate any number of different features into a single system in any number of combinations. A single system provided may, for example, include or incorporate every feature described herein or it may include a select number of features depending upon the desired system.

One method for adjusting an image of a smile may generally comprise receiving a three-dimensional (3D) digital model of a dental arch of a patient, receiving a digital facial image of the patient which includes an image of one or more teeth of the patient when smiling, registering the 3D digital model to the one or more teeth of the patient from the digital facial image, correcting the 3D digital model for scale and distortion to create a corrected 3D digital model, and overlaying the corrected 3D digital model onto the digital facial image.

One method of adjusting a smile may generally comprise receiving a three-dimensional (3D) digital model of a dental arch of a patient, receiving a digital facial image of the patient which includes an image of one or more teeth of the patient when smiling, generating a smile curve or arc which corresponds to a curve or arc of a lower lip of the patient from the digital facial image, overlaying the smile curve or arc in proximity to the one or more teeth on the digital facial image, adjusting one or more parameters of the smile curve or arc, and manipulating one or more teeth from the 3D digital model according to the smile curve or arc.

One method of adjusting a facial image may generally comprise receiving a three-dimensional (3D) digital model of a dental arch of a patient, receiving a digital facial image of the patient which includes an image of one or more teeth of the patient when smiling, estimating a facial anatomy from the digital facial image of the patient, identifying one or more areas of the facial anatomy affected by a correction treatment of the one or more teeth, and adjusting the one or more areas of the facial anatomy corresponding to the correction treatment.

One method of improving a smile of a patient may generally comprise receiving a three-dimensional (3D) digital model of a dental arch of a patient, receiving a digital facial image of the patient which includes an image of one or more teeth of the patient when smiling, identifying one or more parameters relating to smile optimization, and generating a smile score based on the one or more parameters.

DETAILED DESCRIPTION OF THE INVENTION

With treatment planning software, a treatment plan using aligners, brackets, etc. may be used to correct for any number of malocclusions with a patient's teeth. Particular treatment planning processes are described in further detail in U.S. Pat. Nos. 10,624,717; 10,335,250; 10,631,953; 10,357,336; 10,357,342; 10,588,723; 10,548,690, as well as U.S. Pat. Pubs. 2017/0100208; 2019/0321135; 2020/0205936; 2019/0343602; 2020/0170762; 2018/0078343; 2018/0078344; 2018/0078335; 2020/0146775. The details of these references are incorporated herein by reference in their entirety and for any purpose.

Figure 1:
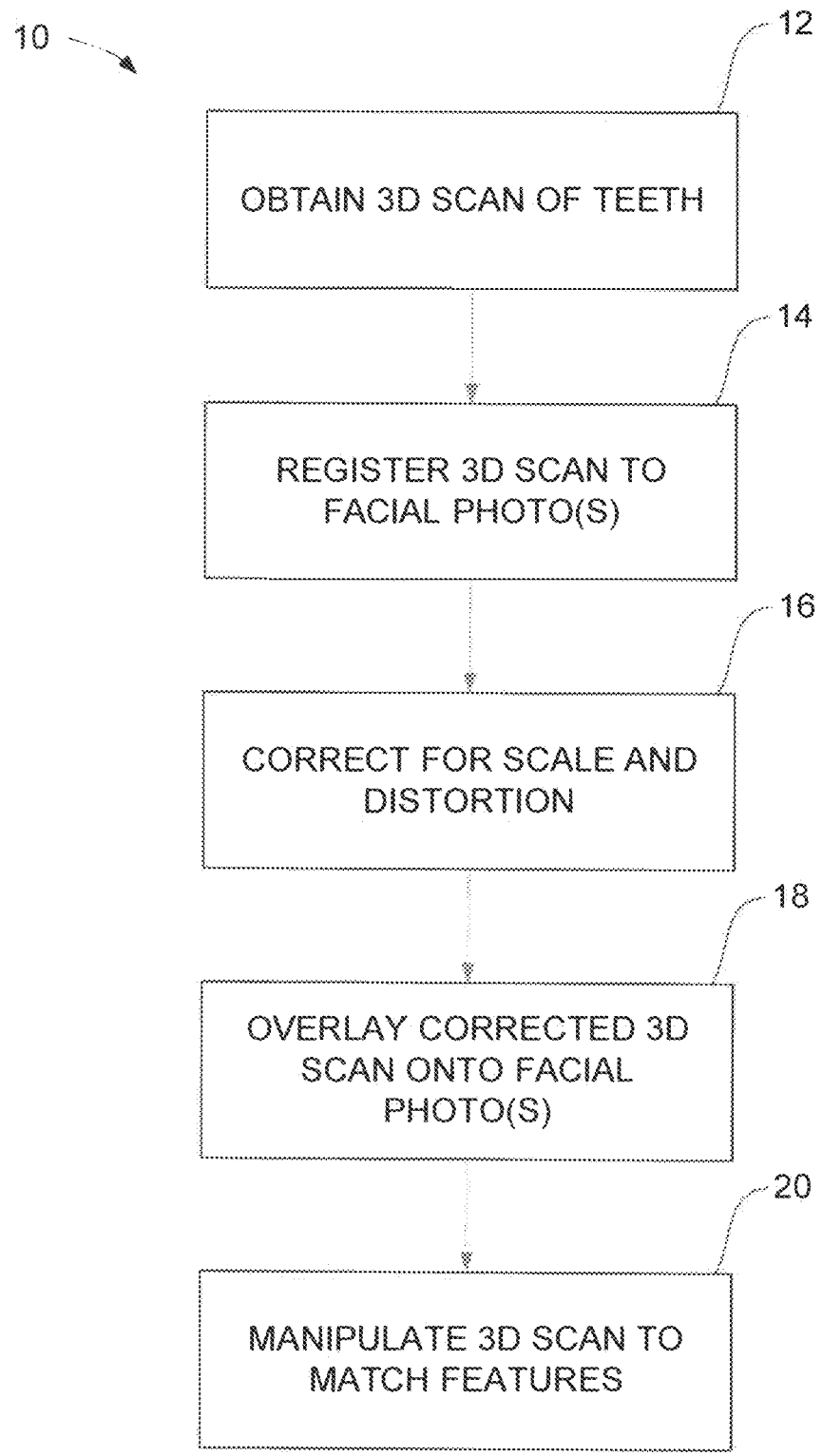
FIG. 1 shows a flow diagram of one variation of a method for determining and optimizing a smile of a patient corresponding to a treatment plan.

As part of the treatment planning, a three-dimensional (3D) digital scan of the patient's dental arch prior to treatment are typically obtained using any number of scanning methodologies and processes. This 3D scan of the dental arch may be used to generate an image of the patient's smile which results correspondingly from the correction treatment of the teeth positioning. As illustrated in FIG. 1, which shows a flow diagram 10 of one variation of a method for determining and optimizing a smile of a patient corresponding to a treatment plan. The 3D model of the teeth 12 may be obtained and used by a computer to register the 3D model to one or more facial photos 14 showing different angles of the patient's face, e.g., front view, profile, etc. as well as different angles of the patient's teeth.

The 3D model may be corrected via the software either automatically or manually to adjust for any scale and/or distortion 16. The corrected 3D model may then be overlaid onto the one or more facial photos 18 and the 3D model may then be manipulated or adjusted in various ways (as described in further detail below) to match a number of various features 20 of the patient's anatomy. The visual image of the smile may be presented to the patient to demonstrate how their corresponding smile would appear after their teeth are corrected for malocclusions.

Figure 2:
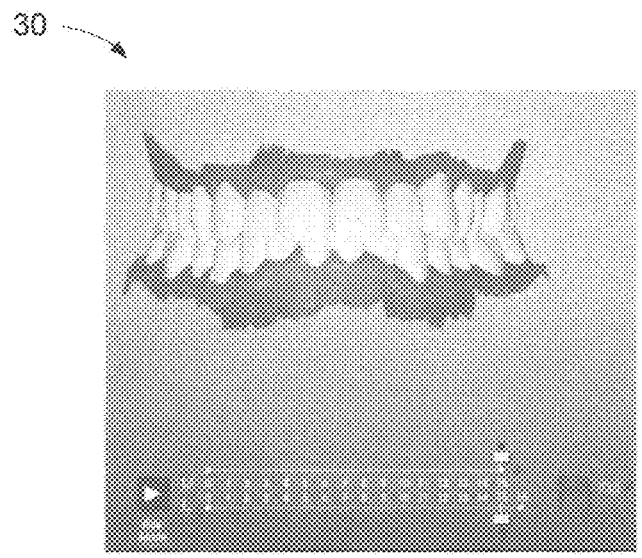
FIG. 2 shows a computer generated three-dimensional (3D) image of a patient's dental arch model obtained from a digital scan of the teeth.
Figure 3A:
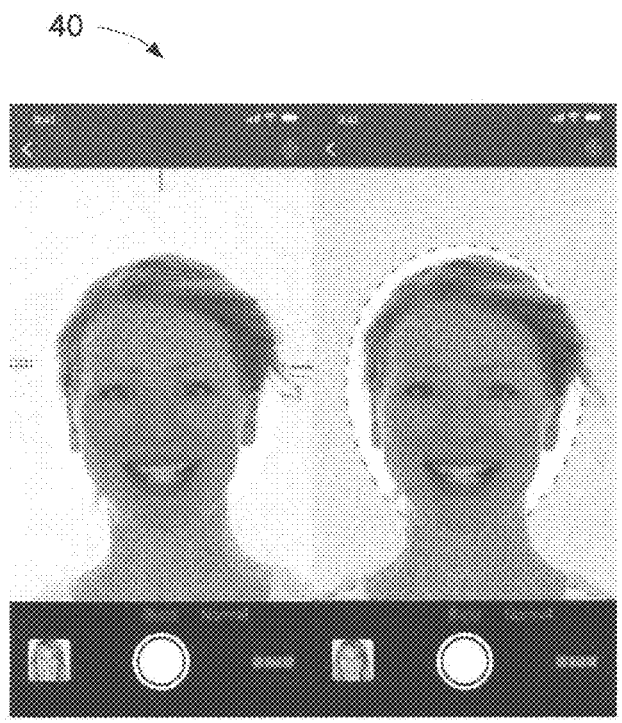
FIGS. 3A and 3B show examples of images of a patient's face and profile taken by a device such as a digital camera or smartphone which may be used for generating the resulting smile of the patient after treatment.
Figure 3B:
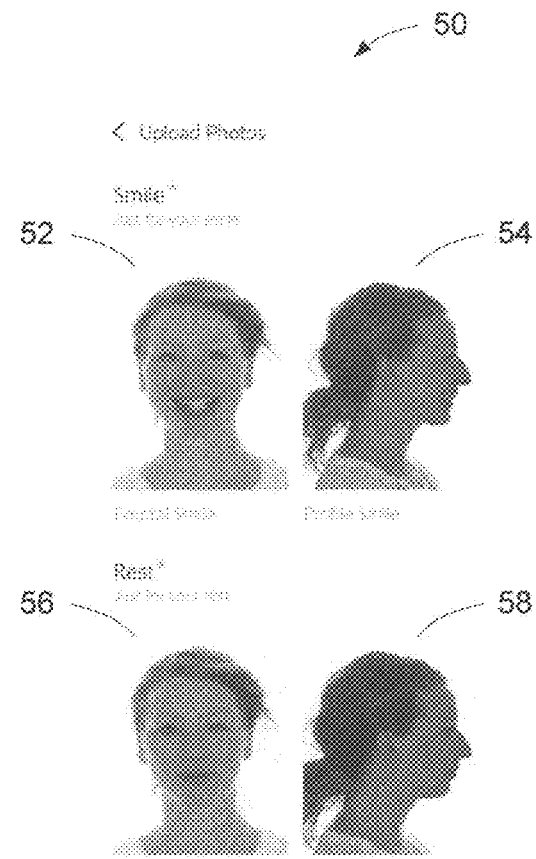

FIG. 2 shows an example of the 3D arch model 30 generated from a scan of the patient's dentition which may be used not only for the treatment planning process but for creating a smile case in order to optimize various parameters of the patient's smile for presentation to the patient using the processes described herein. With the scanned 3D arch model of the patient, various photo images of the patient may also be taken via a digital camera or a smartphone having a digital imager which may be used to take a front image of the patient's face, as shown in FIG. 3A, as well as a profile image both in a smiling pose and a resting pose, as shown in FIG. 3B. These images may be used directly upon a computer or other processing device such as a smartphone, tablet, etc. with the appropriate software.

As further shown in FIG. 3A, the image of the face of the patient may be adjusted for positioning using reference lines, as well as an oval circle (as shown), to allow for the user to reach a natural looking position. These reference lines and areas may be automatically detected upon the facial photo images and/or may be adjusted by the user in order to determine where the teeth of the patient are located upon the facial images. Alternatively, the reference lines on the photo taking application (for example, on a smartphone, tablet, etc.) may be manually adjusted as well. The reference lines provided may be for the benefit of the practitioner viewing the image to have a better feeling for the facial structures of the patient. During automatic detection, the various lines, such as lip lines, may also be generated so that editing various features such as cropping out the teeth area for replacement with the digital 3D teeth model and filling any remaining areas with a color that matches the inside of the mouth may be performed. Such editing may be done for both the upper arches and/or lower arches as well.

Figure 4:
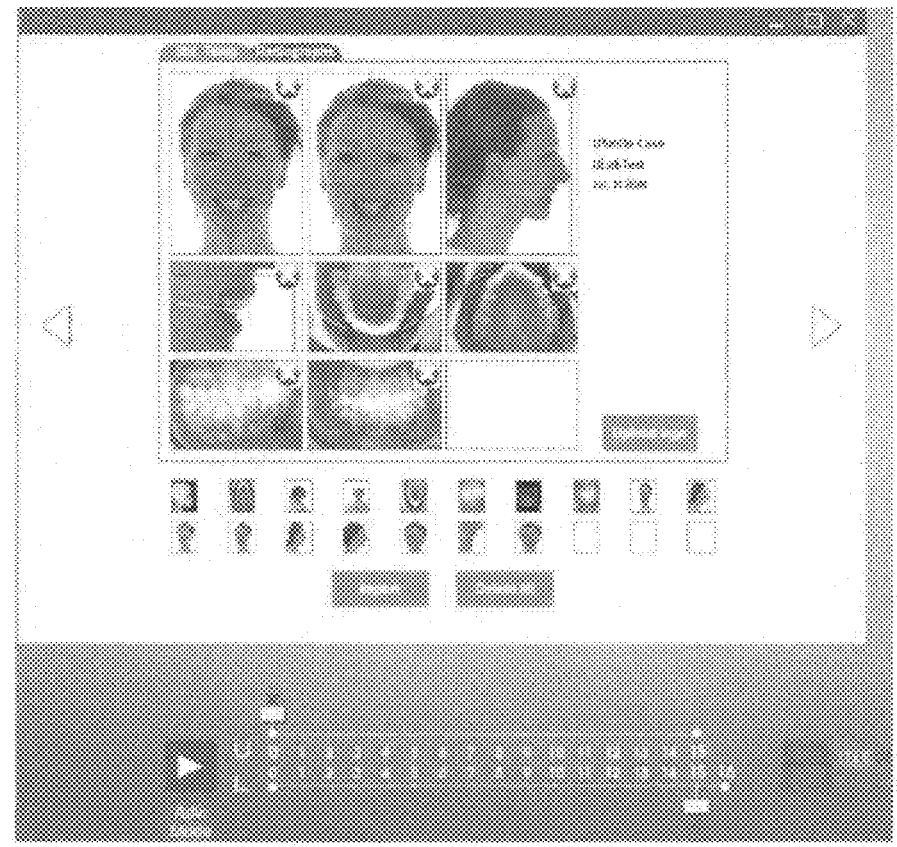
FIG. 4 shows the various photo images of the patient which can be uploaded to a software program used for optimizing various parameters of the patient's smile.

FIG. 4 shows an example of multiple facial images of front views, profile, and detail profile views of the patient's mouth as well as photo images taken of the patient's teeth from front and side views as well as occlusal views of both the upper and lower teeth. These photo images may be uploaded to the software for processing.

Figure 5:
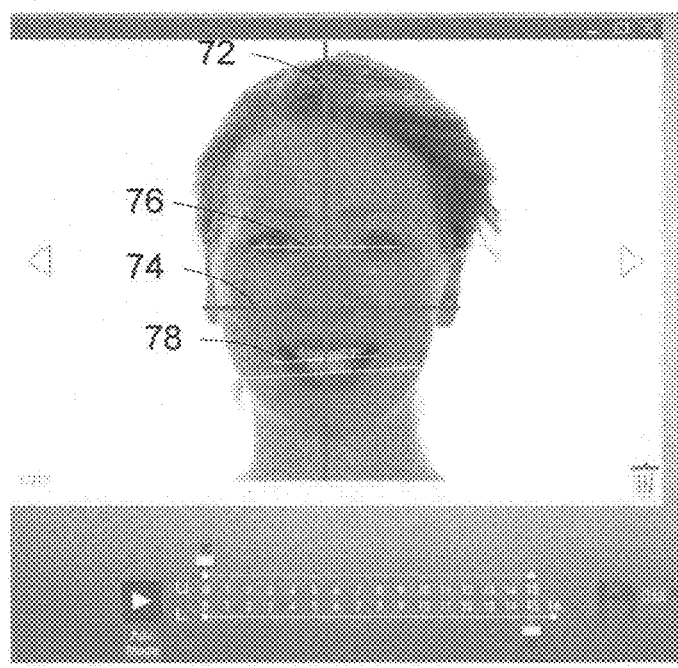
FIG. 5 shows an image of an uploaded photo image of the patient with various indicator lines generated for determining various physical parameters of the patient.

FIG. 5 shows a front view of the patient's face in a photo which has been uploaded and where reference lines have been automatically generated upon the patient's face. Examples of the reference lines generated by the software are shown in a vertical line of symmetry 72 of the patient's face, a horizontal line 74 centered at a tip of the patient's nose, a horizontal line 76 between the eyes (specifically the irises) of the patient's face, as well as a horizontal line 78 between various teeth (e.g., canine teeth) to determine whether the teeth are symmetrical or canted, etc. Additional and/or alternative reference lines may be generated so long as the reference lines are used to determine various parameters relating to the facial features of the patient, such as distances and/or angles between the various features. Furthermore, while these reference lines may be automatically generated upon the facial photo, these lines may also be manually created or adjusted by the user to define the various parameters.

Figure 6A:
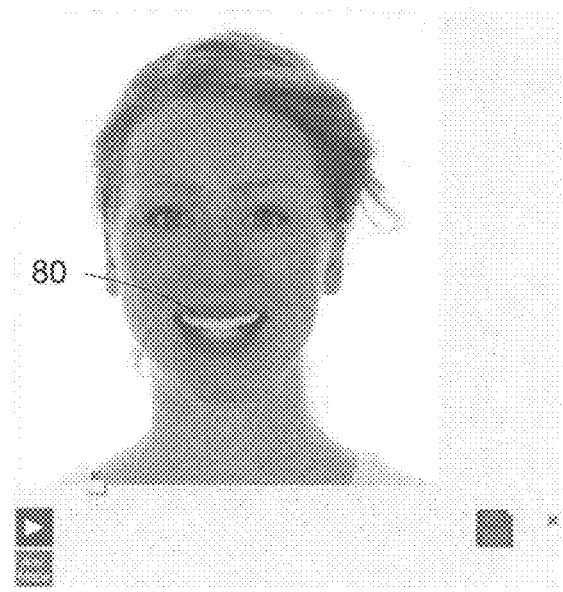
FIGS. 6A to 6C show the patient's photo image being overlaid with the scanned 3D arch model in a corresponding manner.
Figure 6B:
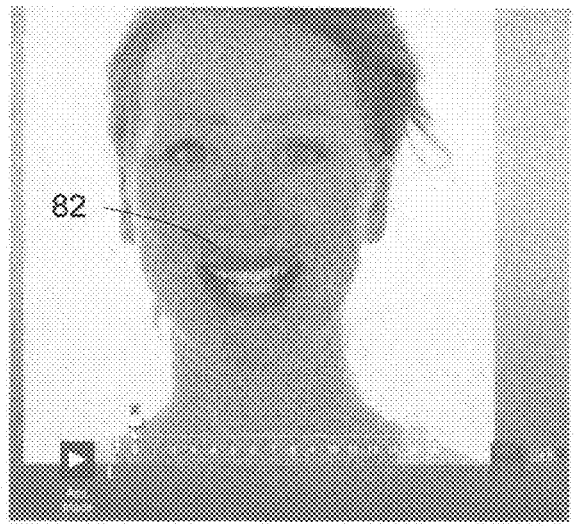
Figure 6C:
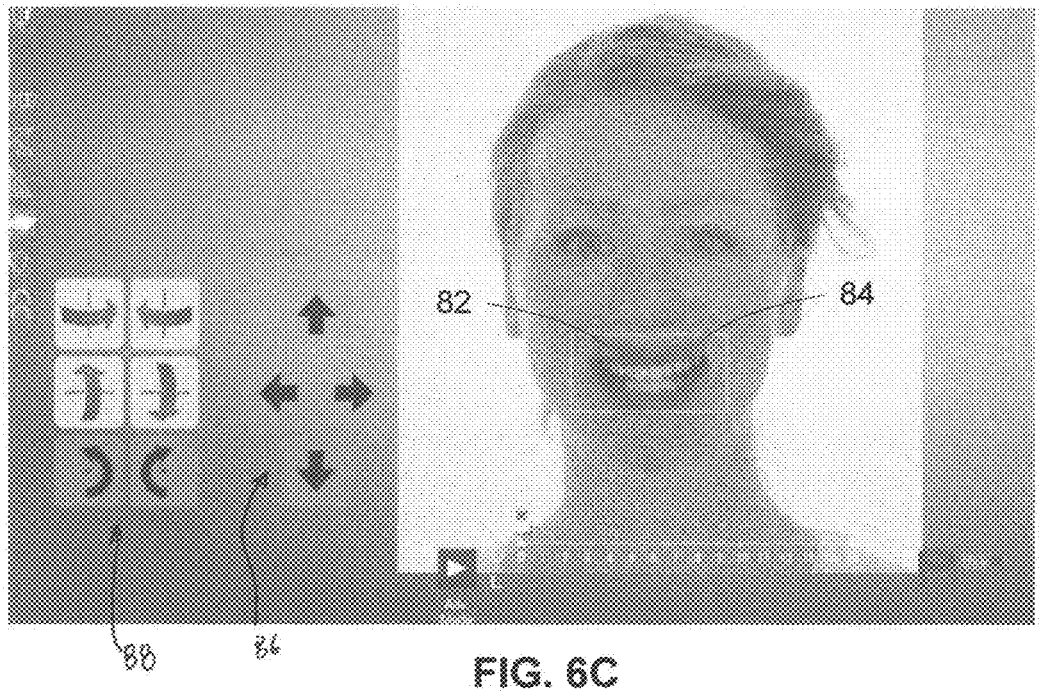

With the reference lines created upon the facial photo, the 3D arch model 80 may be imported and initially overlaid upon the facial photo, as shown in FIG. 6A, and in FIG. 6B which illustrates the 3D arch model 82 highlighted upon the facial photo. With the 3D arch model 82 initially overlaid upon the facial photo, the software may be used to highlight 84 the 3D arch model 82 and photo of the patient's teeth for registering the model 82 to the image of the teeth. Various control features may be used upon the graphical user interface to control movement of the 3D arch model 82 relative to the facial image to control fine movements of the model 82, e.g., linear 86 and angular 88 movement, as shown in FIG. 6D.

Figure 7A:
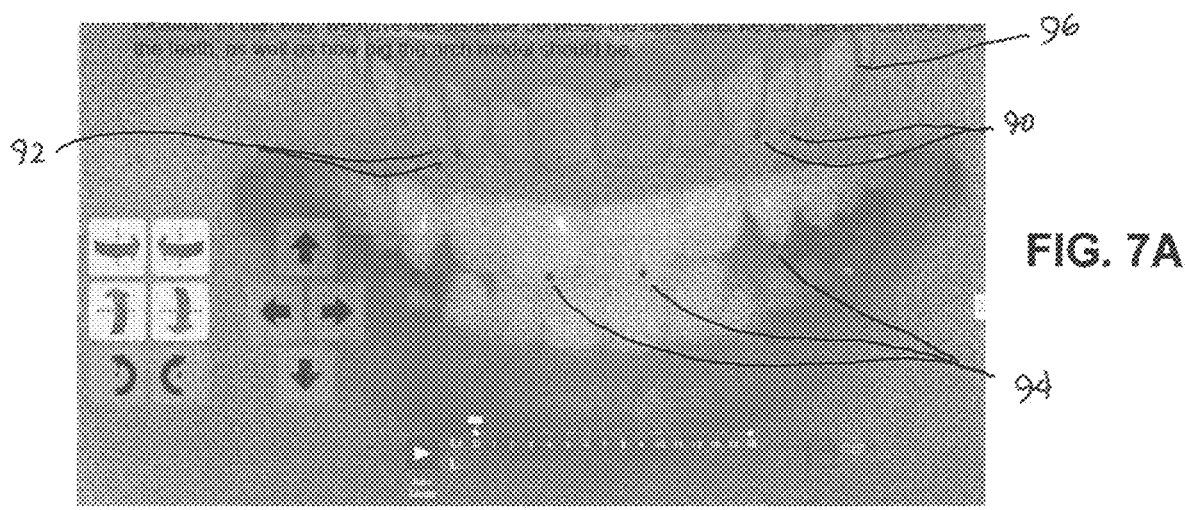
FIGS. 7A to 7C show detail images for one variation of registering the teeth from the photo image to the 3D arch model.
Figure 7B:
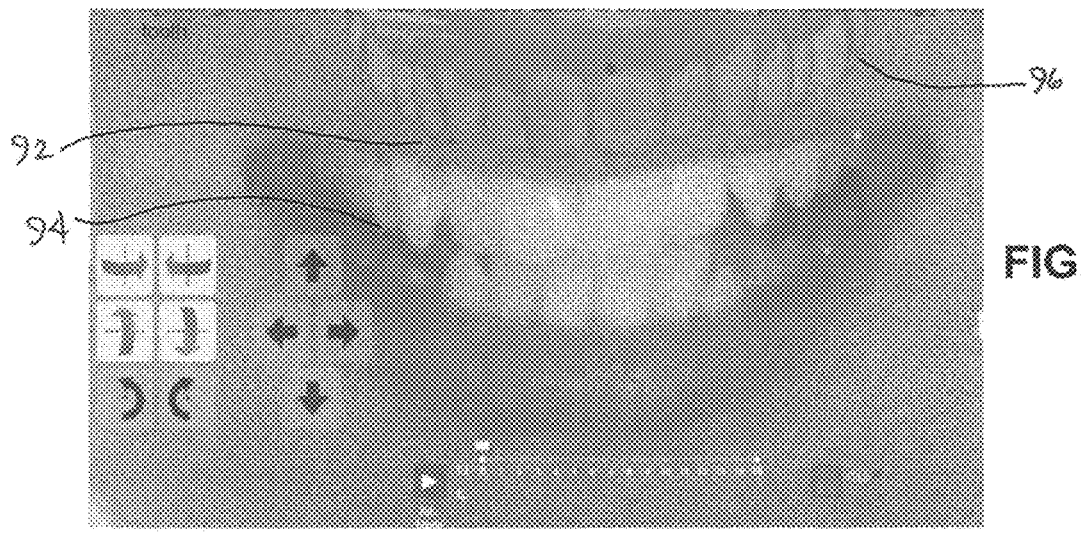
Figure 7C:
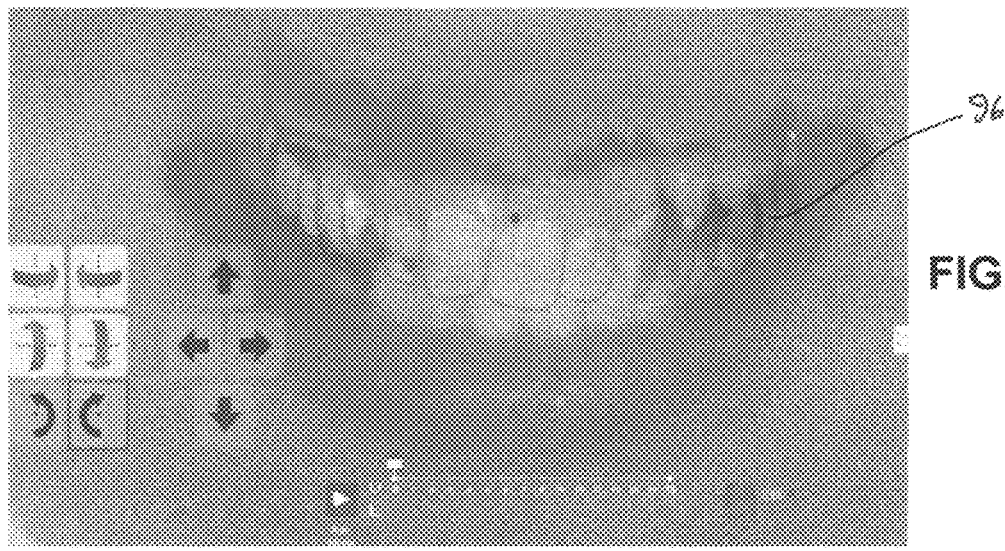

FIG. 7A shows a detail view of the highlighted region showing a detailed close-up view of the 3D arch model and the image of the patient's teeth. A calibration process for auto-matching the 3D arch model to the photo image may be implemented in one method by utilizing a number of markers (shown here as dots) which are generated by the system and placed upon various landmarks of the patient's teeth both upon the 3D arch model and the photo image. In this example, a series of six markers 90 may be automatically placed upon the 3D arch model 96 at features that are located along the line of the facial axis of the clinical crown (FACC) where the FACC line crosses an occlusal edge, e.g., tip of the incisal edge, so that the marker is located at the center of the tip of the tooth. As a first marker 90 is highlighted upon the 3D arch model 96, the user may click on a first corresponding location 94 located on the photo image in order to align the two via the markers, as shown in FIG. 7B. A second marker 92 may then be highlighted upon the 3D arch model 96 allowing for the user to then click on a second location upon the photo image. Each subsequent marker on the 3D arch model 96 may allow for the user to click on a corresponding location within the photo image so that the user is guided in locating each corresponding position. This process may be repeated for six different marks although fewer than six or greater than six markers may be used for registering the model 96 to the image. Furthermore, this registration process may be performed automatically by the system rather than manually. Additionally, the model 96 may also be rotated at various angles and/or translated, e.g., a moving step of 0.2 mm, for fine tuning purposes, as shown in FIG. 7C.

Figure 8:
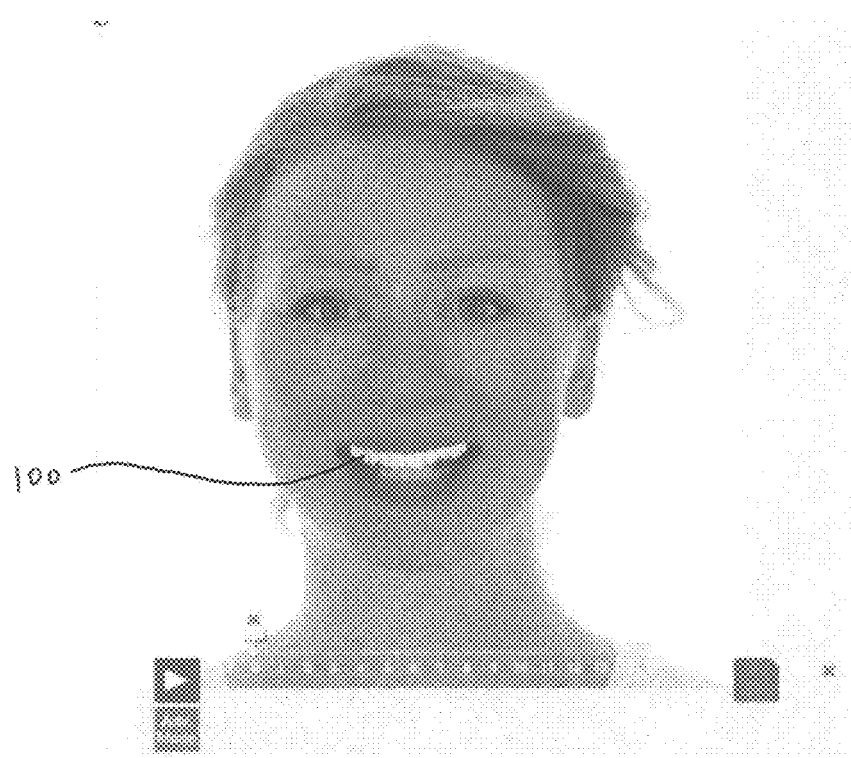
FIG. 8 shows the photo image of the patient with the 3D arch model replacing the photo image of the patient's teeth.

Once the registration has been completed, the system may then replace the photo image with the 3D arch model in the facial image of the patient, as shown in FIG. 8. In this example, the 3D arch model 100 is shown in place of the upper arch of the patient upon the facial image. In other variations, both the upper and lower arches may be utilized or just the lower arch instead may be used.

Figure 9A:
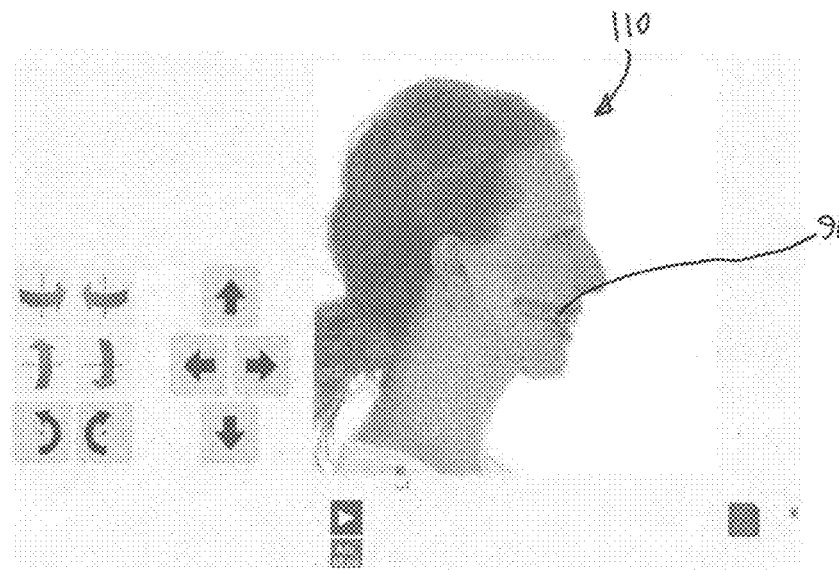
FIGS. 9A to 9C show profile images of one variation of registering the teeth from the patient's profile photo image to the 3D arch model.
Figure 9B:
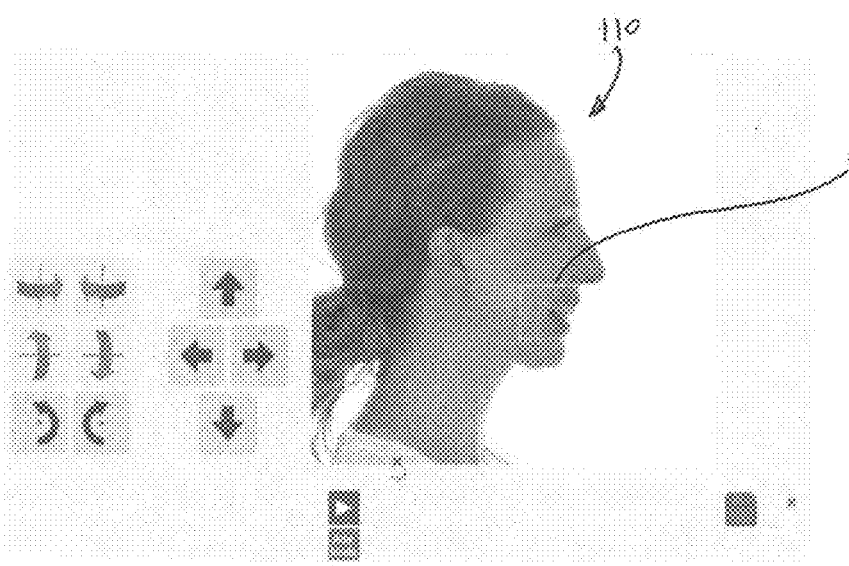
Figure 9C:
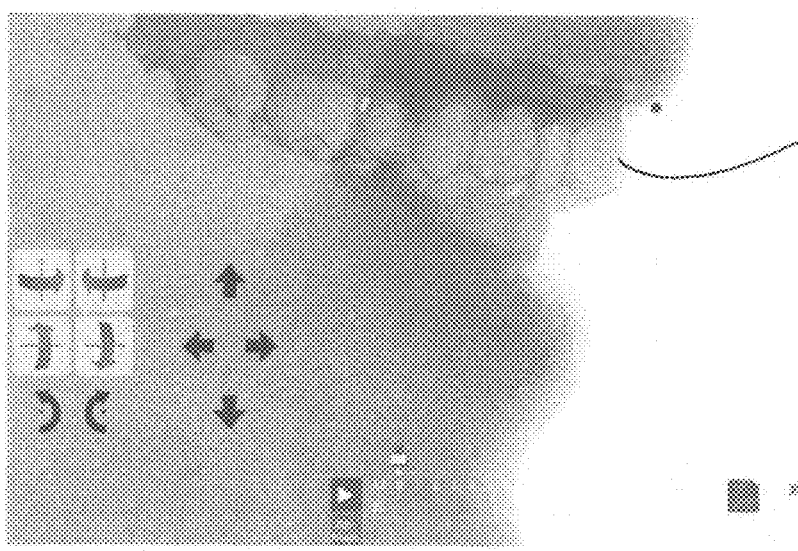

Once the front view of the 3D arch model 96 has been registered to the front view of the facial image, the profile view may also be registered as well, as shown in the profile images 110 of FIG. 9A. FIG. 9B shows the profile view where the model 96 and profile facial image is highlighted 98. FIG. 9C shows the detailed highlighted image showing the arch model 96 superimposed upon the profile image where the arch model 96 may be adjusted by translation and/or rotation to adjust the positioning of the model 96 relative to the profile image. For the profile view, since the key point information is relatively fewer, the use of registration markers may be optionally omitted so that the user may manually adjust a position of the model 96 to match for the profile view.

Figure 10A:
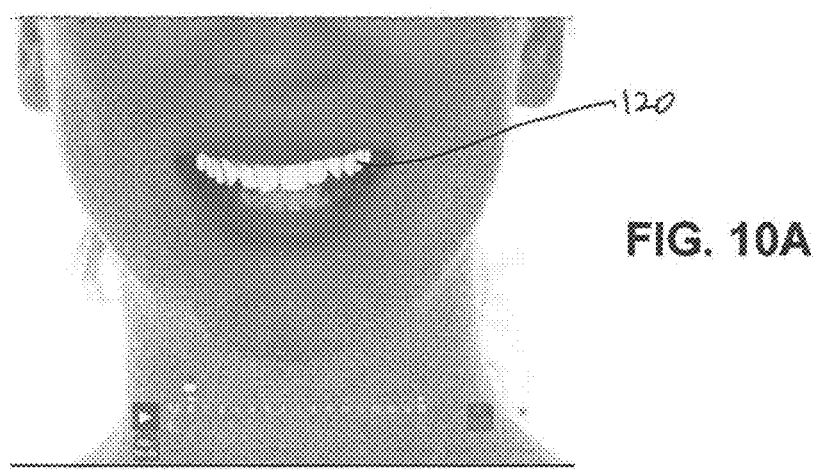
FIGS. 10A to 10C show various images of the patient image having the color of the teeth in the 3D arch model (here shown in the upper dentition) adjusted to match the color of the patient's actual teeth color.
Figure 10B:
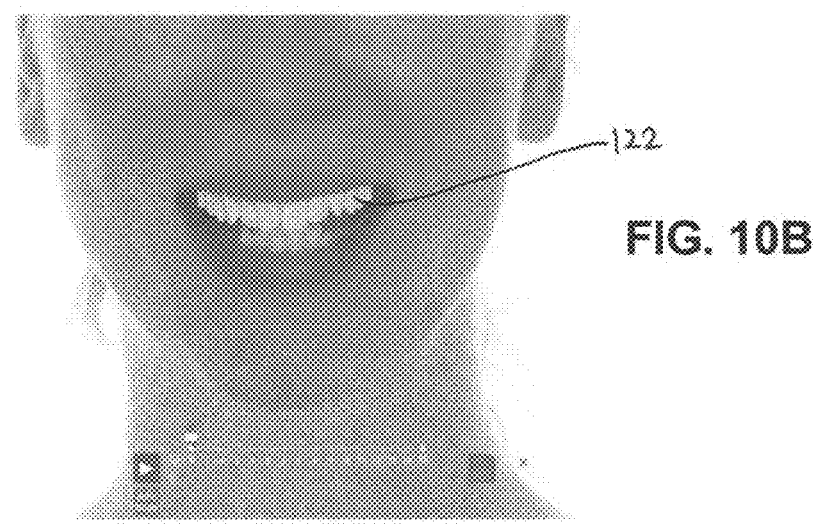
Figure 10C:
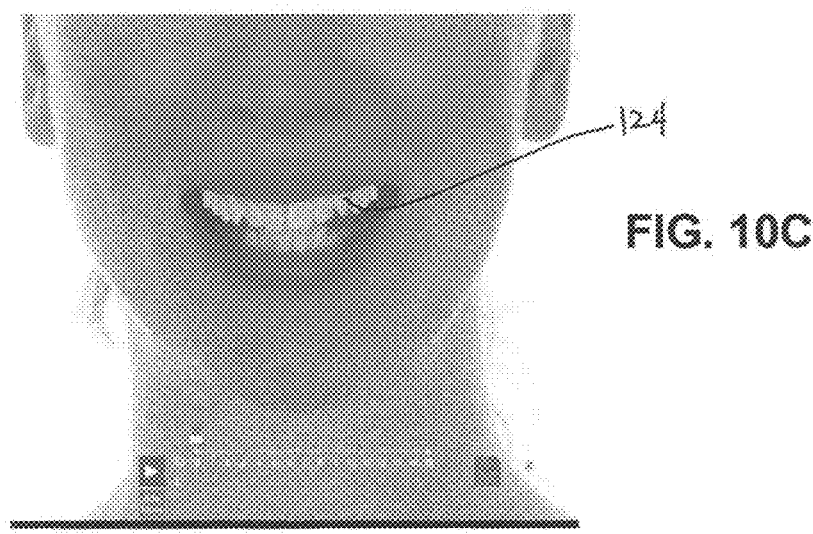

Once the registration has been completed so that the arch model is registered to the image of the teeth and the image has been replaced with the arch model, the color of the arch model may not match the actual color the patient's teeth. FIG. 10A shows a front image where the arch model has replaced the teeth image and where the arch model is shown with an initial color 120. The user may then select the color from the photo image and apply that color 122 onto the 3D arch model, as shown in FIG. 10B. Additionally and/or alternatively, the color 124 may be further adjusted to be darker or brighter depending upon the desired resulting image, as shown in FIG. 10C.

Figure 11:
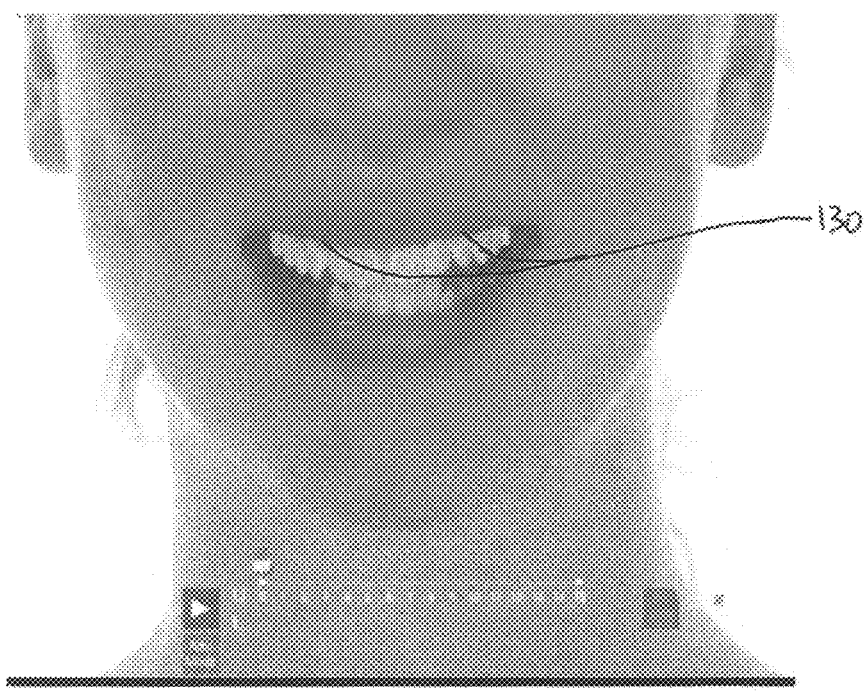
FIG. 11 shows an image of the patient having the color of the gums in the 3D arch model adjusted to match the color of the patient's actual gums.

Aside from adjusting the color of the teeth, the color of the gums on the 3D arch model may similarly be adjusted. FIG. 11 illustrates how the color of the gums from the facial image may be applied upon the gums 130 of the arch model to result in a realistic image of the patient with the 3D arch model shown. Global color adjustments may also be done in the event the practitioner wants to view the gums and teeth in their unadjusted color as different viewing platforms (e.g., different monitors, screens, etc.) may present slightly different colors. Such a global setting may enable the practitioner to select certain colors from the software including, for example, (1) darker/brighter/warmer/colder colors, (2) standard teeth and gum shades, (3) RGB values to keep the color correctly for a particular monitor or screen by calibrating the monitor or screen so that future cases are consistent, etc.

Figure 12:
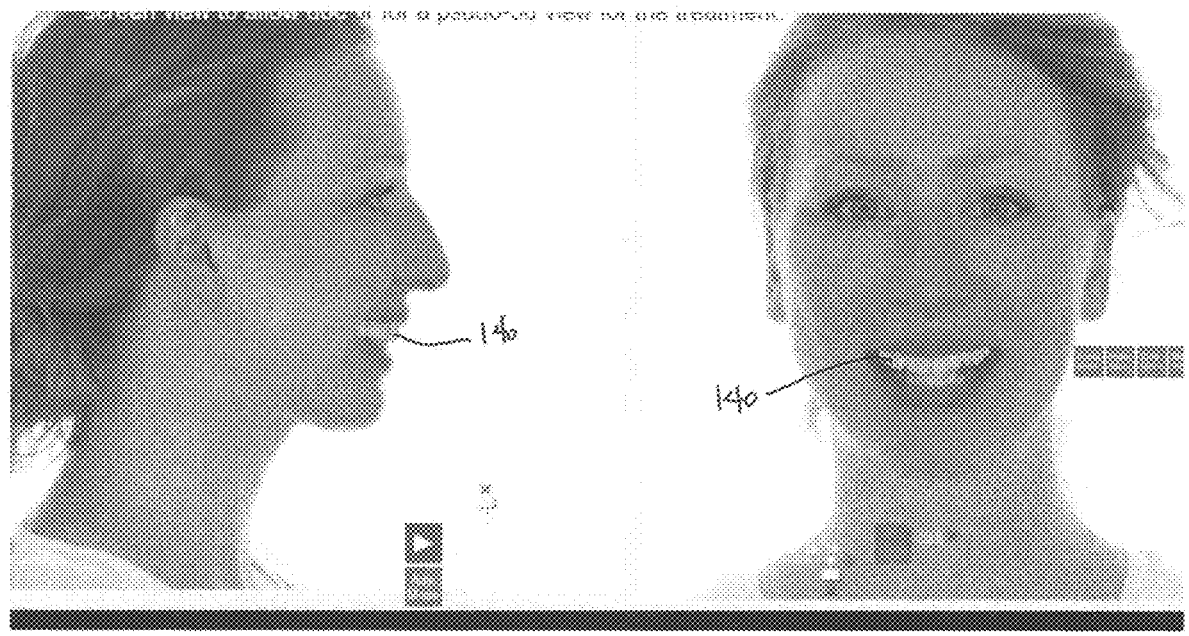
FIG. 12 shows an image of the patient's corrected teeth applied to the photo image.

With the positioning and registration of the arch model matched to the facial image and with the color of the teeth and gums of the arch model also matched and corrected, the matched 3D arch model 140 may be presented in the facial image and profile image, as shown in FIG. 12.

Figure 13:
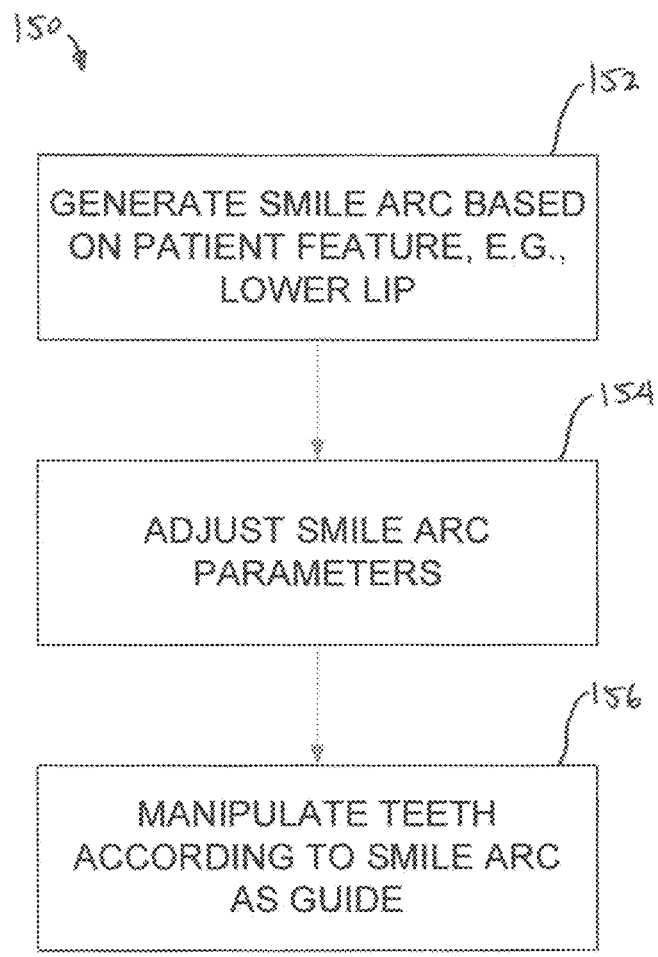
FIG. 13 shows a flow diagram of one variation of a method for adjusting a patient's smile using a smile arc.

Additional parameters of the 3D arch model may be adjusted to alter various features of the model to improve aesthetic features of the patient's smile. One method for adjusting aesthetic features may incorporate the use of a curve or arc which is generated from parameters of the patient's smile to create a "smile arc". FIG. 13 shows a flow diagram 150 for a process where the smile arc may be initially generated based upon patient features such as the curve or arc of the patient's lower lip when they smile 152. The parameters of the smile arc may be adjusted 154 and the teeth of the patient (as well as other anatomical features) may be manipulated according to the smile arc being used as a guide 156 for adjusting or improving the patient's smile.

Figure 14A:
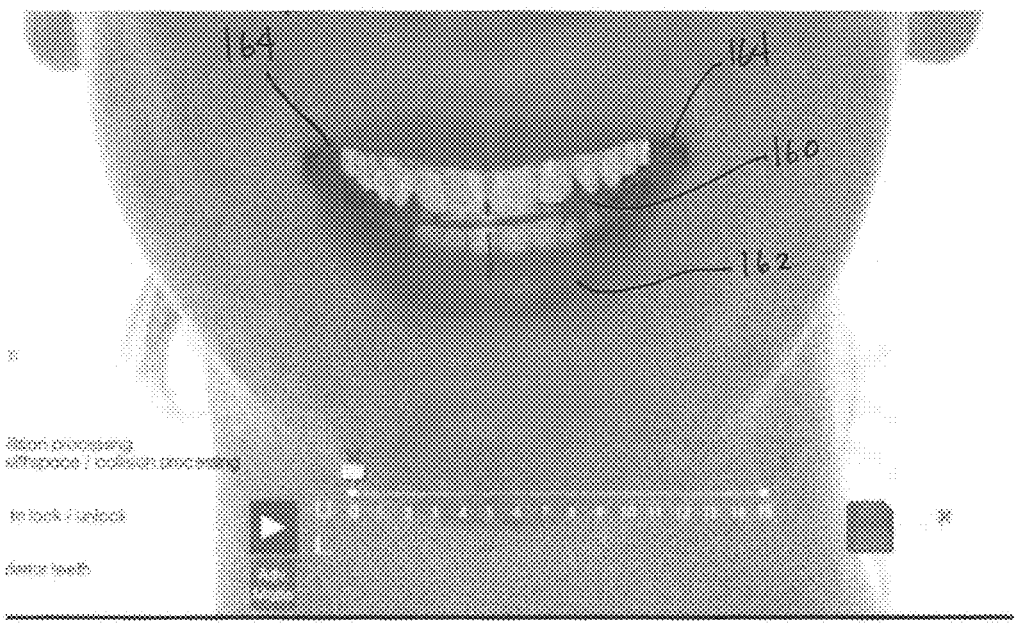
FIGS. 14A and 14B show how a smile arc is generated and adjusted for use in optimizing the patient's smile.

FIG. 14A shows a front facial image of the patient where the generated smile arc 160 is superimposed upon the 3D arch model of the facial image. The smile arc 160 may be formed to have, e.g., five control points or locations 164, which may be adjusted and moved to allow for the curvature of the smile arc 160 to be changed. The initial curvature of the smile arc 160 may be obtained from the curvature of, e.g., the patient's lower lip 162, in order to be used as a guide for having the teeth follow the curvature of the lower lip to enhance the smile. The smile arc 160 can be viewed with or without the frontal image depending upon the preference of the user. The control points 164 may be moved simultaneously together or individually in order to create a symmetrical smile arc 160 or asymmetrical smile arc 160 based on the shape of the lower lip 162 and the user's preferences.

Figure 14B:
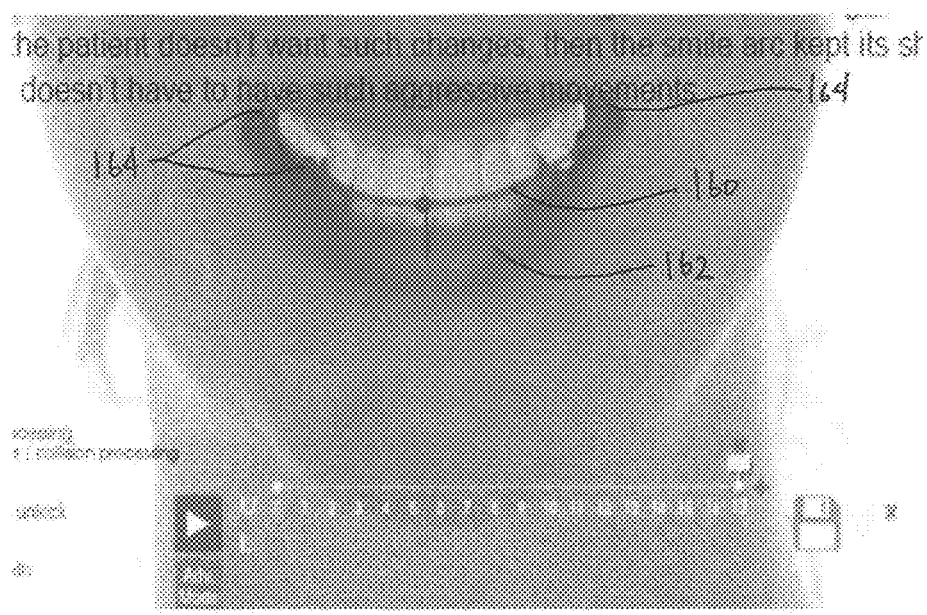

As shown in the image of FIG. 14B, the smile arc 160 may also be adjusted to move upward or downward relative to the patient's lower lip 162. As the smile arc 160 is translated, the teeth shown in the arch model may be correlated automatically (for example, via a single click, to follow a function which allows the teeth to directly move to where the smile arc is located) or manually to follow the location of the smile arc 160, e.g., by having the tips of the teeth (or individual tooth) as well as the FACC lines being used as the indicator for the follow function to allow for the teeth movement. Also, the entire smile arc 160 may be moved upwards and/or downwards while maintaining its curvature unchanged. This may allow for the user to adjust the treatment plan because while the digital tooth movements may appear to be achievable, some or all of the of the teeth may not be movable clinically over the digitally specified long distances; furthermore, the gums may need to be reshaped which the patient may or may not wish to have done. Hence, maintaining a curvature of the smile arc 160 during its adjustment may allow for the smile arc to keep its shape for the smile without having to utilize such aggressive movements.

Figure 15A:
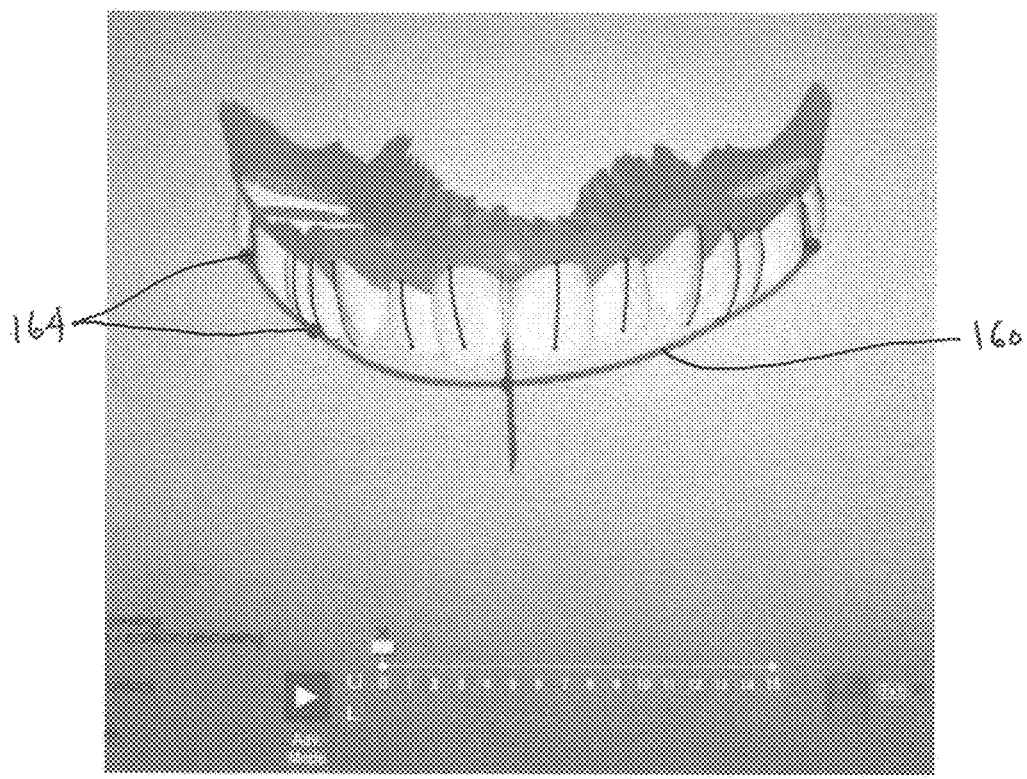
FIGS. 15A and 15B show an example of how the smile arc may be used for implementing brackets.
Figure 15B:
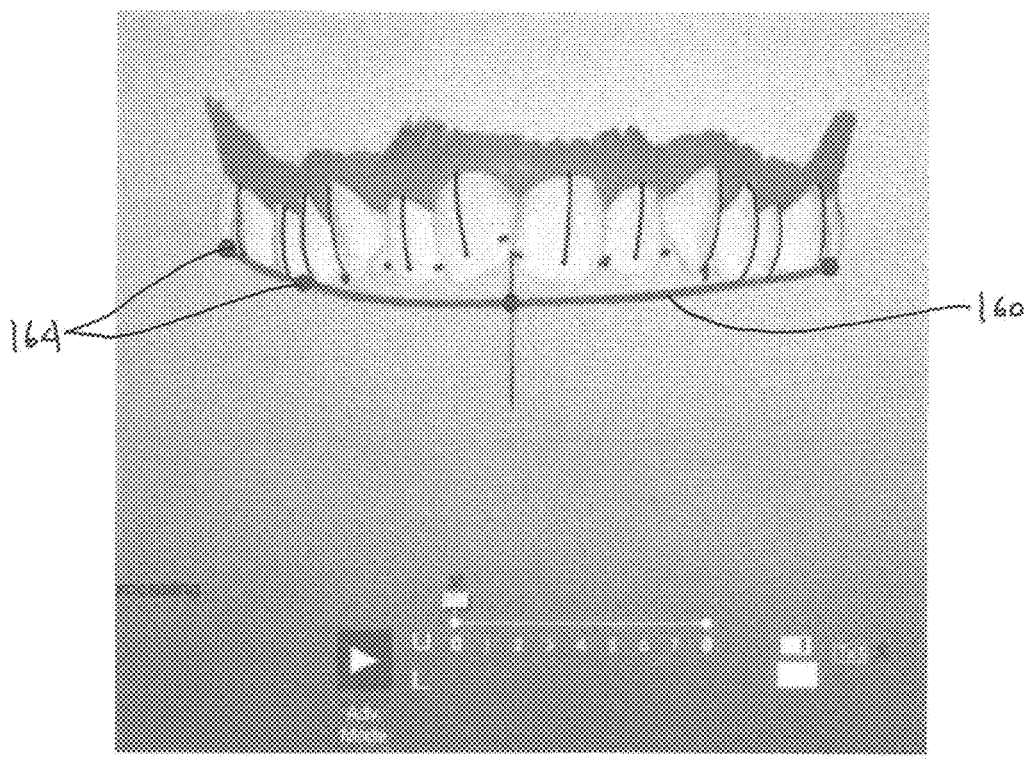

In some cases where the treatment may utilize the use of brackets rather than aligners to effect the tooth movements, the smile arc 160 may still be used as a guide for following the patient's smile. FIGS. 15A and 15B show an example where the 3D arch model may still incorporate the smile arc 160 while preparing the 3D arch model for use with an indirect bonding tray (IDB) for the application of one or more brackets to the teeth.

Figure 16A:
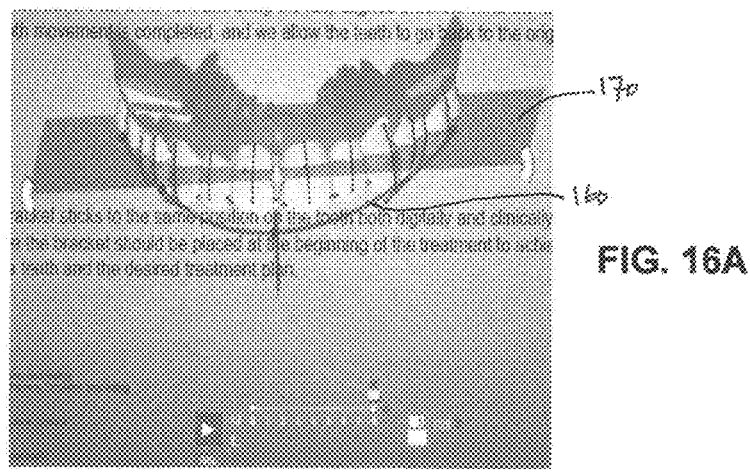
FIGS. 16A to 16D show perspective images of a wire plane positioned and superimposed through the 3D arch model with the position of the teeth corrected where it can be adjusted to function as a guide for the placement of brackets and the wire.

A plane 170 may be introduced into a 3D arch model which shows a final position of the corrected teeth after a bracket treatment to illustrate where the one or more brackets should be placed upon the teeth, as shown in the perspective view of FIG. 16A. This plane 170 may represent a position of the brackets upon the teeth because as the correction treatment nears completion and the teeth are adjusted to their desired positions, the plane 170 may function as a guide for bracket positioning to remain in an aligned position relative to one another as the bracket wire will become straightened near the end of a correction treatment.

Digitally, a treatment may be planned to bring the fully aligned brackets on to the final stage where the teeth movements are completed. The teeth may then be digitally reverted back to their original pre-treatment positions to enable the user to see where the bracket should be placed at the outset of the treatment to achieve the final position of the teeth and the desired treatment plan.

Figure 16B:
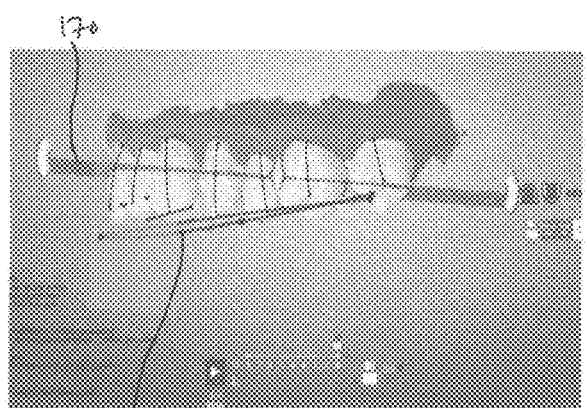
Figure 16C:
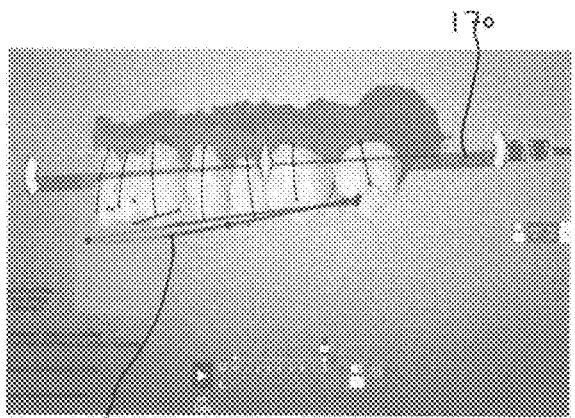
Figure 16D:
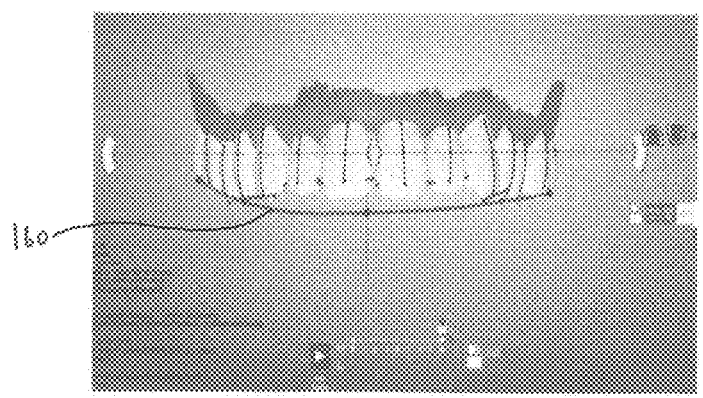
Figure 17A:
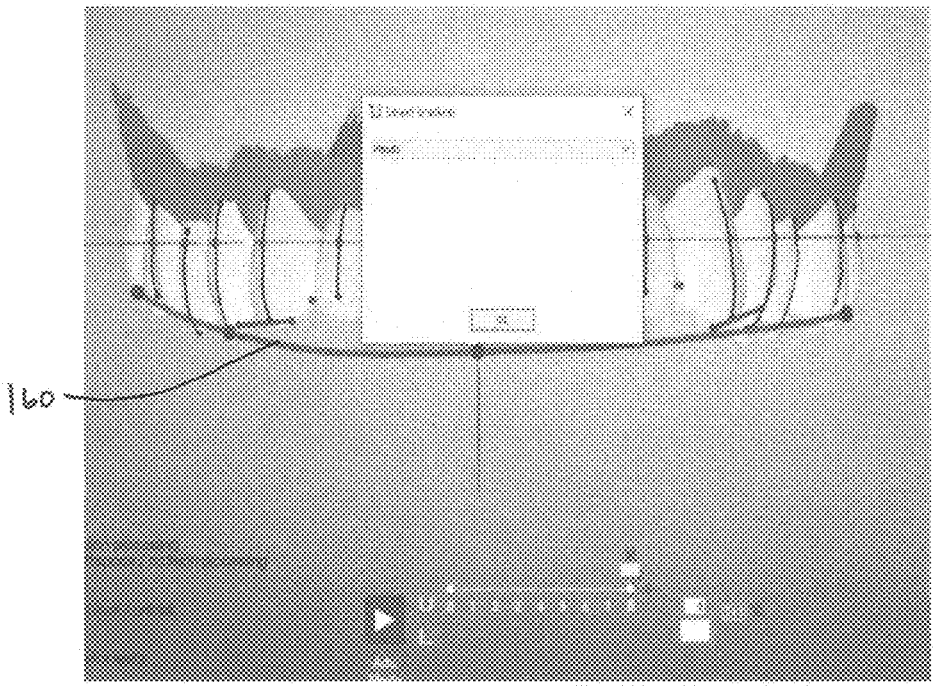
FIGS. 17A and 17B show front views of the corrected 3D arch model with the brackets applied.
Figure 17B:
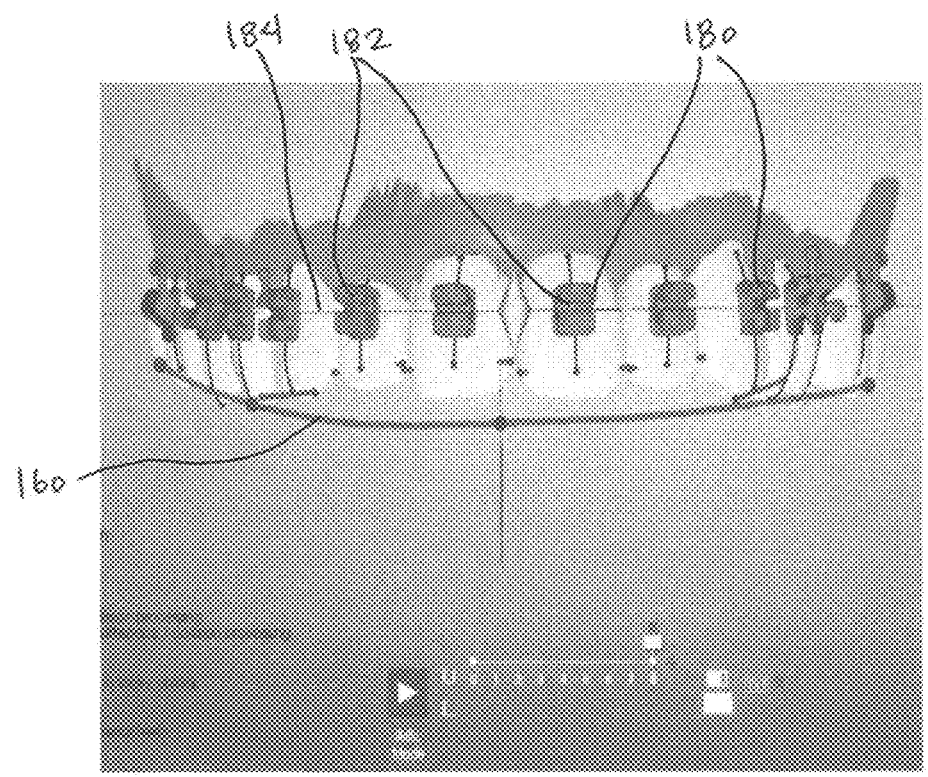

As further illustrated, the plane 170 may be adjusted through rotation relative to the 3D arch model, as shown in FIG. 16B, or the plane may be adjusted by a linear movement relative to the 3D arch model, as shown in FIG. 16C. Once any adjustments of the plane 170 have been completed, rotation of the 3D arch model back to its front view may show the plane 170 aligned in a horizontal orientation, as shown in FIG. 16D. With the plane 170 suitably positioned, models of the brackets 180 may be applied digitally along the plane 170 and upon the teeth such that the wire receiving slot 182 of each bracket 180 is aligned with the plane 170, as shown in FIGS. 17A and 17B, so as to accommodate the arch wire 184 which also becomes aligned with the plane 170 at the completion of the bracket treatment.

Figure 18A:
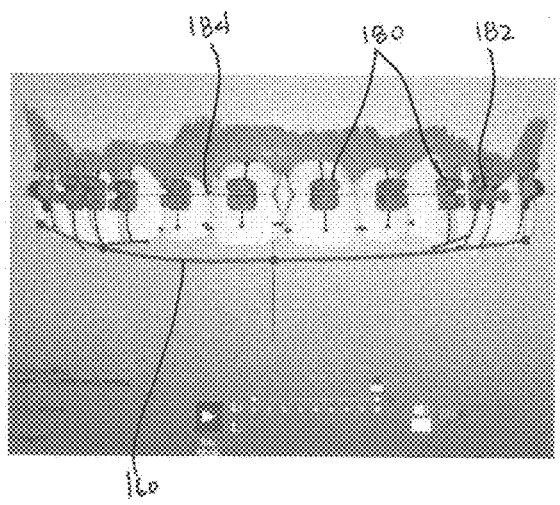
FIGS. 18A to 18D show front views of the corrected 3D arch model and the initial positioning of the teeth prior to correction to view the location of the brackets and wire.
Figure 18B:
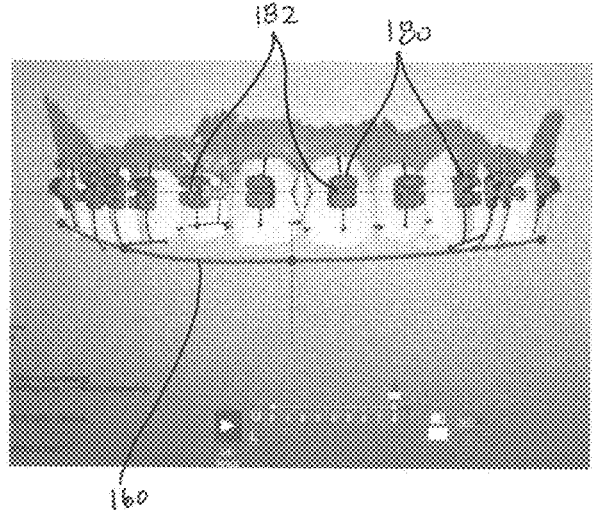

With the brackets 180 superimposed upon the 3D arch model, a distance from the pocket to the gumline and the distance from the pocket to the incisal edge may be measured, as indicated in FIGS. 18A and 18B, in order to allow for the user to check and follow the guide for bracket placement. The brackets 180 can also be moved freely when selected.

Figure 18C:
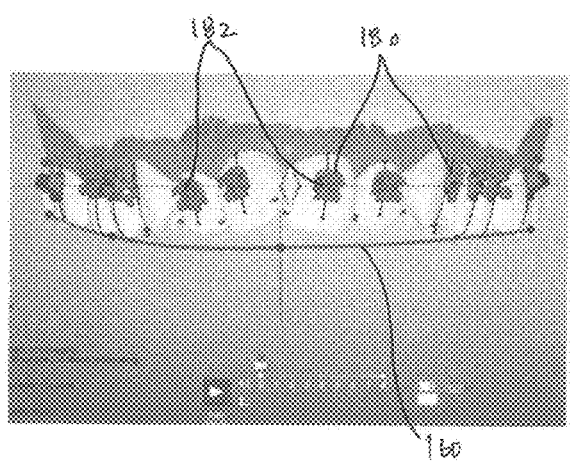
Figure 18D:
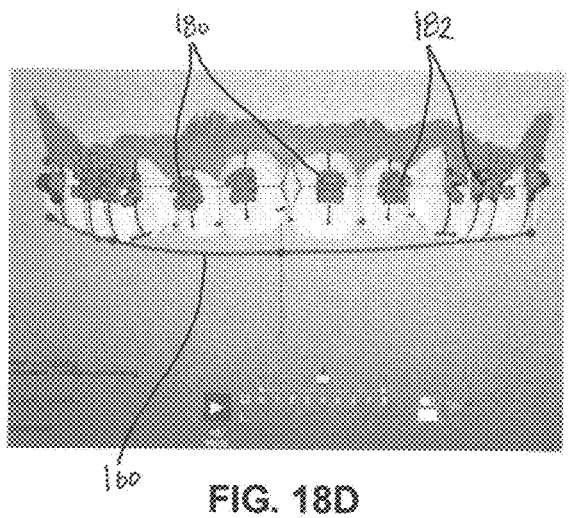

When the 3D arch model is reverted back to the initial pre-treatment stage, as shown in FIGS. 18C and 18D, the brackets 180 can be seen in their pre-treatment position for mounting upon the teeth. This may allow for the arch wire to be coupled through the wire receiving slot of each bracket for treatment.

Figure 19:
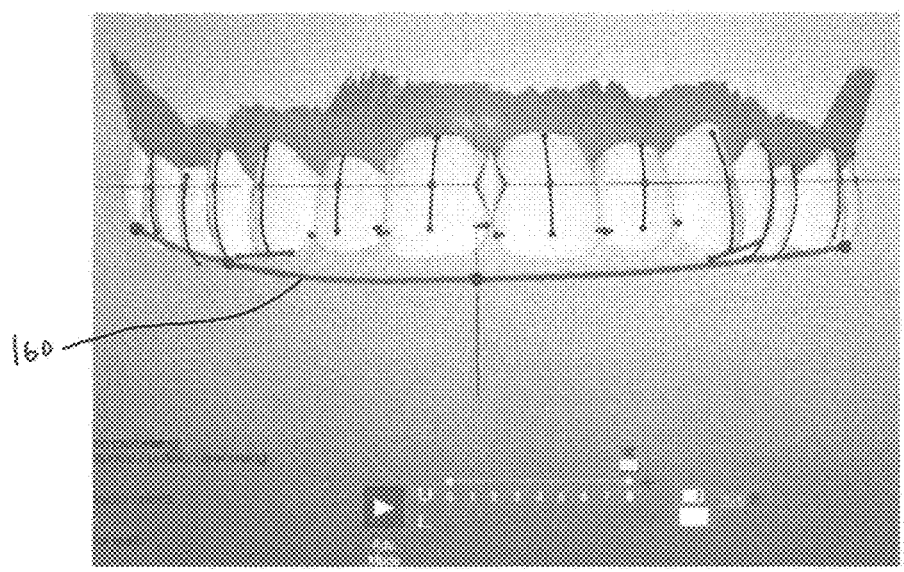
FIG. 19 shows a front view of the 3D arch model in which a position of the smile arc is adjustable depending upon any anatomical limitations.

Along with the positioning of the brackets, the smile arc 160 may also adjusted as well, as shown in the front view of FIG. 19, as there may be occasions where the bracket cannot be placed clinically at the desired position because of a tooth which is too small or a region of the gums which interfere. The 3D arch model could indicate that bracket is to be placed on the gums if the tooth or gum is not modified. For instance, a tooth may require lengthening with, e.g., a composite resin, or the gum may need to be shaved short to accommodate a bracket. In such a case, the smile arc 160 may be adjusted by moving the arc 160 upwards or downwards while still maintaining the same curvature to achieve the same smile.

Figure 20:
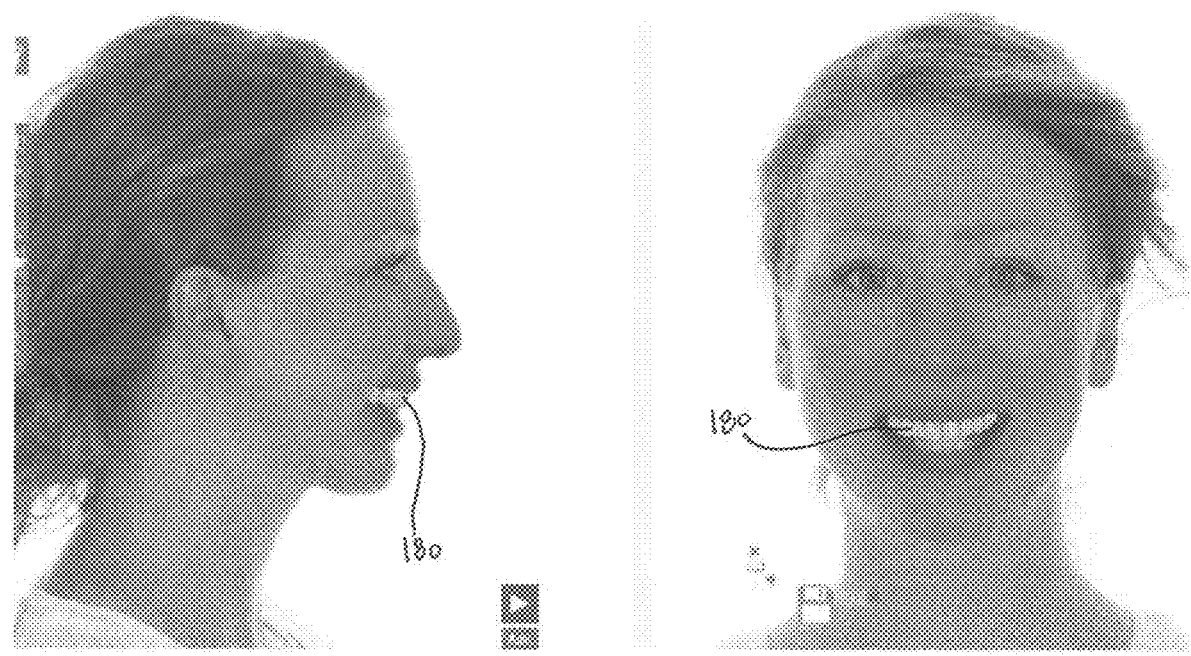
FIG. 20 shows images of the patient having the brackets superimposed upon the 3D arch model.

With the addition to the brackets to the 3D arch model, the facial images of the patient with the arch model incorporated may be updated to include the brackets 180, as shown in FIG. 20. The modified image may then be presented to the patient for evaluation.

Figure 21A:
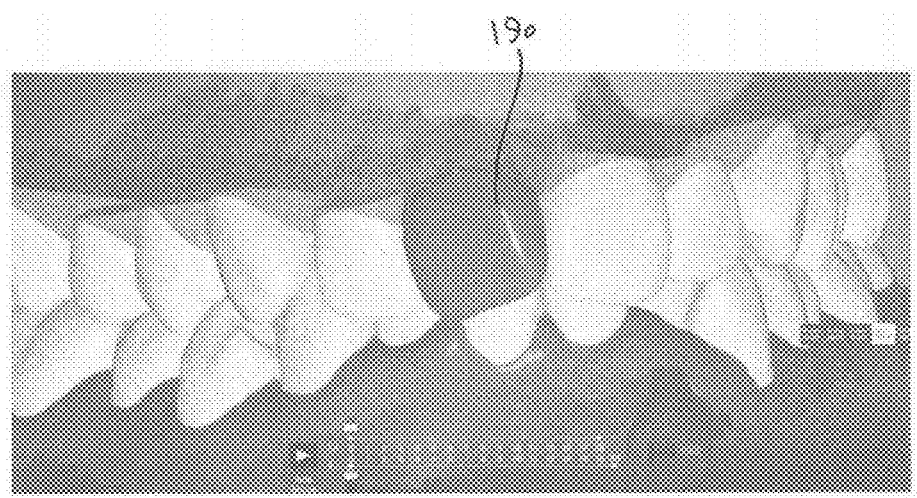
FIGS. 21A and 21B show perspective views to illustrate where the gum line can be adjusted to allow for bracket placement or teeth movement.
Figure 21B:
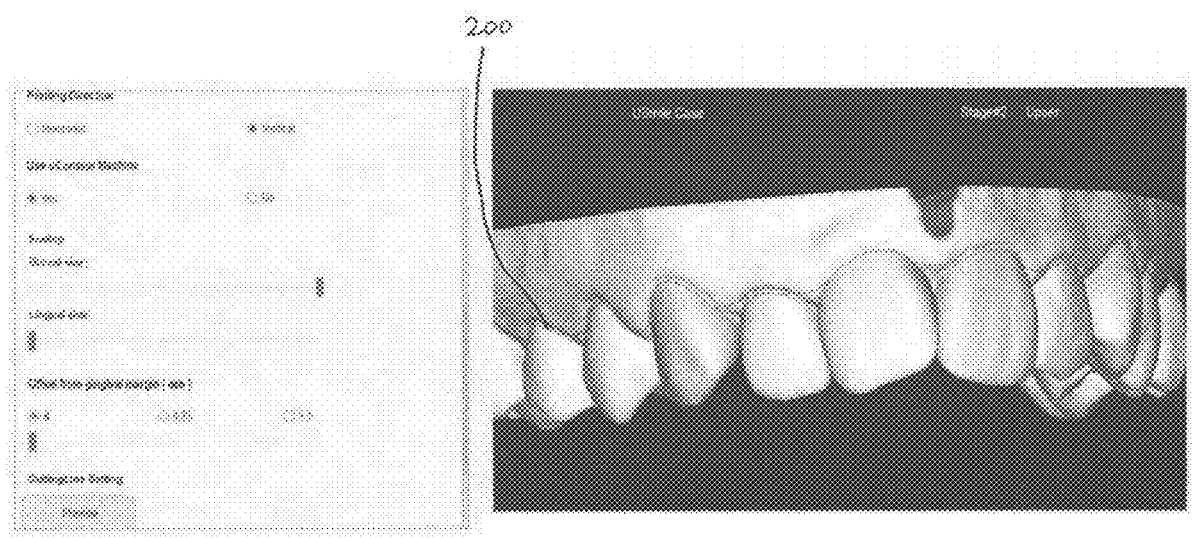

In the event that the gums may need clinical adjustment, the gum line 190 may be adjusted on the 3D arch model, as shown in FIG. 21A, to mimic what the practitioner can potentially do with respect to, e.g., trimming the gums or applying a patch onto the gums to lengthen it. These results may be reflected in the arch model for presentation to the patient to show the patient what the expected clinical results may look like. A physical device can be fabricated for clinical use of gum adjustment reference. With the gum line being adjusted, a clear aligner can be printed where the gum line can denote the cutting line 200 of the aligner edge, as shown in FIG. 21B. The cutting line 200 for such an aligner may be adjusted by the user.

Figure 22A:
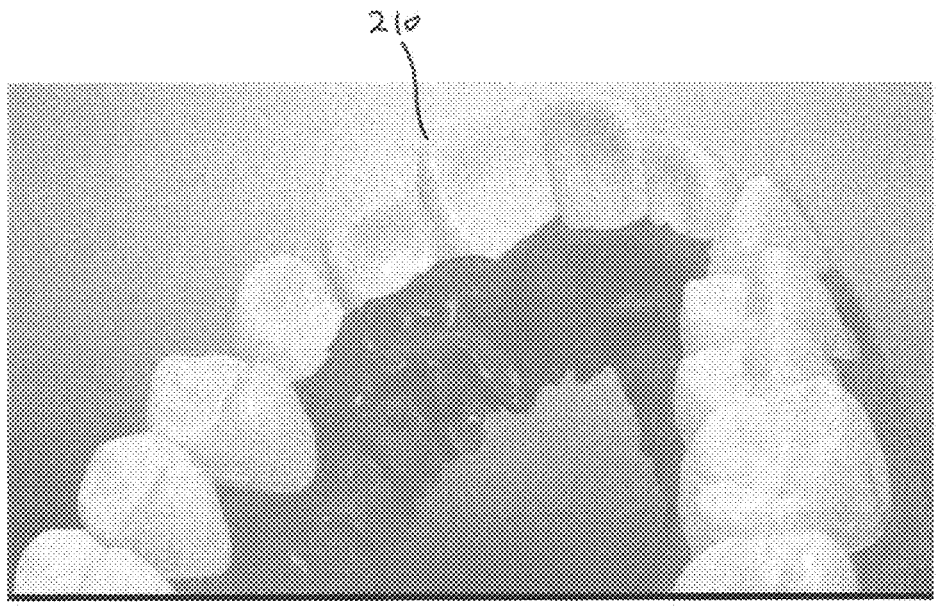
FIGS. 22A and 22B show perspective views of another feature where the length or height of the teeth may be adjusted digitally.
Figure 22B:
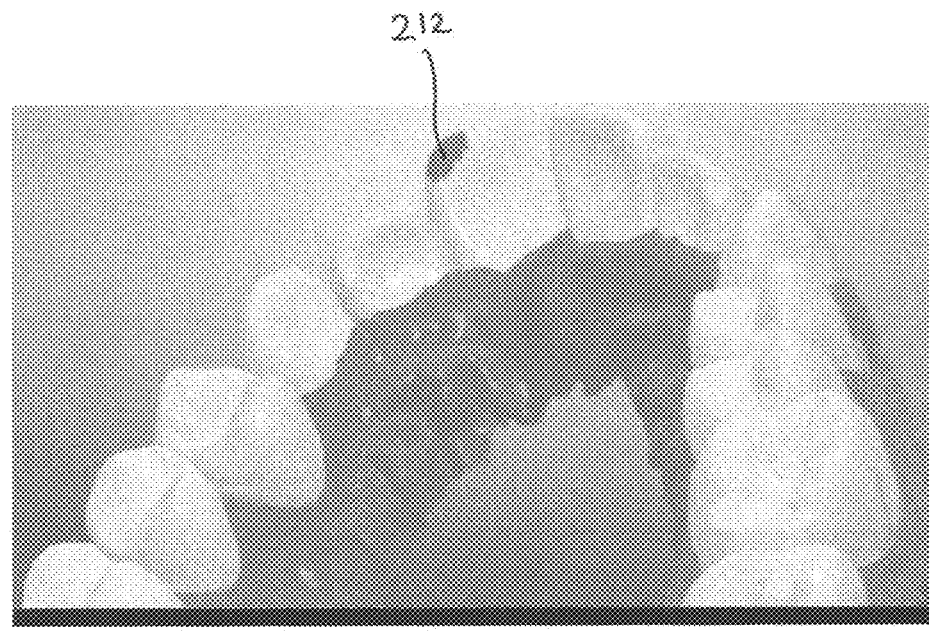

In the event that a tooth or several teeth may need clinical adjustment, such as lengthening or reduction, another module may be introduced for adding geometry onto an identified tooth. As shown in the perspective view of FIG. 22A, the identified tooth 210 for lengthening is shown and the region 212 for lengthening is digitally identified as shown in FIG. 22B.

Figure 23A:
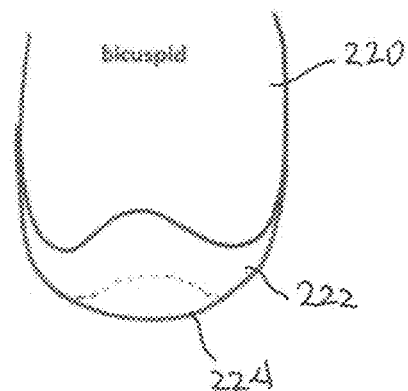
FIGS. 23A to 23D show various views of how a tooth or multiple teeth may have its length of height adjusted.

One example for lengthening a single tooth 220, such as a bicuspid, is illustrated showing how the composite material 222 may be applied upon the tooth 220 to lengthen it. A portion 224 of the added material may be removed, e.g., shaved down, to mimic a natural tooth, as shown in the front view of FIG. 23A.

Figure 23B:
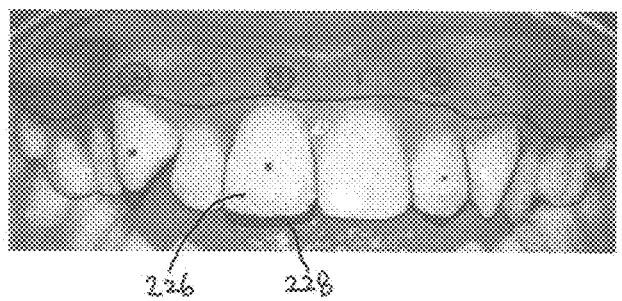
Figure 23C:
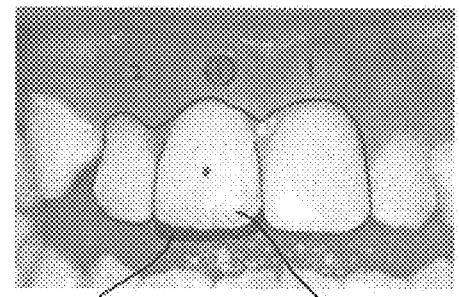

In the event that several teeth are to be lengthened, a mold such as an aligner-shaped device may be applied to the teeth. FIGS. 23B and 23C show front views of an example where several teeth are to be lengthened with bonded composite 228 adhered via a bonding agent 226 to the natural teeth. The shape of the mold with respect to the lengthened portions may be fabricated based upon the identified teeth and the shape of the extended teeth.

Figure 23D:
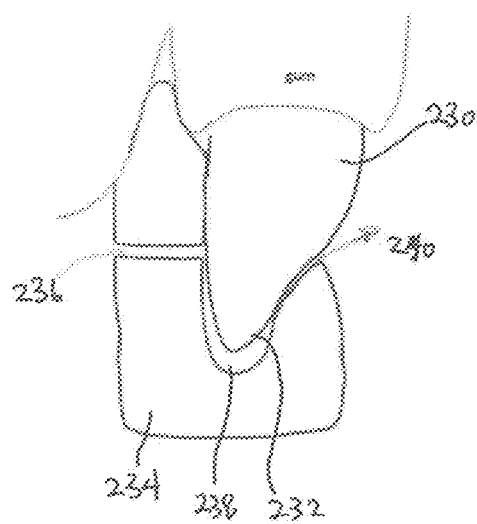

FIG. 23D shows a side view of one variation of such a mold which may have a mold body 234 which is configured for placement over the teeth pre-treatment. The portion of the surface 232 to be extended for each respective tooth may be received into a molding channel 238 which is configured to have a shape corresponding to the lengthened portion of the tooth. The material, such as a composite resin in liquid form, may be introduced (e.g., up to 1 cc or more) into the mold through an opening 236 so that the resin enters into the molding channel 238 to form upon the tooth 232. The excess liquid may exit the molding channel 238 through an opening 240 located on an opposite side of the opening 236. The amount of material which is lengthened can be varied, e.g., anywhere up to 10 mm, while the amount of material physically removed can also be varied as well.

Figure 24:
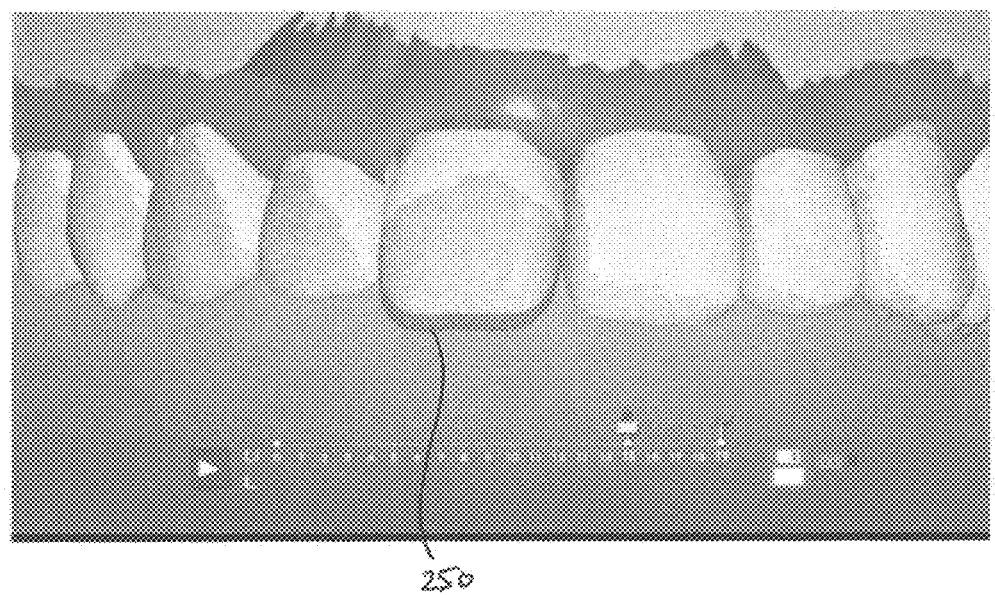
FIG. 24 shows a front view of the 3D arch model to illustrate how a physical device such as an aligner can be used to determine the length to which a tooth or teeth may be adjusted.
Figure 25:
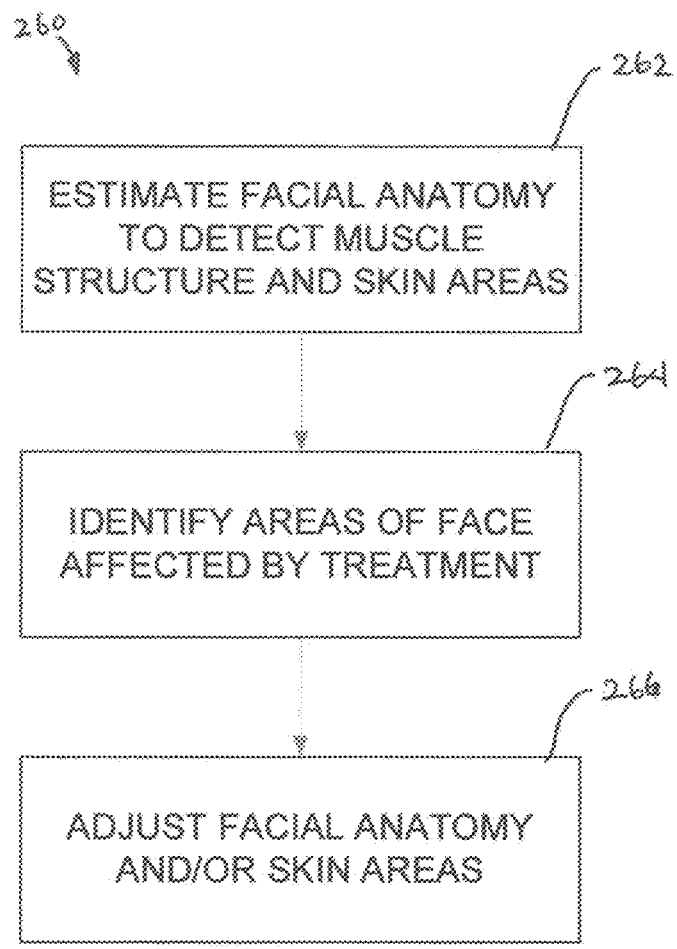
FIG. 25 shows a flow diagram of one variation of a method for adjusting various facial anatomy features.

In addition to lengthening the teeth, another aligner-like device may be used for removing a portion of a tooth or several teeth. The aligner-like device may be fabricated with a portion of the aligner removed corresponding to the region of the tooth to be removed. FIG. 24 shows a front view of the 3D arch model illustrating a portion 250 of a tooth to be removed. The exposed portion 250 of the tooth projecting from the aligner opening may be used as a reference guide to the user for removing this excess portion of the tooth.

Figure 26A:
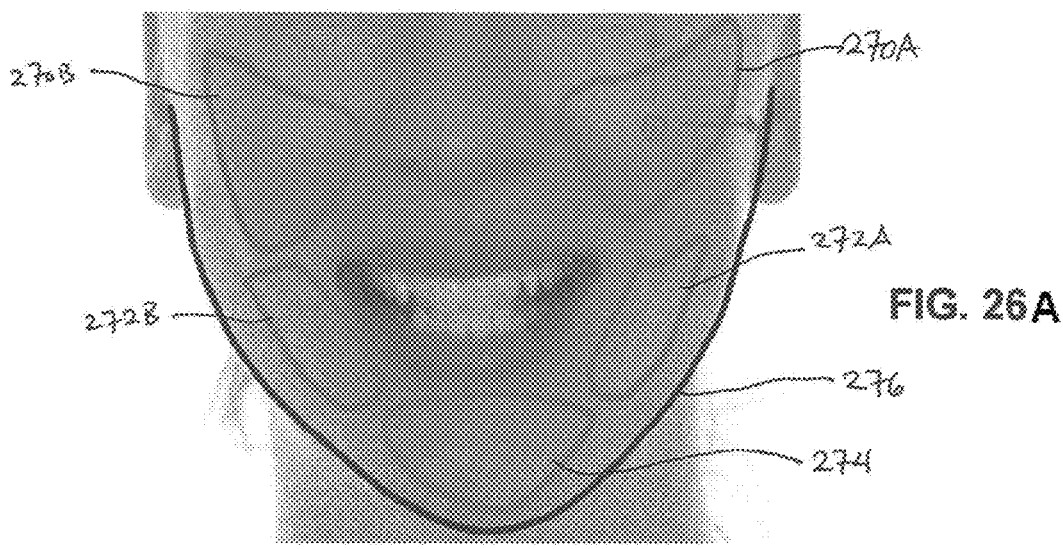
FIG. 26A shows a front view of the patient image illustrating the various areas of the patient face which may be adjustable by the software to account for changing facial anatomy when the tooth or teeth are corrected.

Aside from the tooth extension or removal, yet another feature of the smile optimization process may include the adjustment of one or more facial features from the facial image. After the course of a correction treatment, the movement of one or more teeth may alter a number of facial features due to the repositioning of the underlying muscles and/or skin. The resulting smile of the patient may accordingly differ as well. FIG. 26A shows a flow diagram 260 of one method for digitally adjusting the facial anatomy on the facial images to produce an image of the patient's smile which accurately represents the resulting smile. The facial anatomy may be estimated to detect the muscle structures and skin areas 262. Once estimated, the areas of the face likely to be affected by the correction treatment are identified 264. The facial anatomy and/or skin areas may then be adjusted 266 either automatically by the software or manually by the user upon the facial images.

FIG. 26A shows a facial image, as described above, where the software may be used to estimate the facial anatomy by detecting muscle structures and skin areas such as the cheeks 270A, 270B, the regions adjacent to the mouth such as the perioral regions 272A, 272B, and the chin 274. The jawline 274 may also be identified and estimated as well. Other regions around the face may also be identified and estimated.

Figure 26B:
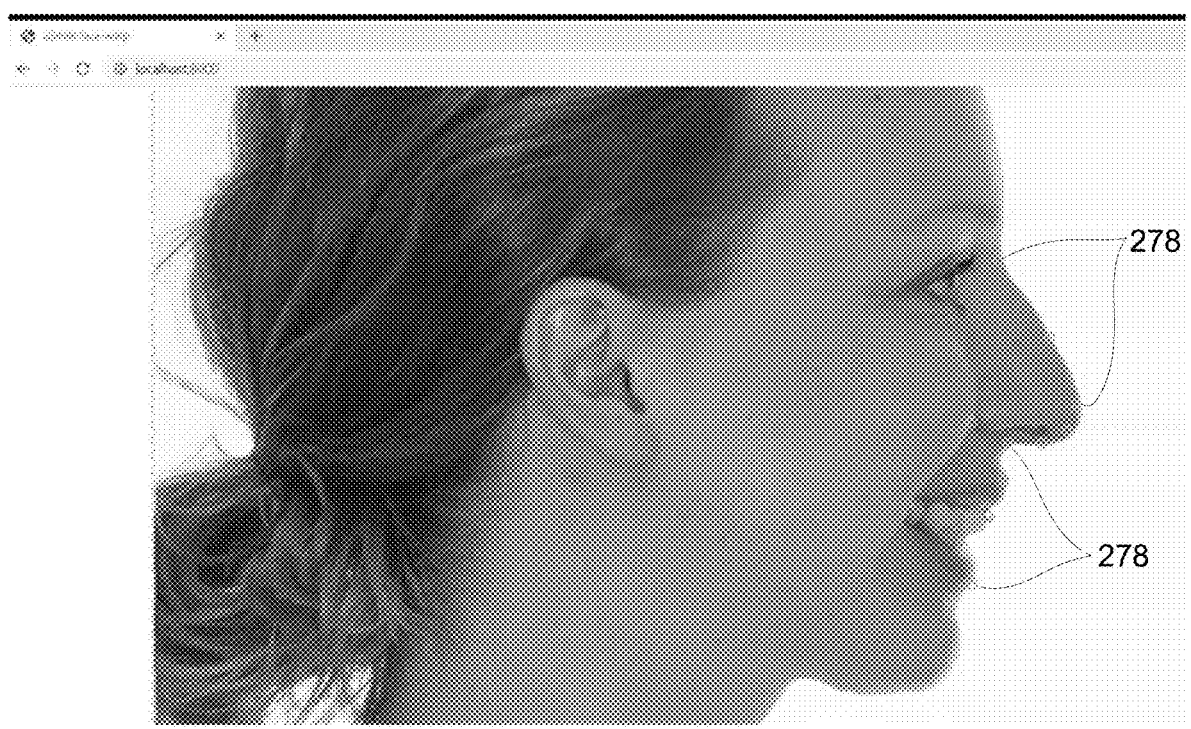
FIG. 26B shows a side view of the patient image having facial morphing features available.

FIG. 26B shows a side view of the patient image having facial morphing features available. The software may optionally incorporate facial morphing by utilizing, e.g., one or more various markers 278 located on anatomical features to be adjusted accordingly. As shown, the patient image may integrate markers 278, e.g., along the nose, lips, cheeks, etc., for the purposes of morphing one or more of these features, if so desired.

Figures 27A, 27B:
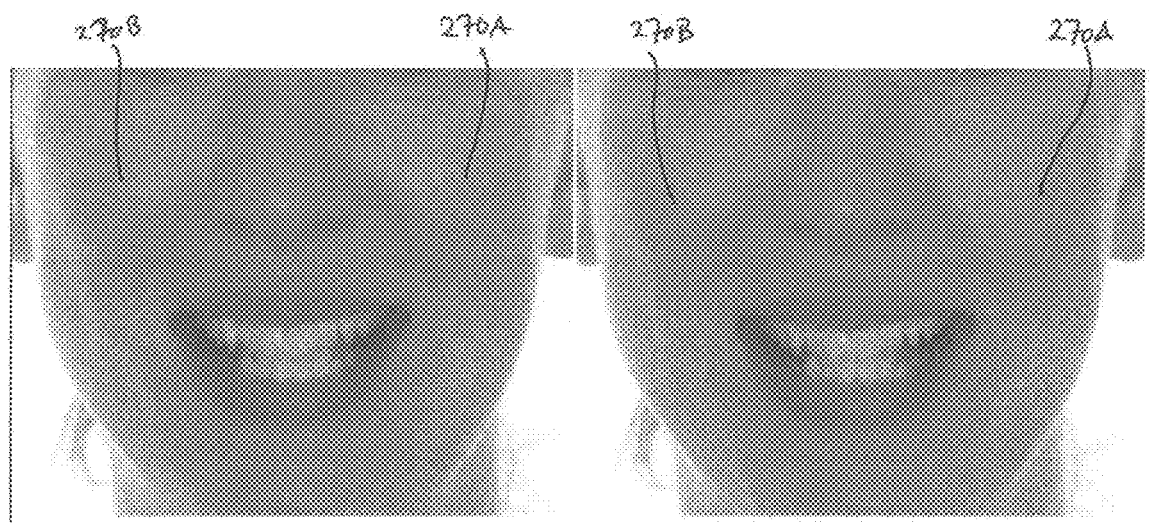
FIGS. 27A and 27B show before and after images generated automatically or manually of how the patient's facial anatomy may change when the teeth are corrected.
Figures 28A, 28B:
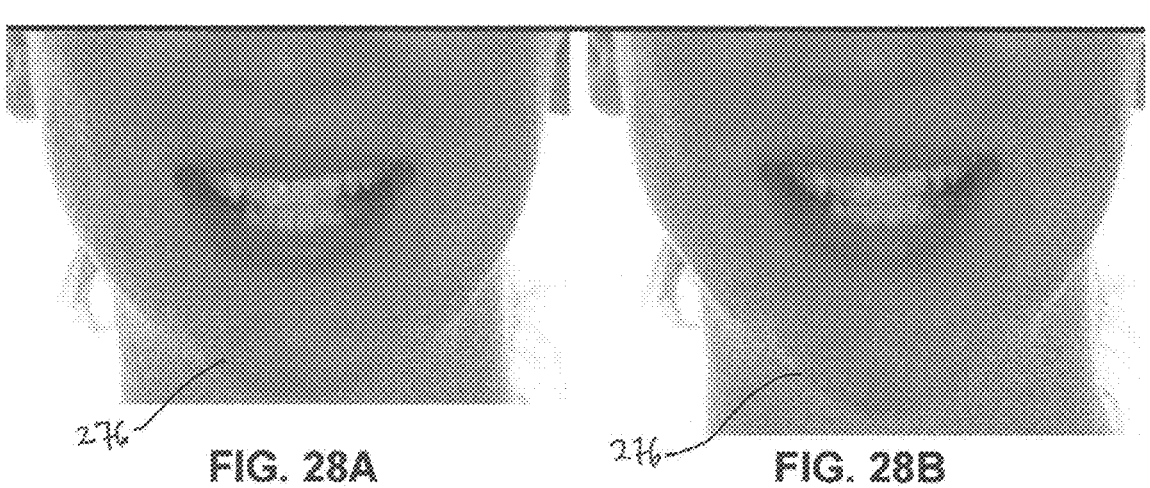
FIGS. 28A and 28B show before and after images generated automatically or manually of how the patient's chin line may change when the teeth are corrected.

With the movement of the teeth known and the resulting teeth location, the areas likely to be affected are identified and the system may automatically adjust a position of the muscles and/or skin to alter the patient's facial features upon the image. The positions may also be manually adjusted by the user as well. The identified regions may be bounded, as shown, where the facial regions may be freely moved within the bounds of the identified regions. FIGS. 27A and 27B show a before and after image where the cheek regions 270A, 270B may be adjusted based on the resulting tooth movements to correlate the altered facial image to the treatment performed to result in a more accurate image of the patient, e.g., the cheek regions 270A, 270B may appear puffier due to a lifting of the underlying muscles from the tooth movements. FIGS. 28A and 28B show another example of a before and after image where the jaw line 276 may be lengthened depending upon the treatment performed.

Figure 29:
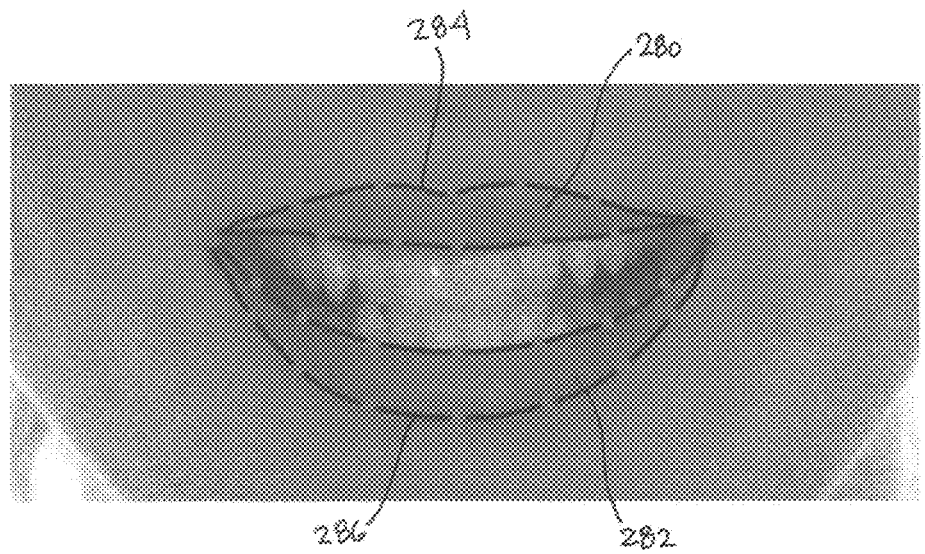
FIG. 29 shows a front view of how the patient's lips may be recognized by the computer for potential adjustment.
Figures 30A, 30B:
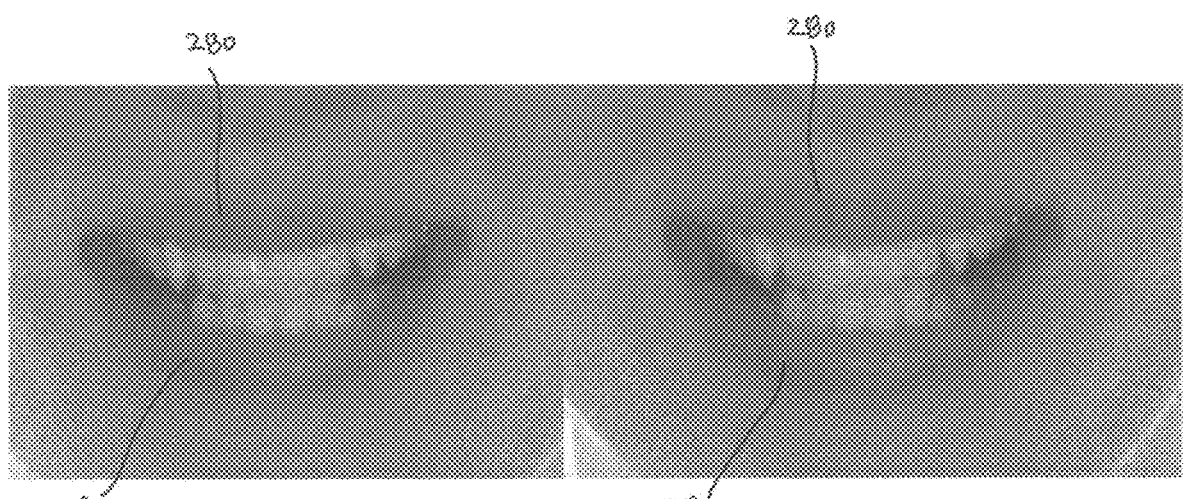
FIGS. 30A and 30B show front views of before and after images generated automatically or manually of how the patient's lips may change when the teeth are corrected.

In addition to the facial regions, the lips of the patient may be adjusted as well. FIG. 29 shows a front view of the facial image where the upper lip 280 and lower lip 282 are detected and identified by the system so that the outlines of the lips are bounded 284, 286 by respective boundaries. A number of markers may be applied around each of boundaries 284, 286 to allow for adjustment of the markers by the user. Depending upon the treatment, the upper lips 280 and/or lower lips 282 may be altered, as shown in the before and after facial images shown in FIGS. 30A and 30B.

Figure 31:
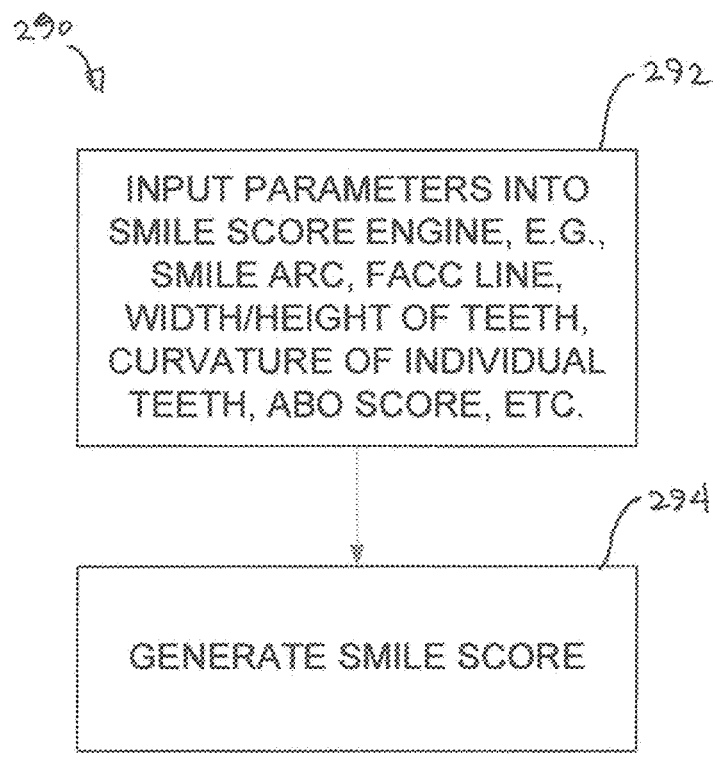
FIG. 31 shows a flow diagram of one variation of a method for generating a smile score assigned to a patient.

In yet another feature of the system for optimizing a patient's smile, a "smile score" may be generated for the purpose of providing the user and/or patient some relative scale to provide some indication of how optimized the resulting smile of the patient may appear. FIG. 31 shows a flow diagram 290 of one method for generating the smile score where a number of parameters may be initially input into the system 292. Factors such as the patient's smile arc, FACC line, width and height of the teeth, curvature of individual teeth, ABO score (American Board of Orthodontics (ABO) score relating to a measurable digital model), etc., may be input into a smile score engine to automatically calculate the smile score 294. The user may alter any one of these input parameters to iteratively generate the corresponding smile score and depending upon the results, the user may then implement one or more changes to further increase the corresponding smile score. The changes may then be optionally implemented by the user clinically to achieve an aesthetically pleasing smile.

In one variation, the smile score 294 may be comprised of multiple factors relating to a desirable smile and may be calculated by the following:

Smile Score = (Smile Arc) +

(Incisor Plane Cant) +

(Occlusal Plane Cant) +

(Max Midline) +

(Max Transverse Display) +

(Cuspid Inclination) +

(Buccal Segment Inclination) +

(Tooth Proportionality) +

(Flow) +

(Gingival Display) +

(Maxillary Central Inclination) +

(COP)

Each of the individual factors shown above may be assigned a value of 1 to 5 (e.g., 1, 2, 3, 4, 5) in determining the smile score 294 where a maximum value of 60 total indicates the more aesthetically desirable smile and a lower value indicates a less aesthetically desirable smile. As noted above, one or more of these factors may be altered to iteratively generate the corresponding smile score and depending upon the results, the user may then implement one or more changes to further increase the corresponding smile score. The changes may then be optionally implemented by the user clinically to achieve an aesthetically pleasing smile. Each of the factors are described in further detail below.

Figure 32:
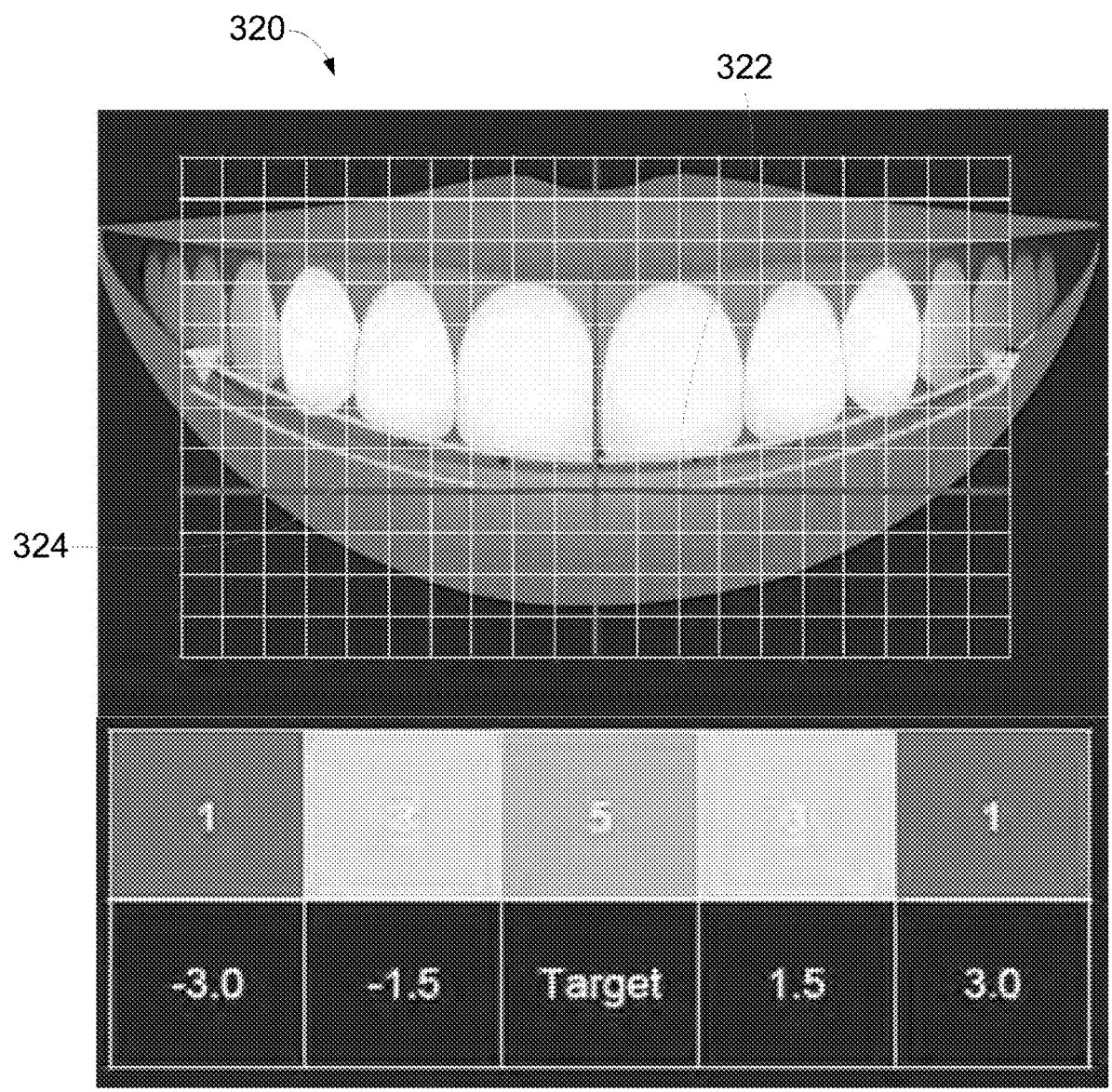
FIG. 32 shows a front view of the digital model of the patient's dentition for illustrating a smile arc determination.

One such factor included in the calculation of the smile score 294 is a smile arc factor. As seen in front view of the digital model 320 of the patient's dentition in FIG. 32, the smile arc 322 may be generated from a lower lip line 324 and the deviation between the initial position of the tip of each tooth may be compared against the smile arc 322. While the curvature between the smile arc 322 and the tips of each tooth are compared, the distance between the smile arc 322 and the lip line 324 are not necessarily considered. As shown, depending on the deviation between the tip of each tooth and the smile arc 322, a score value for the smile arc factor (shown in the chart of FIG. 32) may be used in the aggregate smile score calculation. For instance, if there is no deviation between the tips of each tooth and the smile arc 322, which is the ideal targeted value, an aggregate score of 5 may be assigned to the smile arc factor. A deviation of up to 1.5 or −1.5 between the tips of each tooth and the smile arc 322 may correlate to the smile arc factor of 3 while a deviation of up to 3.0 or −3.0 between the tips of each tooth and the smile arc 322 may correlate to the smile arc factor of 1.

Figure 33:
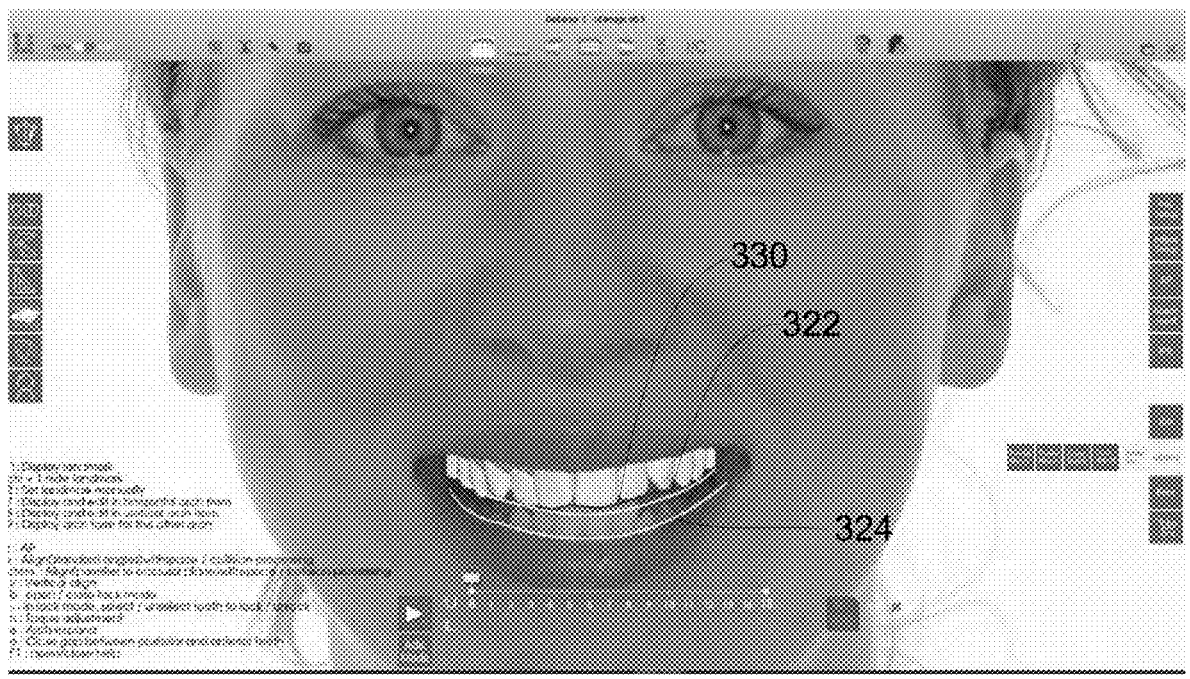
FIG. 33 shows an example of the patient's image with the digital model superimposed illustrating the smile arc.

FIG. 33 illustrates an example of the patient's image with the digital model superimposed illustrating the smile arc 322 and the lip line 324 directly upon the image. The initial curve 330 formed by the connection between the tips of each tooth is shown for comparison against the smile arc 322 in determining the deviation of each tooth or several teeth.

Figure 34:
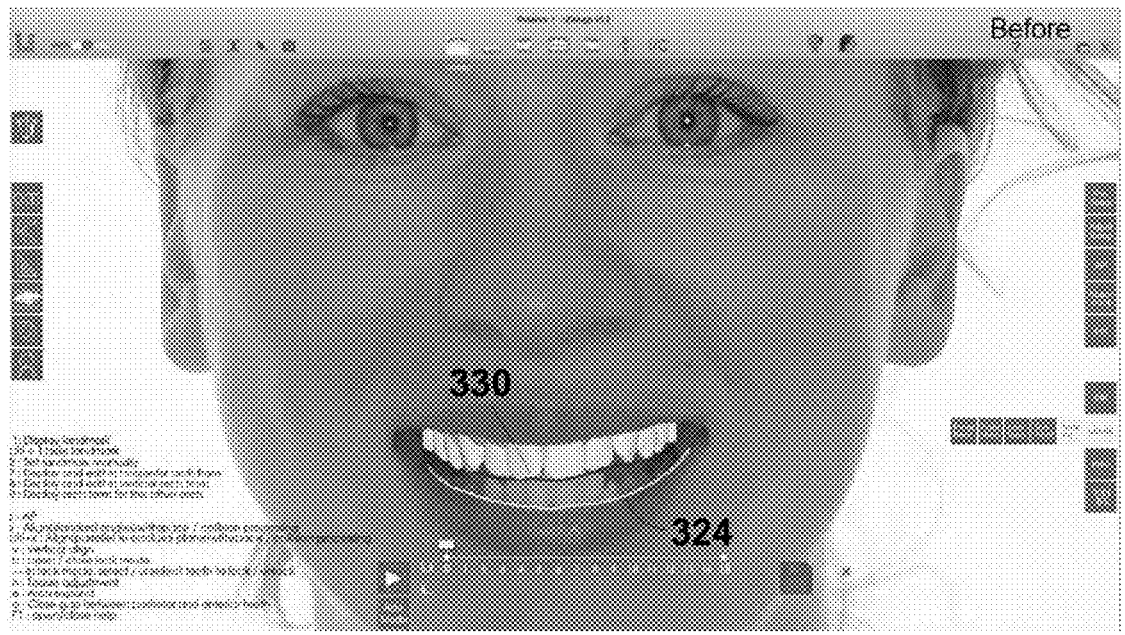
FIGS. 34 and 35 show examples of the patient's image with the digital model superimposed illustrating the smile arc.
Figure 35:
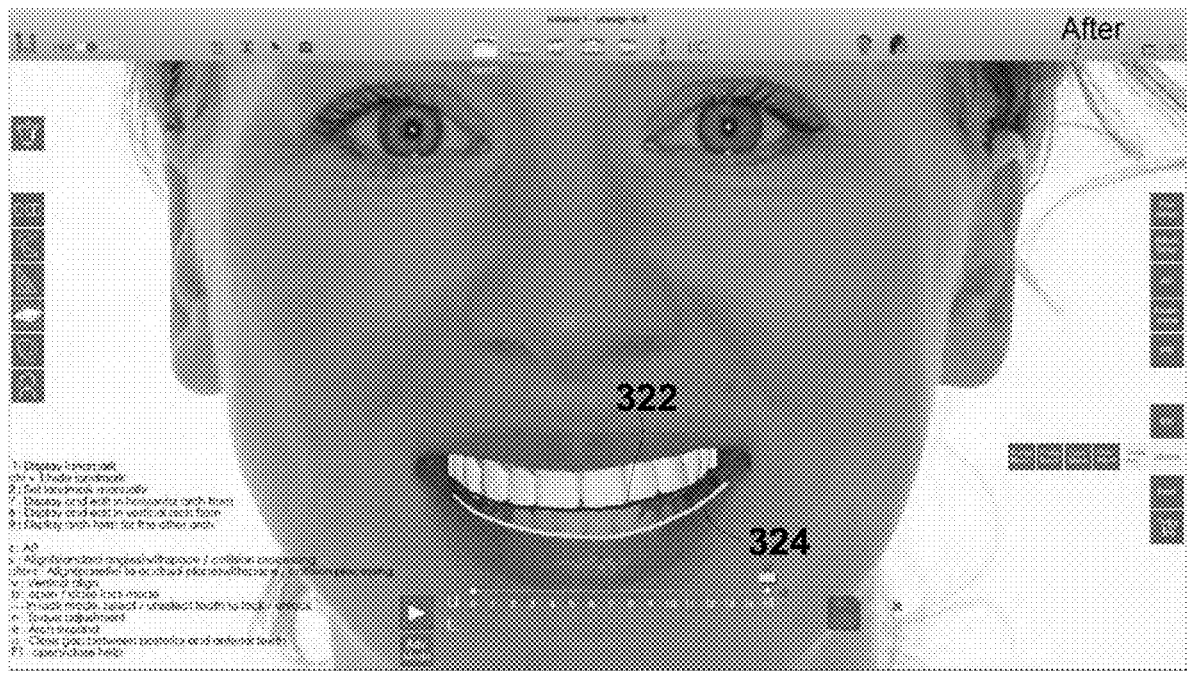

For example, FIG. 34 illustrates an initial curve 330 generated from the tips of each tooth, and lip line 324 is shown for comparison. FIG. 35 illustrates how the positioning of the teeth, once corrected, may be adjusted to follow the smile arc 322.

Figure 36:
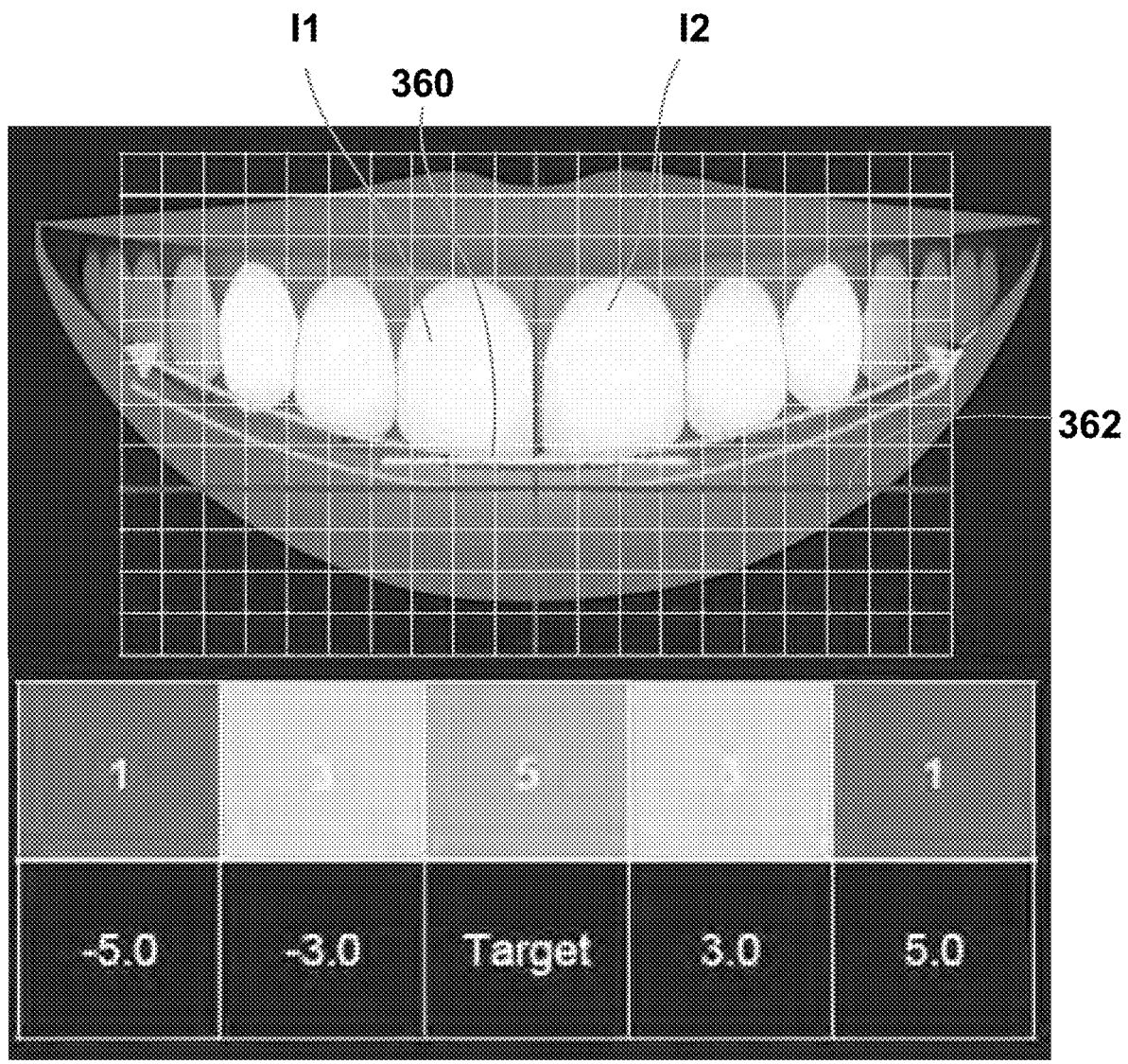
FIG. 36 shows a front view of the digital model of the patient's dentition for illustrating the incisor plane cant.

Another factor which may be considered in the smile score calculation is an incisor plane cant (IPC) factor. As disclosed in FIG. 36, the incisal edges of the incisors Il, 12 are lined up to form a first horizontal incisor line 360 and compared to a horizontal reference line 362. The number of degrees between the incisor line 360 and reference line 362 may be determined and depending upon the difference, a value for the incisor plane cant may be assigned (shown in the chart of FIG. 36). For example, a difference of zero between the incisor line 360 and reference line 362, which is the targeted value, may result in an assigned value of 5. A difference between the incisor line 360 and reference line 362 of up to −3.0 degrees or 3.0 degrees may result in an assigned value of 3 while a difference between the incisor line 360 and reference line 362 of up to −5.0 degrees or 5.0 degrees may result in an assigned value of 1. These thresholds and points can be varied depending on the embodiment. A number of markers can be adjusted by a user to increase the smile score calculation.

Figure 37:
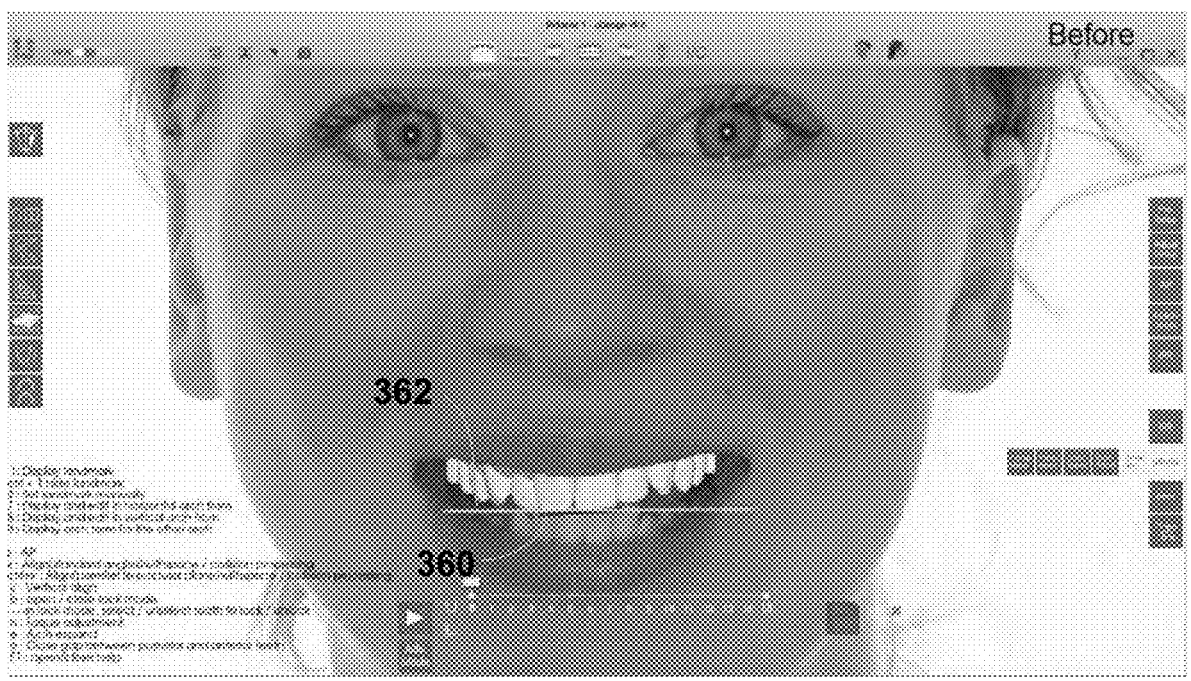
FIG. 37 shows an example of the patient's image with the digital model superimposed illustrating the incisor line.

FIG. 37 illustrates an example of the patient's image with the digital model superimposed illustrating the incisor line 360 determined from the initial positioning of the incisors. The horizontal reference line 362 is shown superimposed for comparison against the incisor line 360 for determining the incisor plane cant value.

Figure 38:
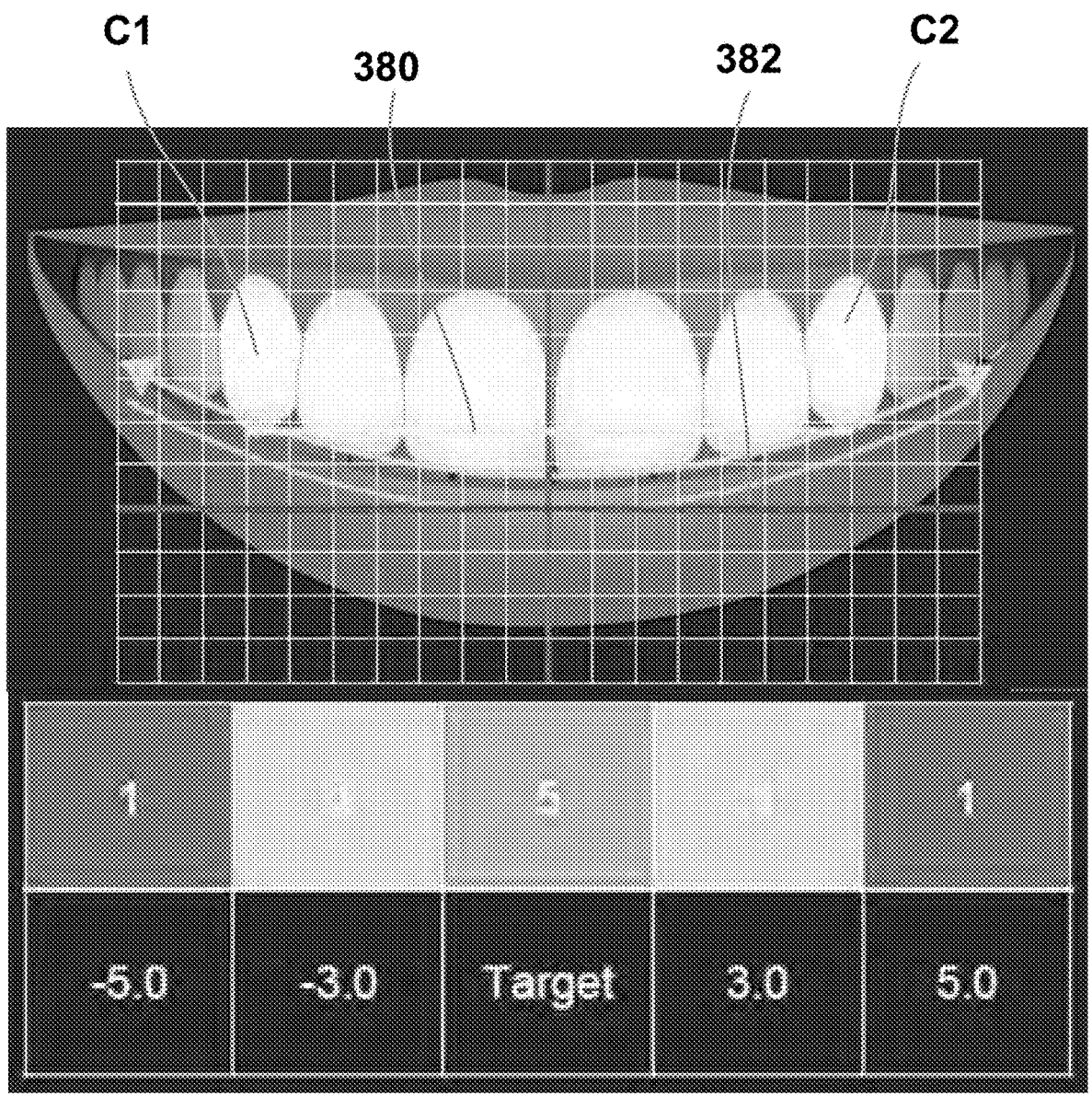
FIG. 38 shows a front view of the digital model of the patient's dentition for illustrating the occlusal plane.

Yet another factor which may be considered in the smile score 294 calculation is an occlusal plane cant (OPC) factor. As disclosed in FIG. 38, an occlusal line 380 may be connected between the occlusal planes of each of the canine teeth C1, C2 for comparison against a horizontal reference line 382. Ideally, the occlusal plane 380 should be level when compared to the horizontal reference line 382. For example, a difference of zero between the occlusal line 380 and reference line 382, which is the targeted value, may result in an assigned value of 5 (as shown in the chart of FIG. 38). A difference between the occlusal line 380 and reference line 382 of up to −3.0 degrees or 3.0 degrees may result in an assigned value of 3 while a difference between the occlusal line 380 and reference line 382 of up to −5.0 degrees or 5.0 degrees may result in an assigned value of 1. These thresholds and points can be varied depending on the embodiment. A number of markers can be adjusted by a user to increase the smile score calculation.

Figure 39:
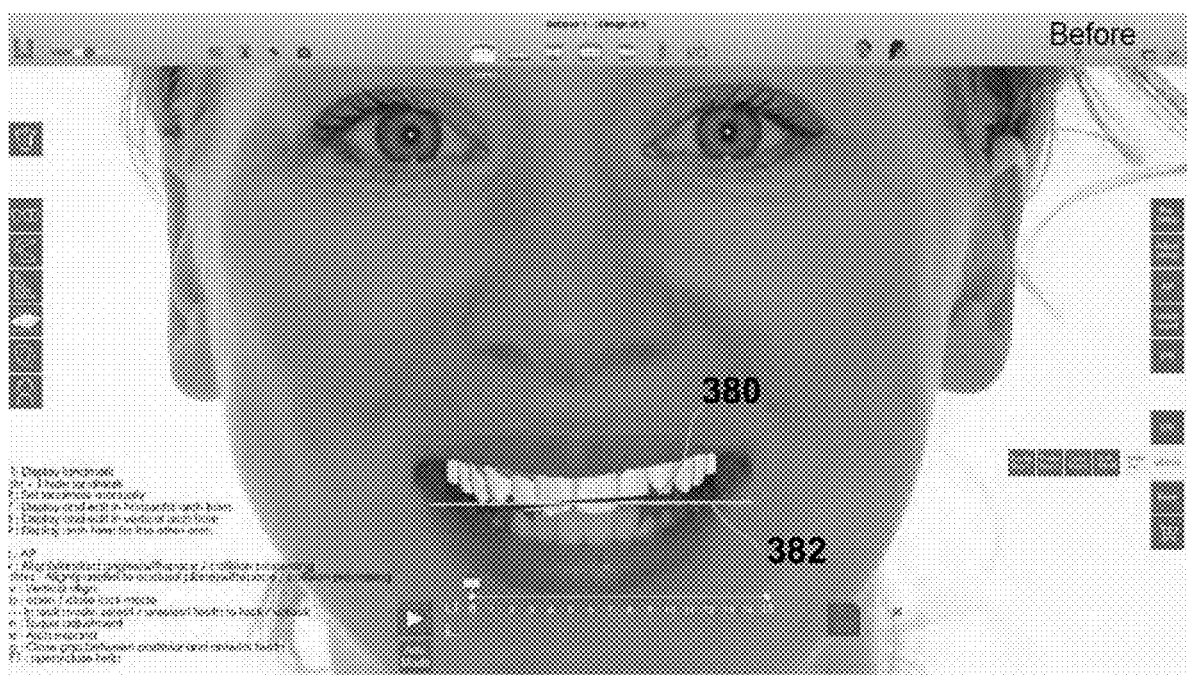
FIG. 39 shows an example of the patient's image with the digital model superimposed illustrating the occlusal line.

FIG. 39 illustrates an example of the patient's image with the digital model superimposed illustrating the occlusal line 380 and horizontal reference line 382. This can be adjusted by a user to achieve a higher smile score. The horizontal reference line 382 is shown superimposed for comparison against the occlusal line 380 for determining the occlusal plane cant value.

Figure 40:
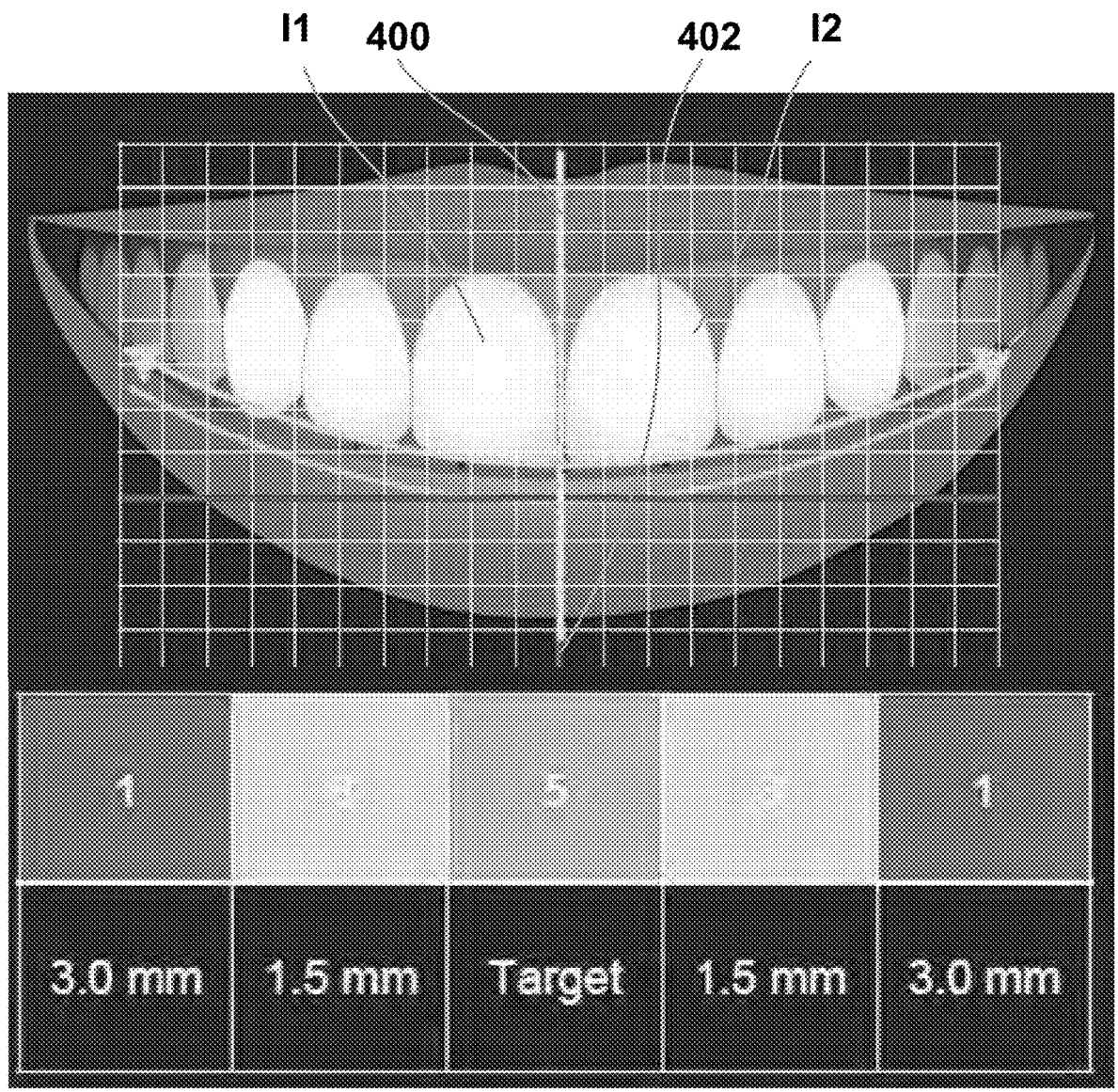
FIG. 40 shows a front view of the digital model of the patient's dentition for illustrating the max midline.

A max midline factor may also be used to calculate a smile score 294. As disclosed in FIG. 40, a midline 400 between the front two incisors Il, 12 may be determined for comparison against a philtrum line 402 of the patient where the philtrum line 402 is determined by the vertical groove between the base of the nose and the border of the upper lip. A standard deviation of a distance between the midline 400 and philtrum line 402 may be determined and a max midline value assigned based on the deviation from the target which is the midline 400 and philtrum line 402 being coincident and parallel with one another. For example, if the midline 400 and philtrum line 402 are coincident and parallel, then a value of 5 may be assigned to the max midline (as shown in the chart of FIG. 40). However, an offset of up to 1.5 mm between the midline 400 and philtrum line 402 may result in a max midline value of 3 being assigned. Likewise, an offset of up to 3.0 mm may result in a max midline value of 1 being assigned. These thresholds and points can be varied depending on the embodiment. A number of markers can be adjusted by a user to increase the smile score calculation.

Figure 41:
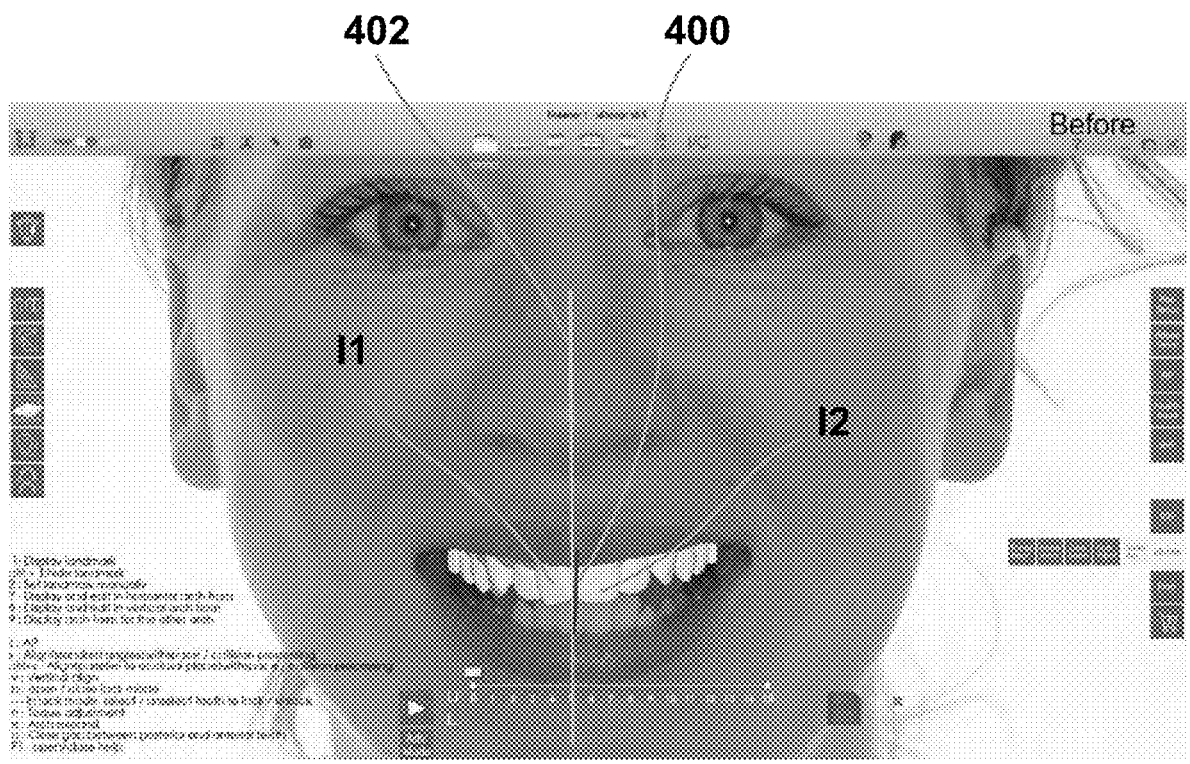
FIG. 41 shows an example of the patient's image with the digital model superimposed illustrating the max midline.

FIG. 41 illustrates an example of the patient's image with the digital model superimposed illustrating the application of the midline 400 and philtrum line 402 where the midline 400 and philtrum line 402 are offset by a larger deviation than an ideal target range. The deviation between the two may provide a max midline value for calculating the smile score.

Figure 42:
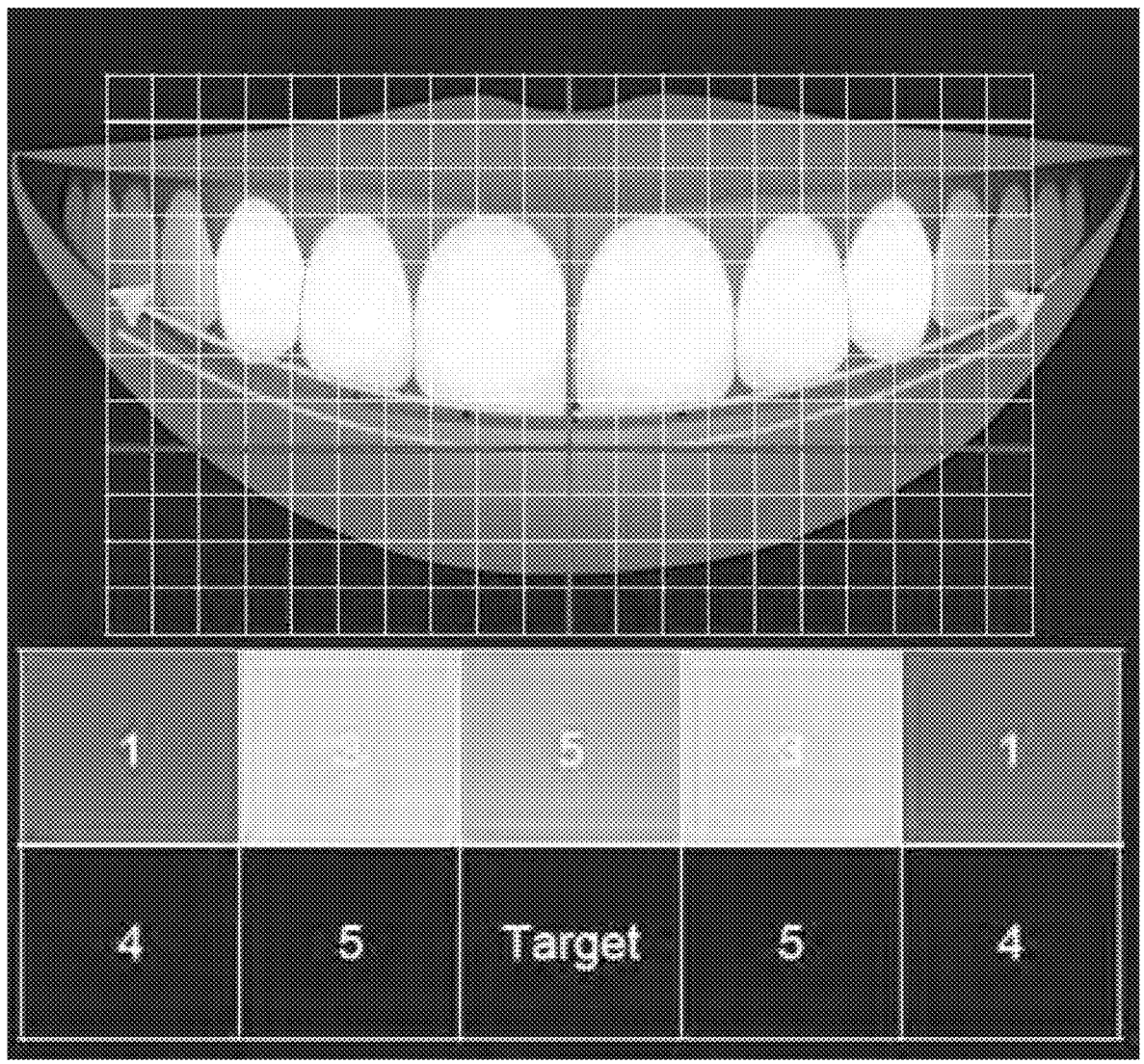
FIG. 42 shows a front view of the digital model of the patient's dentition for illustrating the max transverse display.

A max transverse display (MTD) factor may also be used to calculate a smile score 294. As disclosed in FIG. 42, a number of teeth that are visible in an animated smile are determined, with the standard number of teeth visible being twelve teeth total, e.g., six teeth visible per side. A number of visible teeth in the smile are counted and compared against the target of six teeth per side. Depending on the number of teeth visible, a max transverse display value is assigned. For example, six teeth per side detected may result in a maximum value of 5 being assigned. Likewise, five teeth per side being detected may result in a value of 3 assigned, and four teeth per side being detected may result in a value of 1 assigned.

Figure 43:
FIG. 43 shows an example of the patient's image with the digital model superimposed illustrating the max transverse display.

FIG. 43 illustrates an example of the patient's image with the digital model superimposed illustrating an example of the number of teeth per side being counted, with six per side being detected, giving a maximum point total for a max transverse display value under one embodiment.

Figure 44:
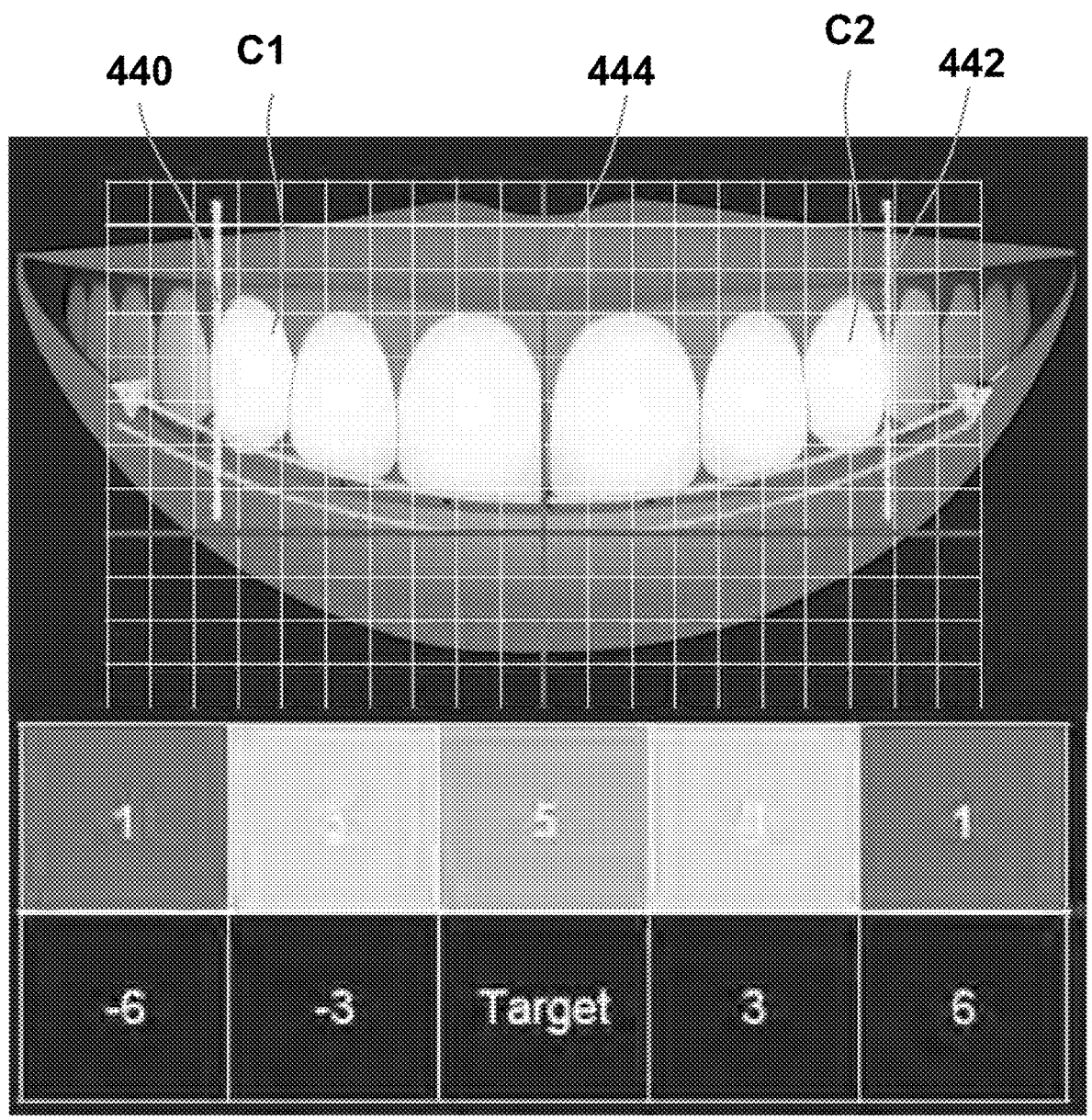
FIG. 44 shows a front view of the digital model of the patient's dentition for illustrating the cuspid inclination factor.
Figure 45:
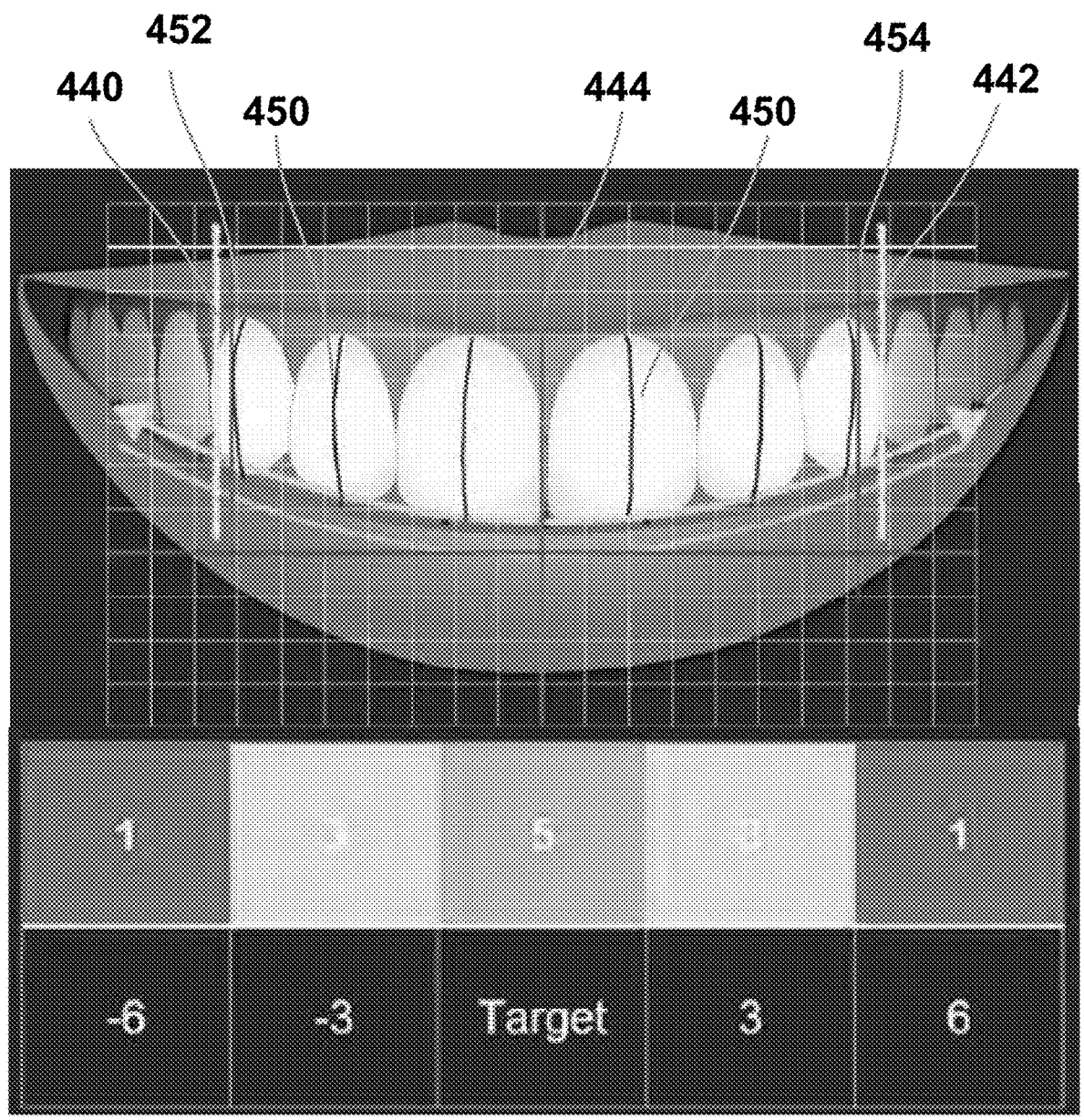
FIG. 45 shows a front view of the digital model of the patient's dentition for illustrating the curved lines and upright cuspid lines formed upon the teeth.

A cuspid inclination factor may also be used to calculate a smile score 294. As disclosed in FIG. 44, upright cuspid lines are determined based on the vertical tangents of each cuspid/canine C1, C2 and are compared to a vertical line 440, 442, 444 to determine the vertical orientation of the cuspid/canine C1, C2. If the cuspid lines are parallel to the vertical line 440, 442, 444, which is the targeted value, the cuspid inclination is assigned a value of 5 (as shown in the chart of FIGS. 44 and 45). The larger the degree of discrepancy from the vertical line, the lower the value that is assigned. For instance, a difference of up to −3 degrees or 3 degrees results in a value of a cuspid inclination of 3 being assigned. Similarly, a difference of up to −6 degrees or 6 degrees results in a value of the cuspid inclination of 1 being assigned. These thresholds and points can be varied depending on the embodiment. A number of markers can be adjusted by a user to increase the smile score calculation.

The upright cuspid lines 452, 454 are determined by a process illustrated in FIG. 45 which shows how a series of curved lines 450 may be drawn from the center of the top or gingival edge of each tooth to the center of the bottom or occlusal edge of each tooth including the cuspids to create curved cuspid lines 452, 454. A tangential upright cuspid line 454, 454 may be determined relative to the curved lines 450 and these upright cuspid lines 452, 454 may be compared to the vertical line 440, 442, 444 to determine the cuspid inclination value, and can be adjusted via markers by a user to increase the smile score calculation.

Figure 46:
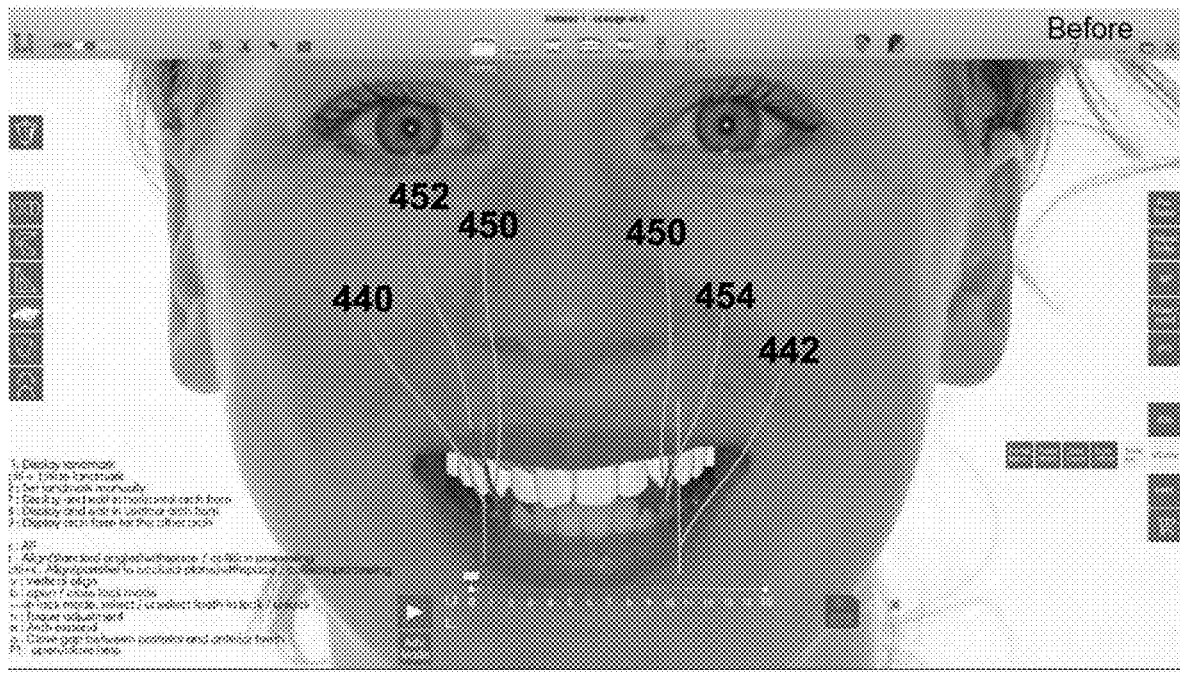
FIGS. 46 and 47 show examples of the patient's image with the digital model superimposed illustrating the upright cuspid lines.
Figure 47:
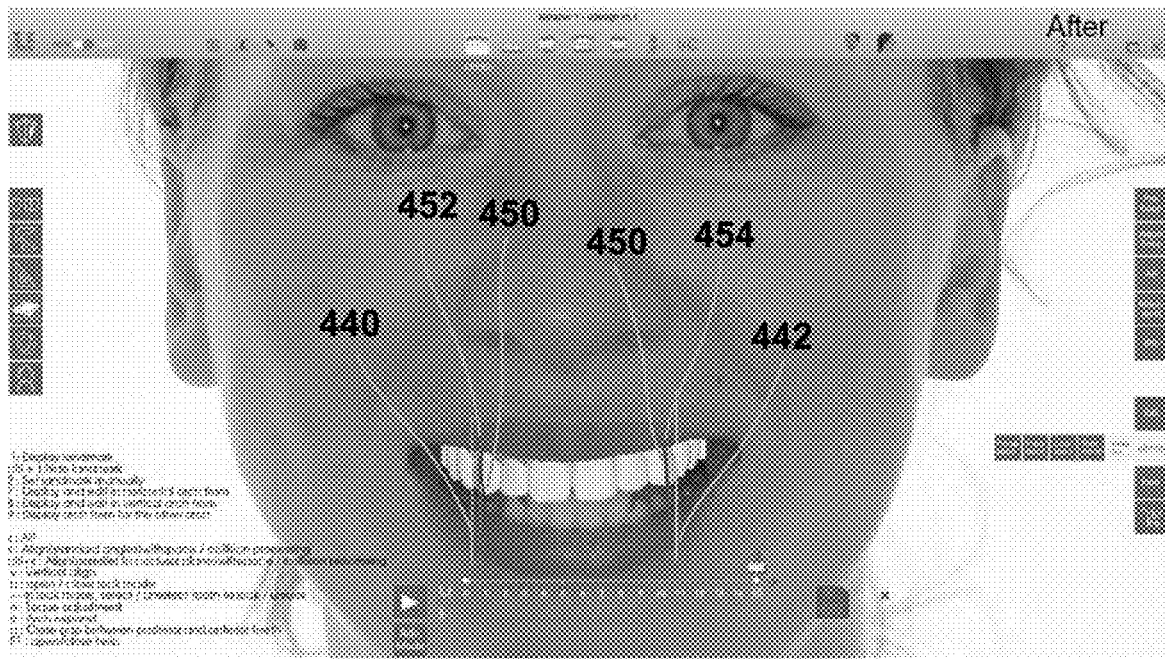

FIGS. 46 and 47 illustrates an example of the patient's image with the digital model superimposed illustrating how an initial positioning of the patient's teeth reveals how the upright cuspid lines 452, 454 appear canted relative to the vertical lines 440, 442 indicating that the cuspid inclination value is off-target. In particular, FIG. 46 illustrates where the upright cuspid lines 452, 454 are far from parallel when compared to vertical lines 440, 442 while FIG. 47 illustrates how the corrected positioning of the teeth may change the curve cuspid lines 450, which in turn realigns the upright cuspid lines 452, 454 to be parallel with the vertical lines 440, 442. This creates a more desirable smile, and increases the smile score by decreasing the degrees between the vertical lines 440, 442 and the upright cuspid lines 452, 454.

Figure 48:
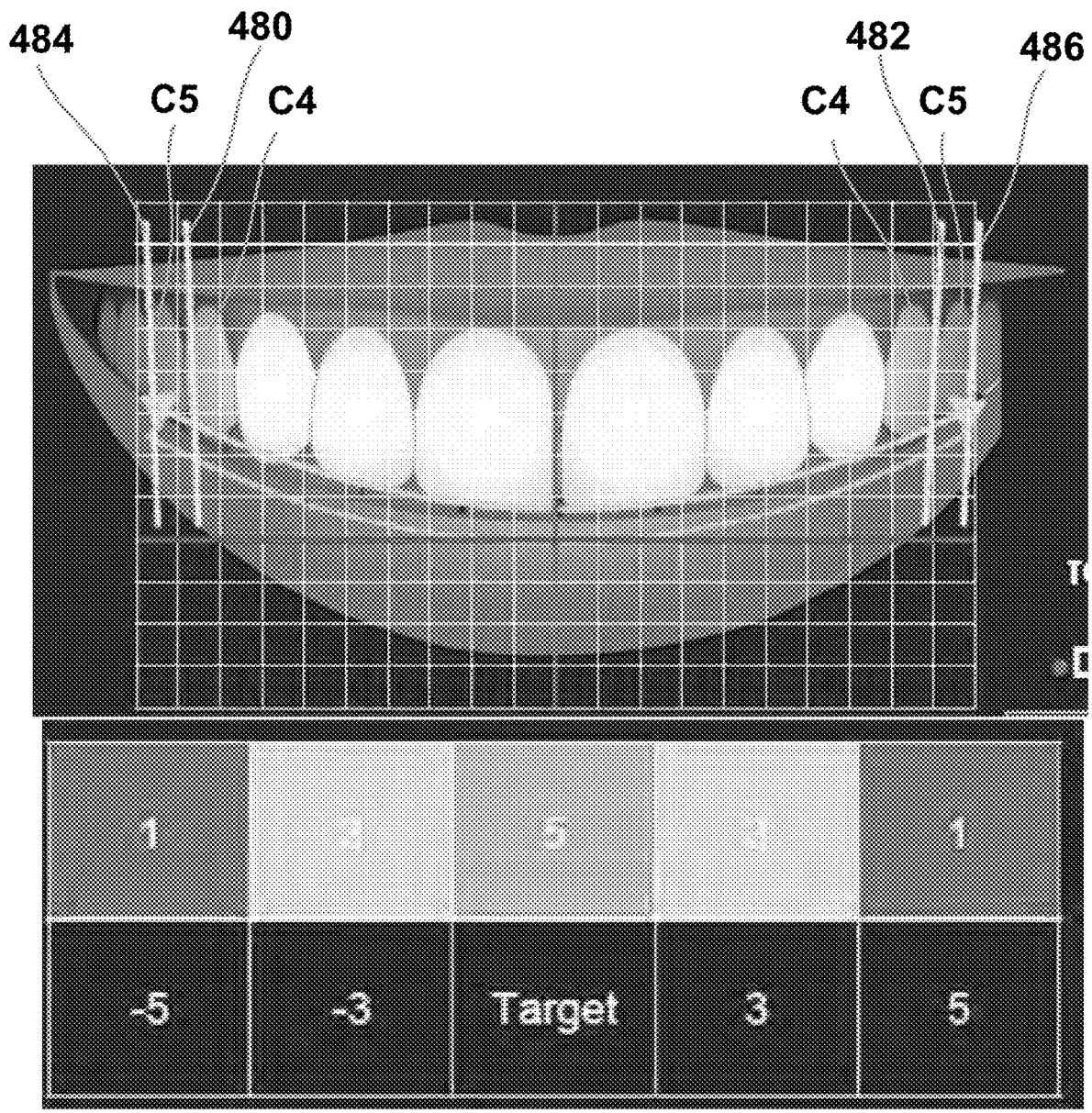
FIG. 48 shows a front view of the digital model of the patient's dentition for illustrating the buccal segment inclination.

Another factor that may be included in a smile score 294 calculation is a buccal segment inclination (BSI) factor. As shown in FIG. 48, the #4 cuspids C4 and #5 cuspids C5 may each have a curved cuspid line formed upon each of these cuspid teeth and a respective tangential upright line may be formed relative to each curved cuspid lines. A first reference line 480, 482 which is tilted relative to a vertical line by, e.g., 1.5 degrees, may be used for comparison against the #4 cuspids C4 and a second reference 484, 486 which is also tilted relative to the vertical line by, e.g., 3 degrees, may be used for comparison against the #5 cuspids C5.

Figure 49:
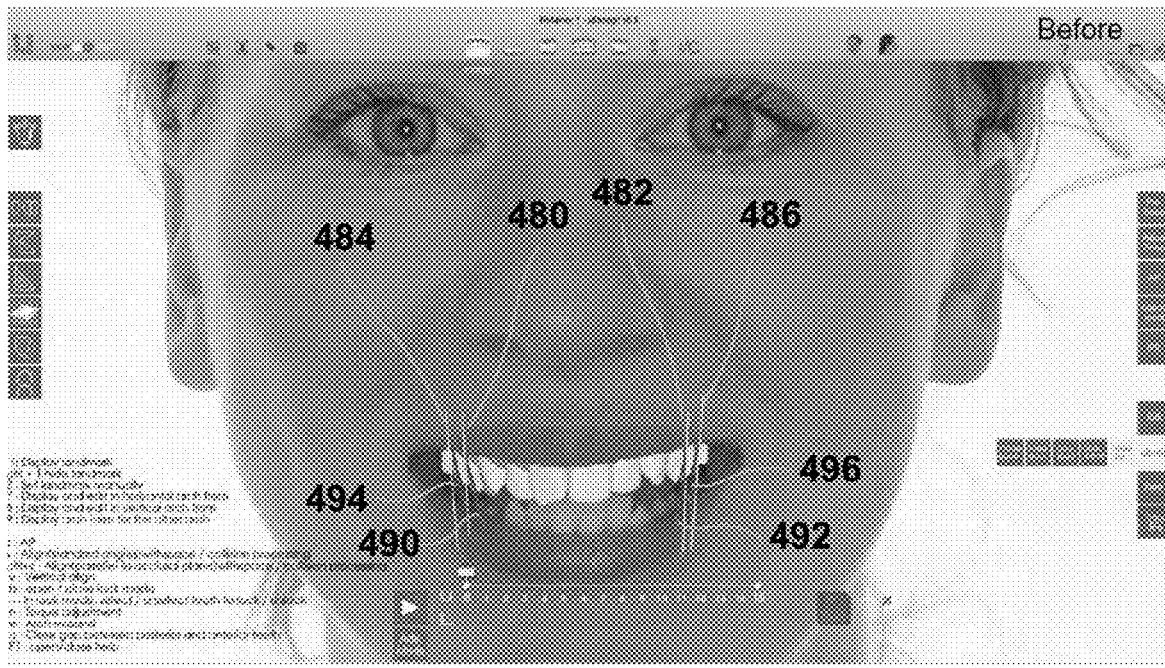
FIGS. 49 and 50 show examples of the patient's image with the digital model superimposed illustrating the buccal segment inclination.
Figure 50:
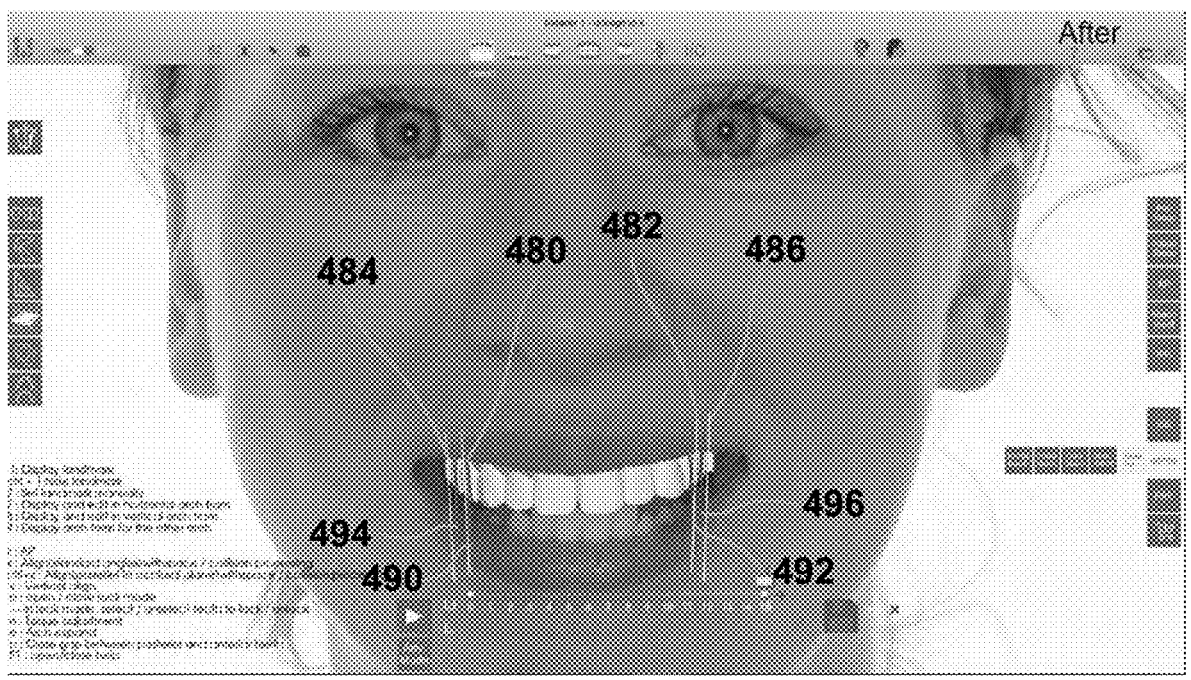

FIGS. 49 and 50 illustrate an example of the patient's image with the digital model superimposed illustrating the first reference lines 480, 482 each tilted at, e.g., 1.5 degrees, and second reference lines 484, 486 each tilted at, e.g., 3 degrees. Each of the first and second reference lines may, of course, be tilted at other angles as desired depending upon the desired smile results. The curved cuspid lines may be seen formed upon each of the relevant teeth and the corresponding tangential upright lines 490, 492 for each of the #4 cuspids and the corresponding tangential upright lines 494, 496 for each of the #5 cuspids. Comparison of the upright lines 490, 492 against the tilted first reference lines 480, 482 and comparison of the upright lines 494, 496 against the tilted second reference lines 484, 486 may each produce a resulting buccal segment inclination value where a zero degree difference may yield an assigned value of 5 (as shown in the chart of FIG. 48). A difference of up to −3 degrees or 3 degrees may yield an assigned value of 3, and likewise a difference of up to −5 degrees or 5 degrees may yield an assigned value of 1. The resulting buccal segment inclination may be used as one of the factors in the determining the smile score 294. FIG. 50 illustrates how the upright lines 490, 492 relative to the tilted first reference lines 480, 482 and upright lines 494, 496 against the tilted second reference lines 484, 486 may yield a higher value of the buccal segment inclination once the positioning of the teeth are corrected.

A tooth proportionality factor may also be included in calculating a smile score 294. As disclosed FIG. 51, the tooth proportionality factor may be determined by using a recurring esthetic dental (RED) proportion which is calculated by dividing the width of each lateral incisor 480 by the width 484 of the adjacent central incisor 482 and the resulting number being multiplied by 100. Alternatively, the tooth proportionality factor may also be determined using the Golden proportion where the width 484 of the central incisor 482 is multiplied by 62% and compared with the width of adjacent lateral incisor 480. Similar values indicate that the width 484 of the central incisor 482 is in golden proportion to the width of the lateral incisor 480.

Figure 51:
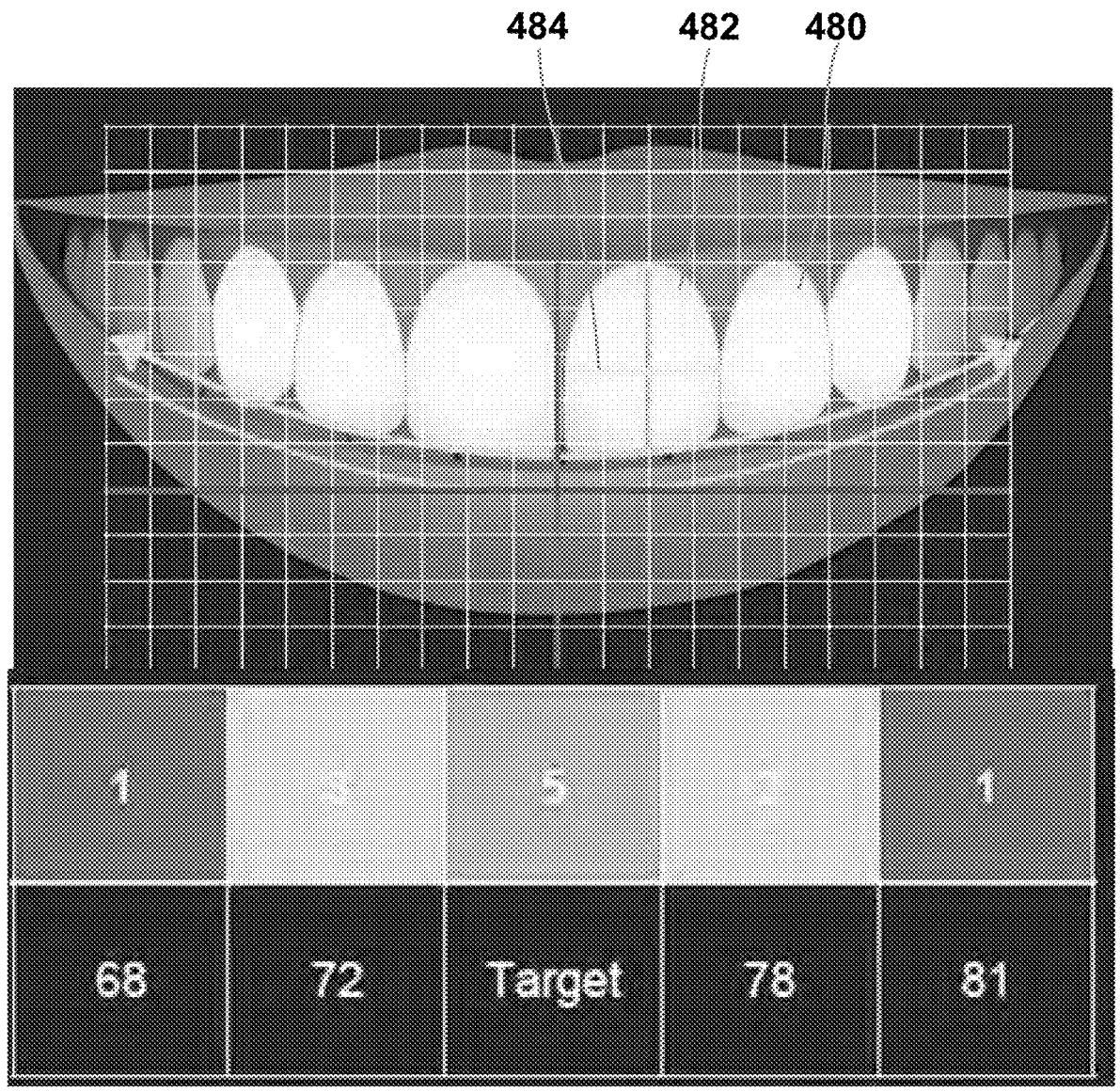
FIG. 51 shows a front view of the digital model of the patient's dentition for illustrating the tooth proportionality.

In using the RED proportion, the ideal portion may be within a targeted range of, for example, between 75-78%. A tooth proportionality of less than 68% or more than 81% may result in an assigned tooth proportionality value of 1. A tooth proportionality of between 68% to 72% or between 78% to 81% may result in an assigned tooth proportionality value of 3, while a tooth proportionality of between 72% and 78% may result in an assigned tooth proportionality value of 5 (as shown in the chart of FIG. 51). These thresholds and points can be varied depending on the embodiment. A number of markers can be adjusted by a user to increase the smile score calculation.

Figure 52:
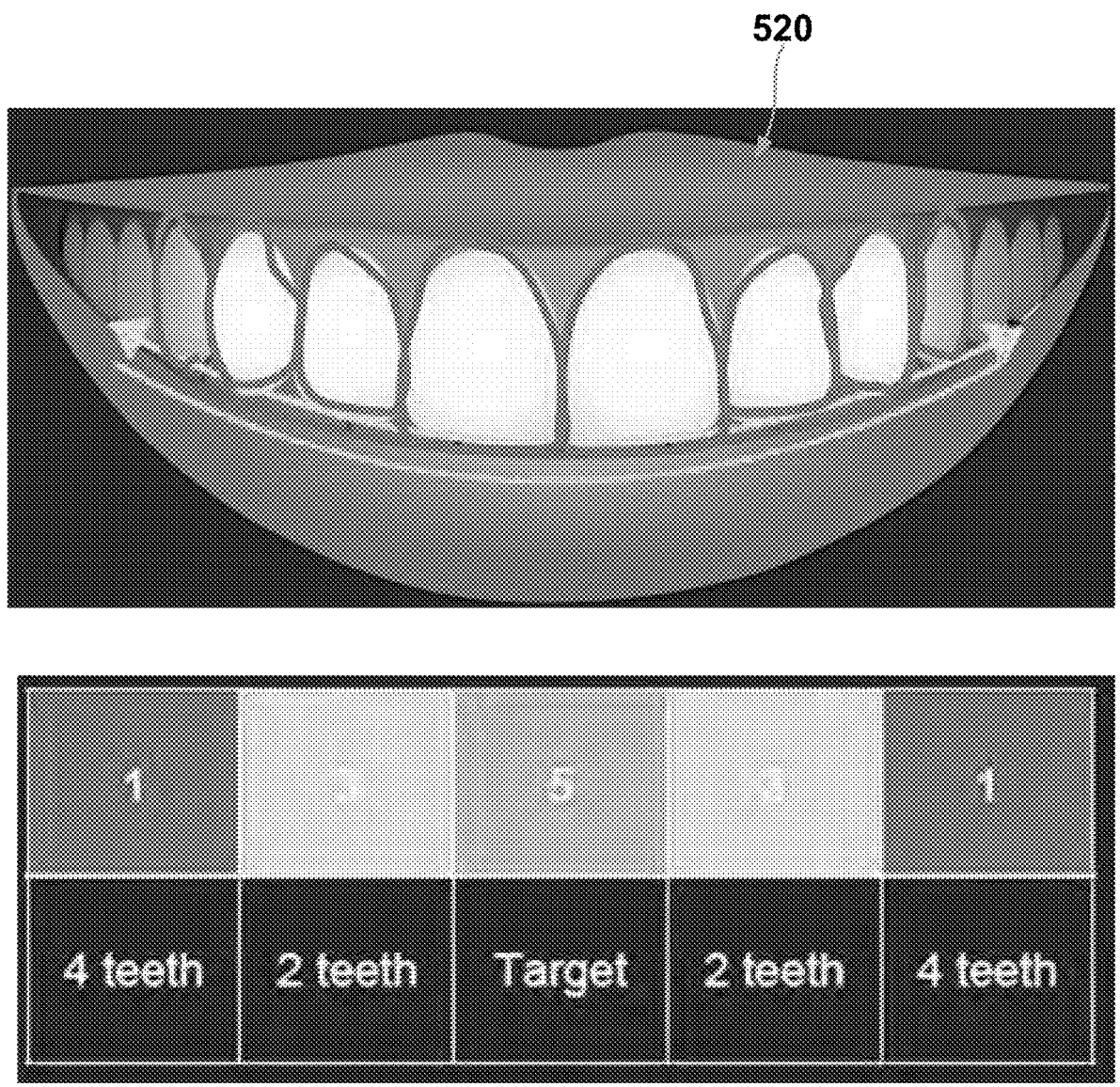
FIG. 52 shows a front view of the digital model of the patient's dentition for illustrating the flow factor.
Figure 53:
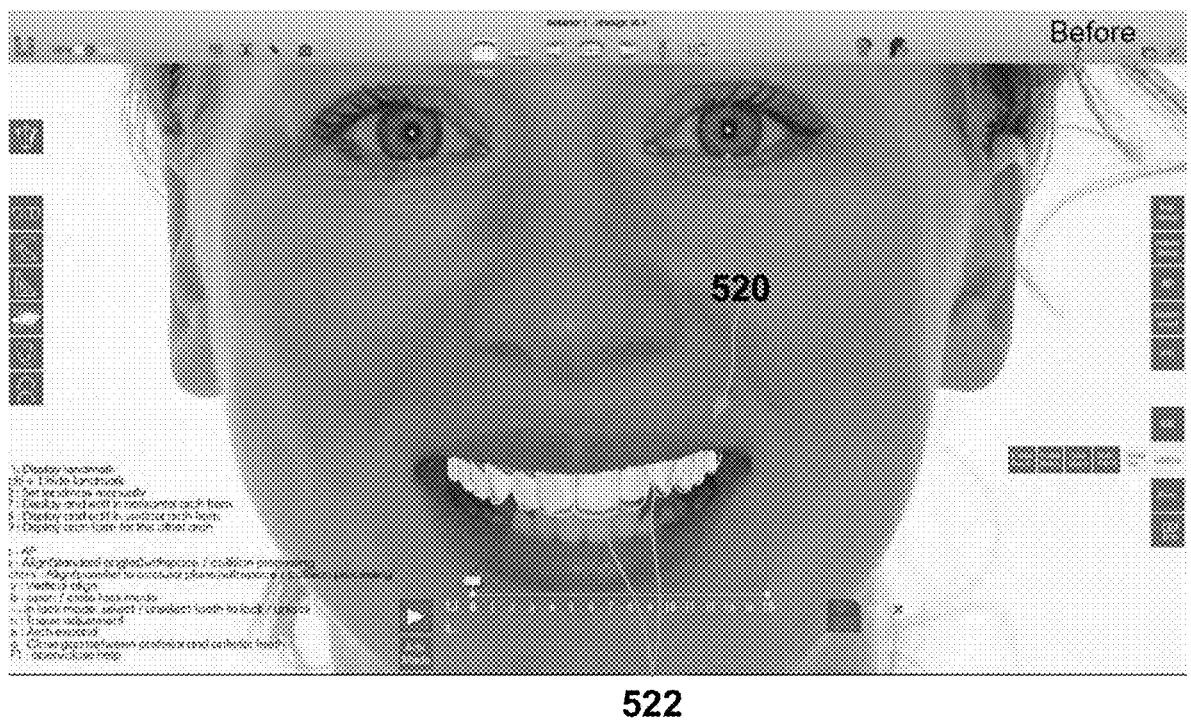
FIG. 53 shows a front view of the digital model of the patient's dentition for illustrating the flow factor.

A flow factor may also be included in calculating a smile score 294. A number of different templates may be applied upon the teeth of the patient, as shown in FIG. 52, depending upon the type of desired results. These templates 520 may be applied upon the digital model of the patient's dentition for comparison against the initial fit of the teeth, as shown in FIG. 53, and differences 522 between the teeth and the template 520 may reveal that one or more of the teeth may require a coronoplasty for the addition or removal of material from the crown. If no teeth are shown to require any addition or removal of material relative to the template 520, a flow value of 5 may be assigned (as shown in the chart of FIG. 52). If one to two teeth show any issues relative to the template 520, then a flow value of 3 may be assigned; and if three to four teeth show any issues relative to the template 520, then a flow value of 1 may be assigned.

Figure 54:
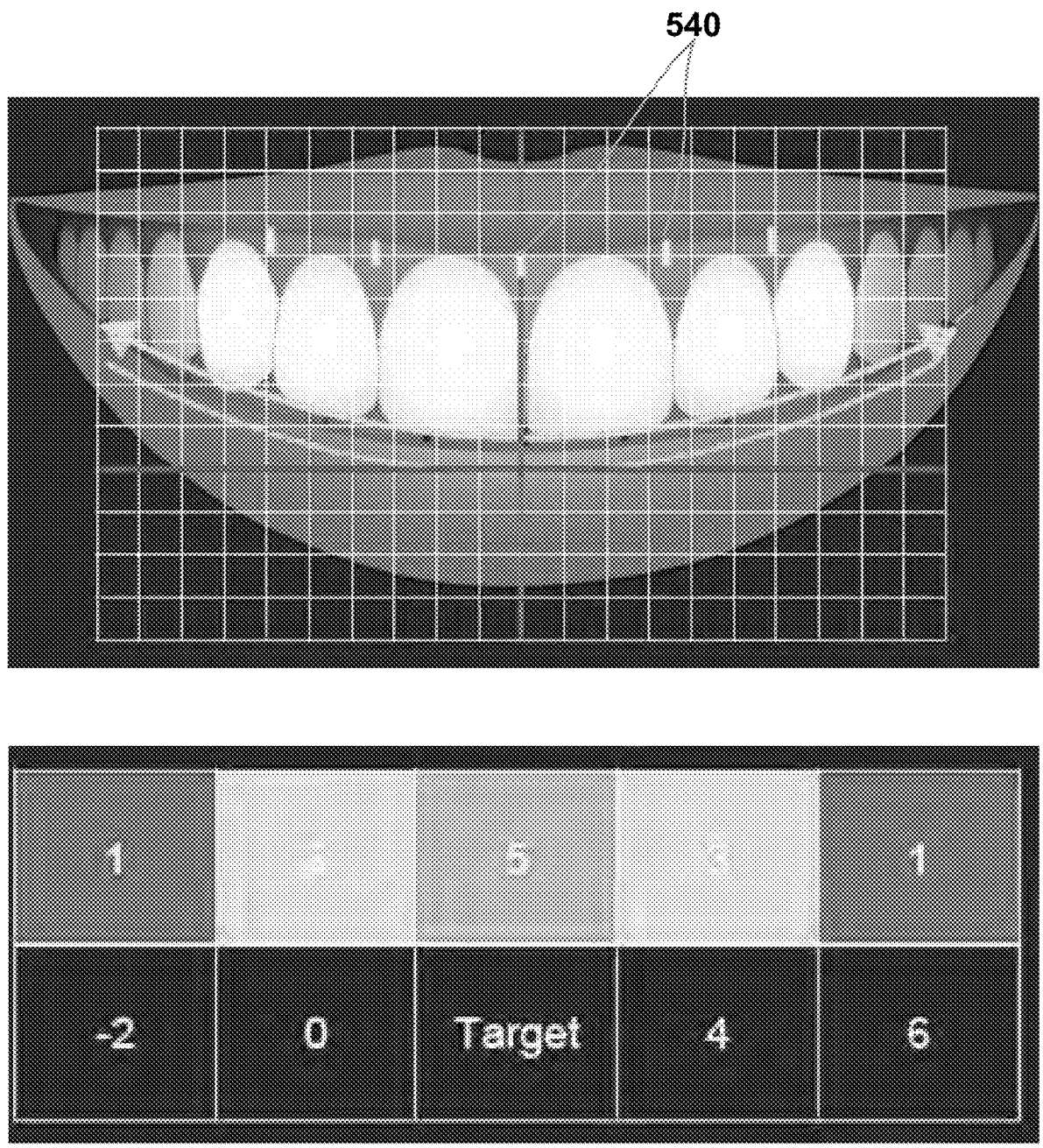
FIG. 54 shows a front view of the digital model of the patient's dentition for illustrating the gingival display.
Figure 55:
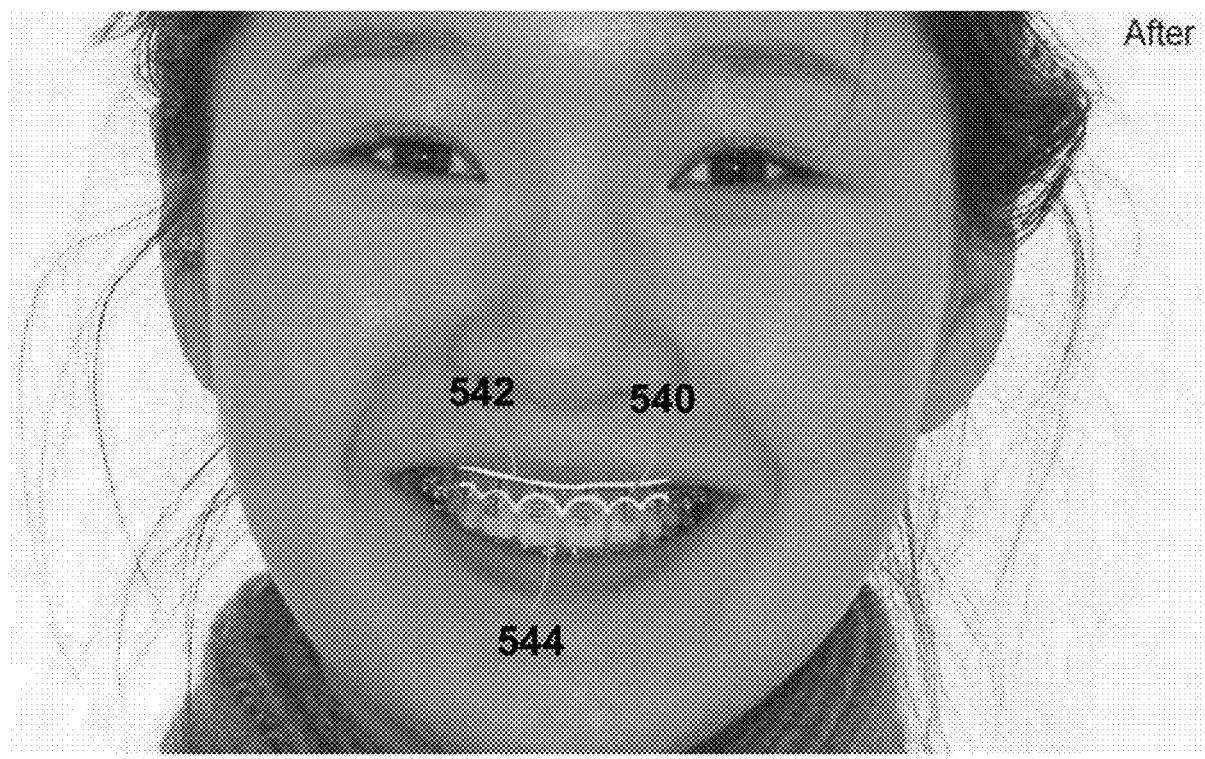
FIG. 55 shows an example of the patient's image with the digital model superimposed illustrating the gingival display.

A gingival display (GD) factor may also be included in calculating a smile score 294. As disclosed in FIG. 54, the tips of all of the gums are connected and the distance between the connection line to the upper lip is averaged 540 to calculate a mean deviation from a target value. The target distance can differ between men and women, with an example target of 2 mm for women and 1 mm for men. FIG. 55 illustrates an example of a patient's image with the digital model superimposed illustrating the gum line 540 and upper lip edge 542. The distance between the tips of the gum line 540 and upper lip edge 542 may be averaged and then compared against a target value to determine the deviation from the target (e.g., relative to an average distance of 2 mm for women and 1 mm for men). No deviation may result in a gingival display value of 5 while a deviation of 0 or up to 4 may result in a gingival display value of 3 and a deviation of −2 or up to 6 may result in a gingival display value of 1 (as shown in the chart of FIG. 54).

Figure 56:
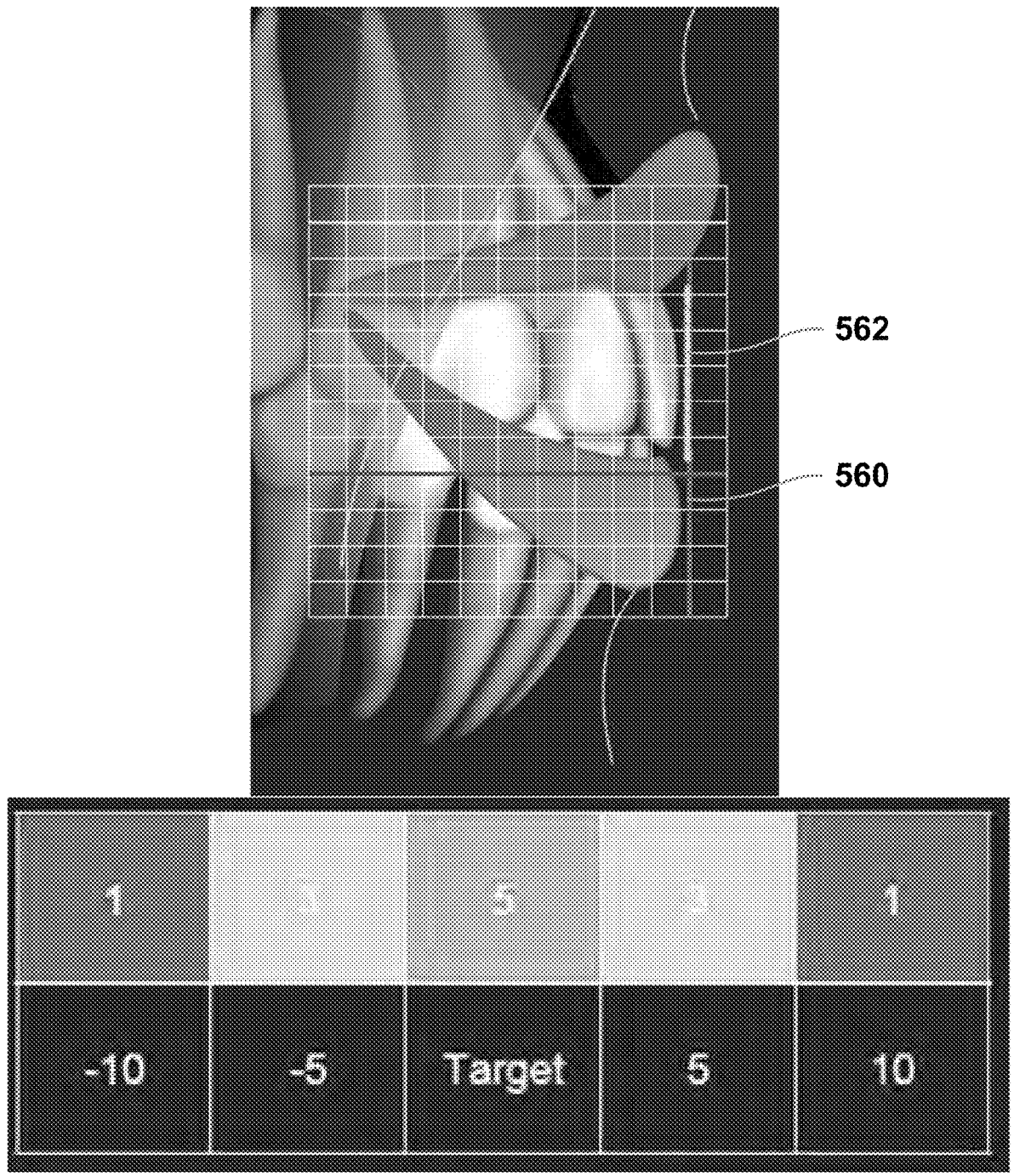
FIG. 56 shows a side view of the digital model of the patient's dentition for illustrating the maxillary central inclination.

A maxillary central inclination factor may also be included in a smile score 294 calculation. As disclosed in FIG. 56, a facial surface line 560 may be determined based on a tangent of the buccal surfaces of the main incisors. The facial surface line 560 may then be compared to a true vertical line 562. A target value of zero between the facial surface line 560 and vertical line 562 may yield a maxillary central inclination value of 5. A difference of up to −5 degrees or up to 5 degrees between the two may yield a maxillary central inclination value of 3, and a difference of up to −10 degrees or up to 10 degrees between the two may yield a maxillary central inclination value of 1 (as shown in the chart of FIG. 56). These thresholds and points can be varied depending on the embodiment. A number of markers can be adjusted by a user to increase the smile score calculation.

Figure 57:
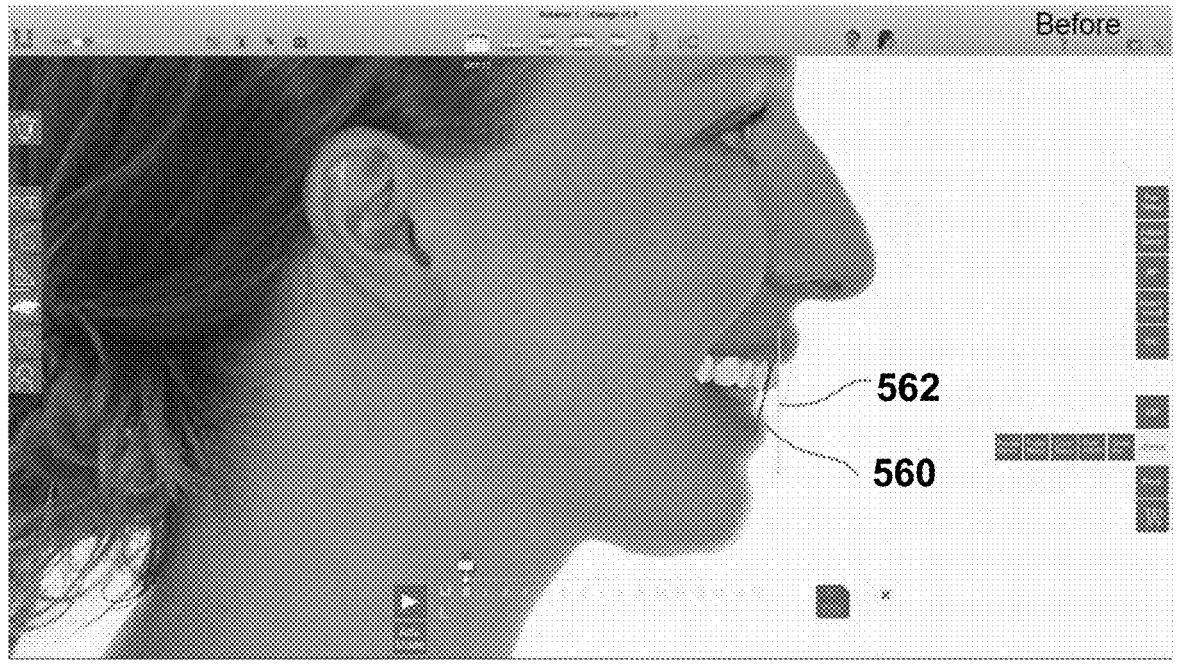
FIGS. 57 and 58 show examples of the patient's profile with the digital model superimposed illustrating the maxillary central inclination.
Figure 58:
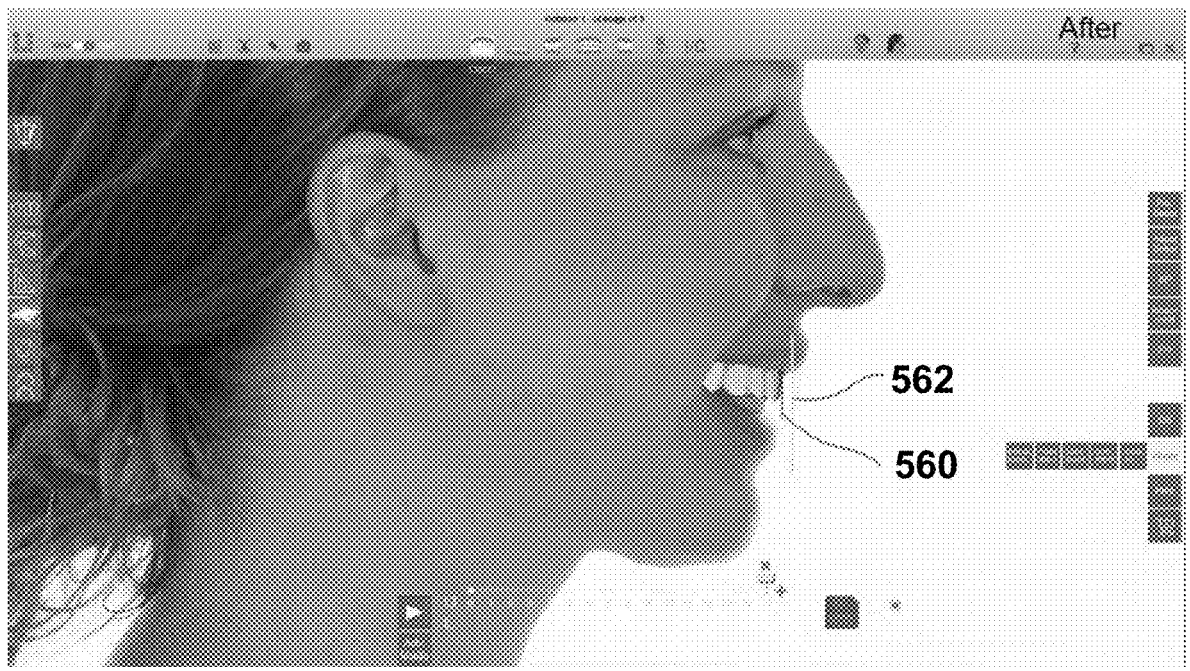

FIGS. 57 and 58 illustrate an example of a patient's image with the digital model illustrating the difference between the facial surface line 560 and vertical line 562 prior to correction in FIG. 57, where a difference in the angles between the two may be seen, and post correction in FIG. 58. In FIG. 57, the facial surface line 560 is far from parallel when compared to true vertical line 562, which will result in a lower smile score. In FIG. 58, markers have been adjusted to change the projected facial surface 560. This creates a more desirable smile and increases the smile score by decreasing the degrees between the facial surface line 560 and true vertical line 562.

Figure 59:
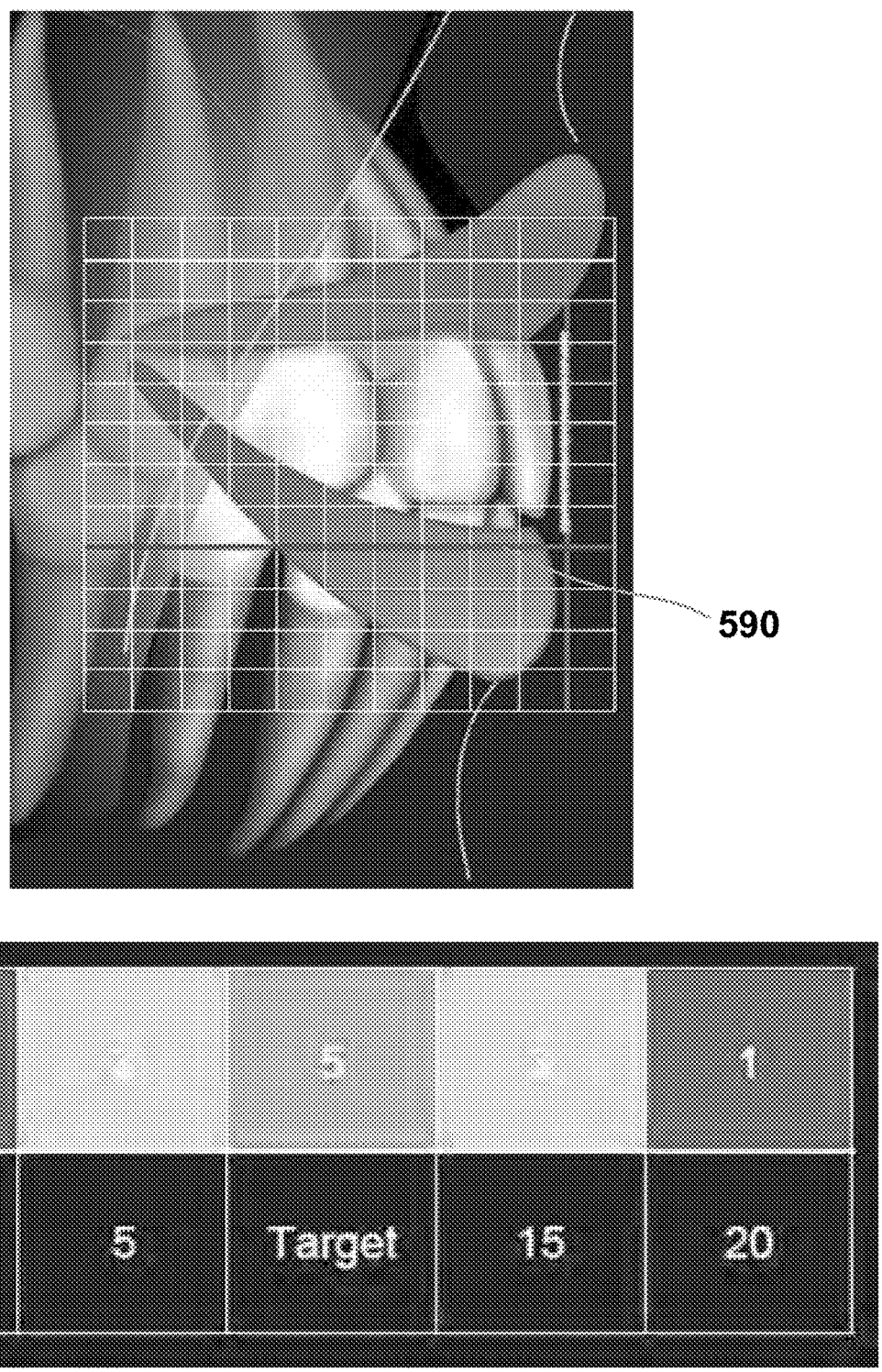
FIG. 59 shows a side view of the digital model of the patient's dentition for illustrating the COP factor.

A COP factor may also be included in a smile score 294 calculation where the COP value is the average line formed by the occlusal surfaces of the teeth, e.g., the visible teeth at least from a profile view of the patient. The COP line 592 may be compared against a true horizontal line 590, as shown in FIG. 59, and discrepancies between the COP line 592 and true horizontal line may be determined.

Figure 60:
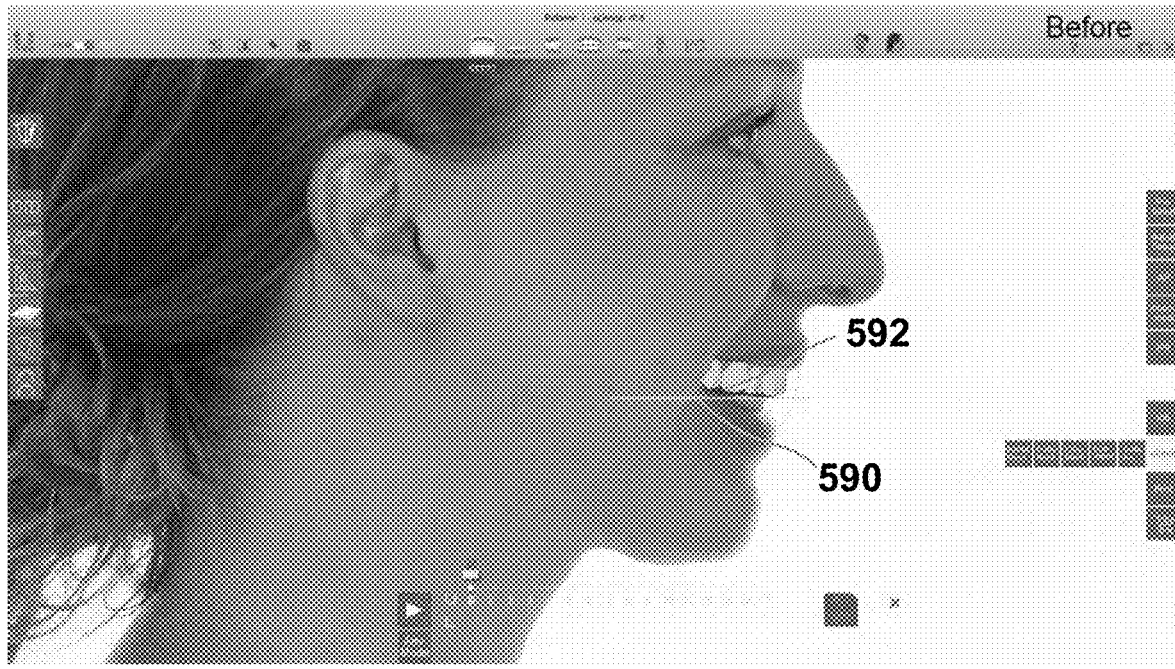
FIGS. 60 and 61 show examples of the patient's profile with the digital model superimposed illustrating the COP factor.
Figure 61:
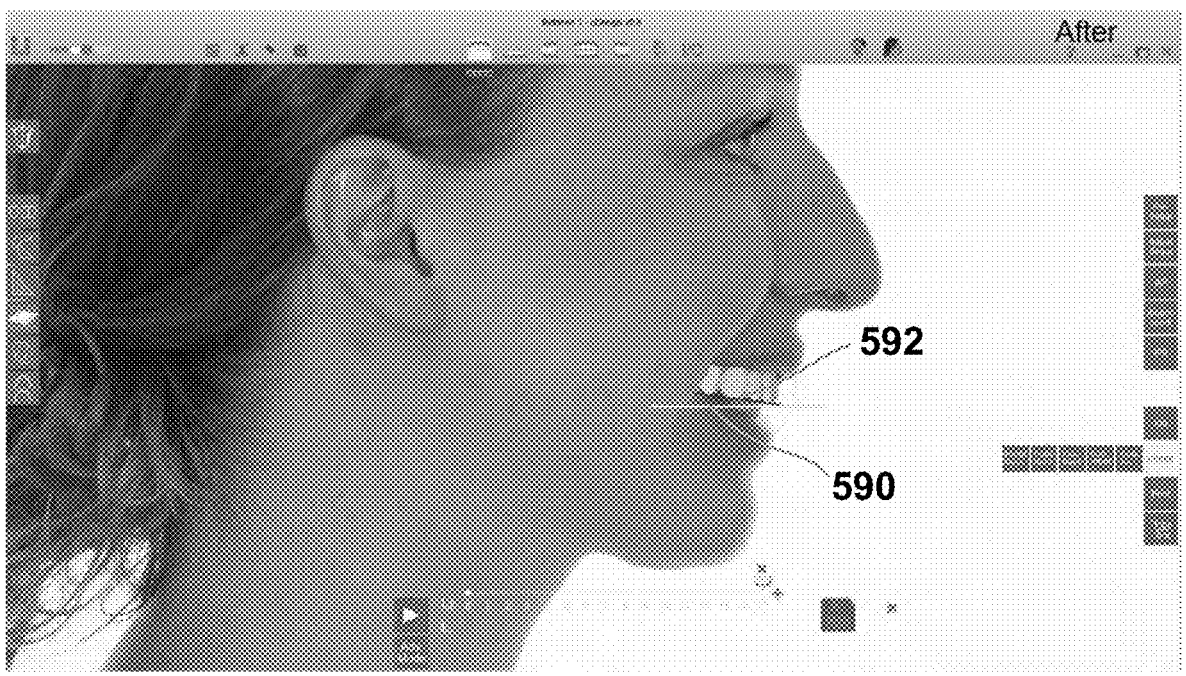

FIGS. 60 and 61 illustrate an example of a patient's image with the digital model superimposed. As shown in FIG. 60 prior to correction, the COP line 592 may be determined and compared against the true horizontal line 590. Typically, the desired COP line 592 may be angled about 10 degrees relative to the horizontal line 590 so that a discrepancy of zero between the two lines 590, 592 is a targeted value and may yield an assigned COP value of 5. A discrepancy of up to 5 degrees or up to 15 degrees may yield an assigned COP value of 3, and a discrepancy of 0 degrees or up to 20 degrees may yield an assigned COP value of 1 (as shown in the chart of FIG. 59). FIG. 61 shows the angle difference between the two lines 590, 592 of around 10 degrees post correction.

Yet another feature optionally available through the system may include the generation of an animation of the patient's face. Such an animation can be video based, where the patient may be requested to maintain a natural head position while repeating one or more phrases while recorded. The recorded video may be altered to swap the patient's face with the facial image of the patient with the resulting smile from treatment. The patient may then be able to view the original video and altered video with the replaced arch model for comparison purposes.

While different features are discussed, the system may incorporate any number of different features into a single system in any number of combinations. A single system provided may, for example, include or incorporate every feature described herein or it may include a select number of features depending upon the desired system.

The applications of the devices and methods discussed above are not limited to the one described but may include any number of further treatment applications. Modification of the above-described assemblies and methods for carrying out the invention, combinations between different variations as practicable, and variations of aspects of the invention that are obvious to those of skill in the art are intended to be within the scope of the claims.

What is claimed is:

1. A method for adjusting an image of a smile, comprising:

receiving a three-dimensional (3D) digital model of a dental arch of a patient;

receiving a digital facial image of the patient which includes an image of one or more teeth of the patient when smiling;

generating one or more reference lines relative to facial features of the patient for display upon the digital facial image;

determining one or more parameters of the image of the one or more teeth of the patient relative to the one or more reference lines;

registering the 3D digital model to the one or more teeth of the patient from the digital facial image;

correcting the 3D digital model for scale and distortion to create a corrected 3D digital model; and replacing the image of the one or more teeth with the corrected 3D digital model onto the digital facial image; and manipulating one or more teeth from the 3D digital model according to the one or more parameters obtained from the image of the one or more teeth and the one or more reference lines.

2. The method of claim 1 wherein receiving the digital facial image comprises receiving a front view and a profile view of the patient.

3. The method of claim 1 wherein receiving the digital facial image comprises determining a parameter relating to one or more facial features of the patient from the digital facial image.

4. The method of claim 1 wherein registering the 3D digital model comprises registering one or more locations from the 3D digital model to one or more corresponding locations on the digital facial image.

5. The method of claim 1 wherein registering the 3D digital model comprises registering the 3D digital model to a front facial image and a profile facial image of the patient.

6. The method of claim 1 wherein correcting the 3D digital model comprises adjusting a color of one or more teeth from the 3D digital model to match a color of the one or more teeth from the digital facial image.

7. The method of claim 1 wherein correcting the 3D digital model comprises adjusting a color of gums from the 3D digital model to match a color of gums from the digital facial image.

8. A method of adjusting a smile, comprising:
receiving a three-dimensional (3D) digital model of a dental arch of a patient;
receiving a digital facial image of the patient which includes an image of one or more teeth of the patient when smiling;
generating a smile curve or arc which corresponds to a curve or arc of a lower lip of the patient from the digital facial image;
overlaying the smile curve or arc in proximity to the one or more teeth on the digital facial image;
adjusting one or more parameters of the smile curve or arc; and
manipulating one or more teeth from the 3D digital model according to the smile curve or arc.

9. The method of claim 8 wherein adjusting one or more parameters comprises adjusting a relative position of the smile curve or arc relative to the one or more teeth on the digital facial image.

10. The method of claim 8 further comprising overlaying a plane upon the one or more teeth of the digital facial image to determine a position of one or more brackets upon the one or more teeth.

11. The method of claim 10 further comprising overlaying images of the one or more brackets upon the one or more teeth on the digital facial image in a corresponding manner.

12. The method of claim 8 wherein manipulating one or more teeth comprises adjusting a length of the one or more teeth from the 3D digital model.

13. A method of adjusting a facial image, comprising:
receiving a three-dimensional (3D) digital model of a dental arch of a patient;
receiving a digital facial image of the patient which includes an image of one or more teeth of the patient when smiling;
estimating a facial anatomy from the digital facial image of the patient;
identifying one or more areas of the facial anatomy affected by a correction treatment of the one or more teeth;
adjusting the one or more areas of the facial anatomy corresponding to the correction treatment.

14. The method of claim 13 wherein estimating the facial anatomy comprises estimating the facial anatomy in a cheek region, perioral region, chin region, or jawline of the digital facial image.

15. The method of claim 13 wherein estimating the facial anatomy comprises presenting a boundary area around the one or more areas of the facial anatomy.

16. The method of claim 13 wherein identifying one or more areas further comprises identifying an upper lip or lower lip from the digital facial image.

17. A method of improving a smile of a patient, comprising:
receiving a three-dimensional (3D) digital model of a dental arch of a patient;
receiving a digital facial image of the patient which includes an image of one or more teeth of the patient when smiling;
identifying one or more parameters relating to smile optimization;
assigning a numerical value to each of the one or more parameters; and
generating a smile score based on the numerical valve assigned to each of the one or more parameters such that an increase in the smile score is indicative of an increase of an aesthetic smile.

18. The method of claim 17 wherein the one or more parameters comprise a smile curve or arc, a line of a facial axis of a clinical crown, width or height of a tooth, or curvature of an individual tooth.

19. The method of claim 17 further comprising altering the one or more parameters such that a corresponding smile score is generated.

20. The method of claim 17 wherein the one or more parameters for generating the smile score is selected from the group consisting of smile arc, incisor plane cant, occlusal plane cant, max midline, max transverse display, cuspid inclination, buccal segment inclination, tooth proportionality, flow, gingival display, maxillary central inclination, and COP.

21. A method for adjusting an image of a smile, comprising:
receiving a three-dimensional (3D) digital model of a dental arch of a patient;
receiving a digital facial image of the patient which includes an image of one or more teeth of the patient when smiling;
registering the 3D digital model to the one or more teeth of the patient from the digital facial image;
correcting the 3D digital model for scale and distortion to create a corrected 3D digital model;
overlaying the corrected 3D digital model onto the digital facial image;
generating a smile curve or arc which corresponds to a curve or arc of a lower lip of the patient when the lower lip is formed into a smile in the digital facial image;
overlaying the smile curve or arc in proximity to the one or more teeth on the digital facial image;
adjusting one or more parameters of the smile curve or arc; and
manipulating one or more teeth from the 3D digital model according to the smile curve or arc.

22. The method of claim 21 further comprising:
estimating a facial anatomy from the digital facial image of the patient;
identifying one or more areas of the facial anatomy affected by a correction treatment of the one or more teeth;

adjusting the one or more areas of the facial anatomy corresponding to the correction treatment.

23. The method claim 21 further comprising:
identifying one or more parameters relating to smile optimization; and
generating a smile score based on the one or more parameters.

24. The method of claim 23 further comprising altering one or more parameters to adjust the smile score.

25. The method of claim 23 wherein the one or more parameters for generating the smile score is selected from the group consisting of smile arc, incisor plane cant, occlusal plane cant, max midline, max transverse display, cuspid inclination, buccal segment inclination, tooth proportionality, flow, gingival display, maxillary central inclination, and COP.

26. A method for adjusting an image of a smile, comprising:
receiving a three-dimensional (3D) digital model of a dental arch of a patient;
receiving a digital facial image of the patient which includes an image of one or more teeth of the patient when smiling;
registering the 3D digital model to the one or more teeth of the patient from the digital facial image;
correcting the 3D digital model for scale and distortion to create a corrected 3D digital model;
overlaying the corrected 3D digital model onto the digital facial image;
estimating a facial anatomy including muscle structures and skin areas from the digital facial image of the patient;
identifying one or more areas of the facial anatomy affected by a correction treatment of the one or more teeth; and
adjusting the one or more areas of the facial anatomy corresponding to the correction treatment.

27. The method of claim 26 further comprising:
generating a smile curve or arc which corresponds to a curve or arc of a lower lip of the patient from the digital facial image;
overlaying the smile curve or arc in proximity to the one or more teeth on the digital facial image;
adjusting one or more parameters of the smile curve or arc; and
manipulating one or more teeth from the 3D digital model according to the smile curve or arc.

28. The method of claim 26 further comprising:
identifying one or more parameters relating to smile optimization; and
generating a smile score based on the one or more parameters.

29. The method of claim 28 further comprising altering one or more parameters to adjust the smile score.

30. The method of claim 28 wherein the one or more parameters for generating the smile score is selected from the group consisting of smile arc, incisor plane cant, occlusal plane cant, max midline, max transverse display, cuspid inclination, buccal segment inclination, tooth proportionality, flow, gingival display, maxillary central inclination, and COP.

31. A method for adjusting an image of a smile, comprising:
receiving a three-dimensional (3D) digital model of a dental arch of a patient;
receiving a digital facial image of the patient which includes an image of one or more teeth of the patient when smiling;
registering the 3D digital model to the one or more teeth of the patient from the digital facial image;
correcting the 3D digital model for scale and distortion to create a corrected 3D digital model;
overlaying the corrected 3D digital model onto the digital facial image;
identifying one or more parameters relating to smile optimization;
generating a smile score based on the one or more parameters, wherein the smile score comprises a relative scale which is indicative of an optimized smile of the patient; and
altering one or more parameters to adjust the smile score.

32. The method of claim 31 further comprising:
generating a smile curve or arc which corresponds to a curve or arc of a lower lip of the patient from the digital facial image;
overlaying the smile curve or arc in proximity to the one or more teeth on the digital facial image;
adjusting one or more parameters of the smile curve or arc; and
manipulating one or more teeth from the 3D digital model according to the smile curve or arc.

33. The method of claim 31 further comprising:
estimating a facial anatomy from the digital facial image of the patient;
identifying one or more areas of the facial anatomy affected by a correction treatment of the one or more teeth;
adjusting the one or more areas of the facial anatomy corresponding to the correction treatment.

* * * * *